(12) United States Patent
Che et al.

(10) Patent No.: US 12,097,443 B2
(45) Date of Patent: Sep. 24, 2024

(54) MOVABLE PUZZLE PLATFORM

(71) Applicants: Xiaoling Che, Hubei (CN); Jinyan Duan, Guangdong (CN)

(72) Inventors: Xiaoling Che, Hubei (CN); Jinyan Duan, Guangdong (CN)

( * ) Notice: Subject to any disclaimer, the term of this patent is extended or adjusted under 35 U.S.C. 154(b) by 0 days.

(21) Appl. No.: 18/625,196

(22) Filed: Apr. 2, 2024

(65) Prior Publication Data

US 2024/0245983 A1 Jul. 25, 2024

Related U.S. Application Data

(60) Continuation-in-part of application No. 18/541,685, filed on Dec. 15, 2023, which is a continuation of application No. 17/505,587, filed on Oct. 19, 2021, now Pat. No. 11,890,551, application No. 18/625,196, filed on Apr. 2, 2024 is a division of application No. 18/235,416, filed on Aug. 18, 2023, which is a continuation-in-part of application No. 17/829,359, filed on Jun. 1, 2022, and a continuation-in-part of application No. 17/505,587, filed on Oct. 19, 2021, now Pat. No. 11,890,551, application No. 18/625,196, filed on Apr. 2, 2024 is
(Continued)

(30) Foreign Application Priority Data

| Sep. 26, 2021 | (CN) | 202111131554.1 |
| Sep. 26, 2021 | (CN) | 202122334815.1 |
| Jun. 13, 2023 | (CN) | 202330364018.X |

(51) Int. Cl.
*A63F 9/10* (2006.01)
*A47B 13/08* (2006.01)
*A47B 41/02* (2006.01)

(52) U.S. Cl.
CPC .......... *A63F 9/1044* (2013.01); *A47B 13/081* (2013.01); *A47B 13/083* (2013.01); *A47B 13/088* (2013.01); *A47B 41/02* (2013.01); *A63F 2009/105* (2013.01)

(58) Field of Classification Search
CPC ............. A63F 9/1044; A63F 2009/105; A47B 13/081; A47B 13/083; A47B 41/00; A47B 41/02
See application file for complete search history.

(56) References Cited

U.S. PATENT DOCUMENTS

| 1,987,496 A | 1/1935 | Springborn |
| 4,591,161 A | 5/1986 | Vanderhoof |
| (Continued) | | |

FOREIGN PATENT DOCUMENTS

| DE | 202022102521 U1 * | 8/2022 | ........... A47B 13/081 |
| WO | WO-2019173973 A1 * | 9/2019 | ............... A63F 9/10 |

*Primary Examiner* — Daniel J Rohrhoff

(57) ABSTRACT

A movable puzzle platform includes a board assembly having a puzzle board with a puzzle plate and a fixing portion extending from the puzzle plate, a supplement arrangement having a supporting portion attached on a bottom surface of the puzzle board and having a first main supporting wall attached on the bottom surface of the puzzle board, and a restricting wall having a first extending wall upwardly extended from the fixing portion. The first extending wall is integral with a periphery of the first main supporting wall as a whole for forming a first receiving space for fixing the puzzle board. The puzzle platform allows the player to conveniently play puzzles.

25 Claims, 56 Drawing Sheets

Related U.S. Application Data a continuation-in-part of application No. 17/829,359, filed on Jun. 1, 2022.

(56)  References Cited

U.S. PATENT DOCUMENTS

| | | | | |
|---|---|---|---|---|
| 4,635,894 | A | 1/1987 | Sammons | |
| 4,659,050 | A | 4/1987 | Tabayashi | |
| 5,174,538 | A | 12/1992 | Okada | |
| 5,624,118 | A * | 4/1997 | Gottesman | A63F 9/1044 40/739 |
| 5,651,547 | A * | 7/1997 | Rannelli | A63F 9/1044 273/157 R |
| 7,552,821 | B1 * | 6/2009 | Demers | A63F 9/1044 206/499 |
| 10,419,054 | B1 | 9/2019 | VanTassell et al. | |
| 2010/0101461 | A1 * | 4/2010 | Brault | A47B 13/003 108/140 |
| 2021/0170267 | A1 | 6/2021 | Malki | |
| 2021/0170268 | A1 * | 6/2021 | Malki | A63F 9/1044 |
| 2023/0347235 | A1 * | 11/2023 | Zhou | A47B 88/906 |
| 2024/0108973 | A1 * | 4/2024 | Che | F16M 11/08 |

\* cited by examiner

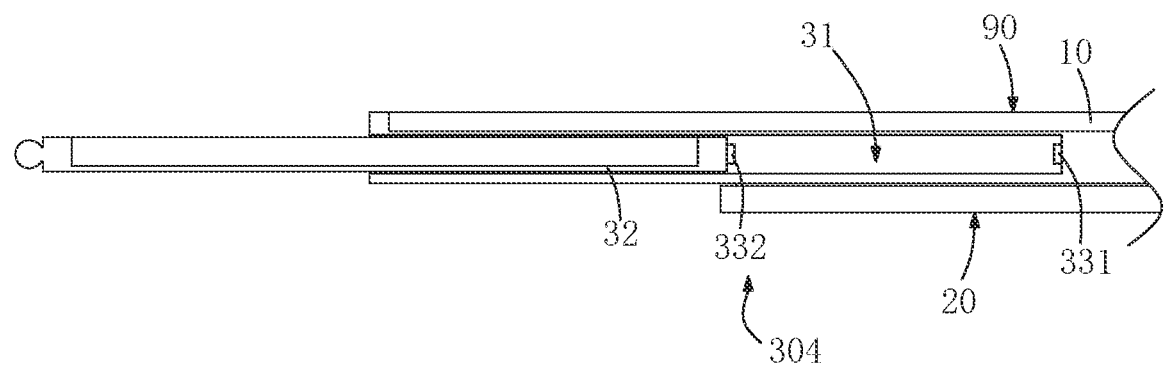
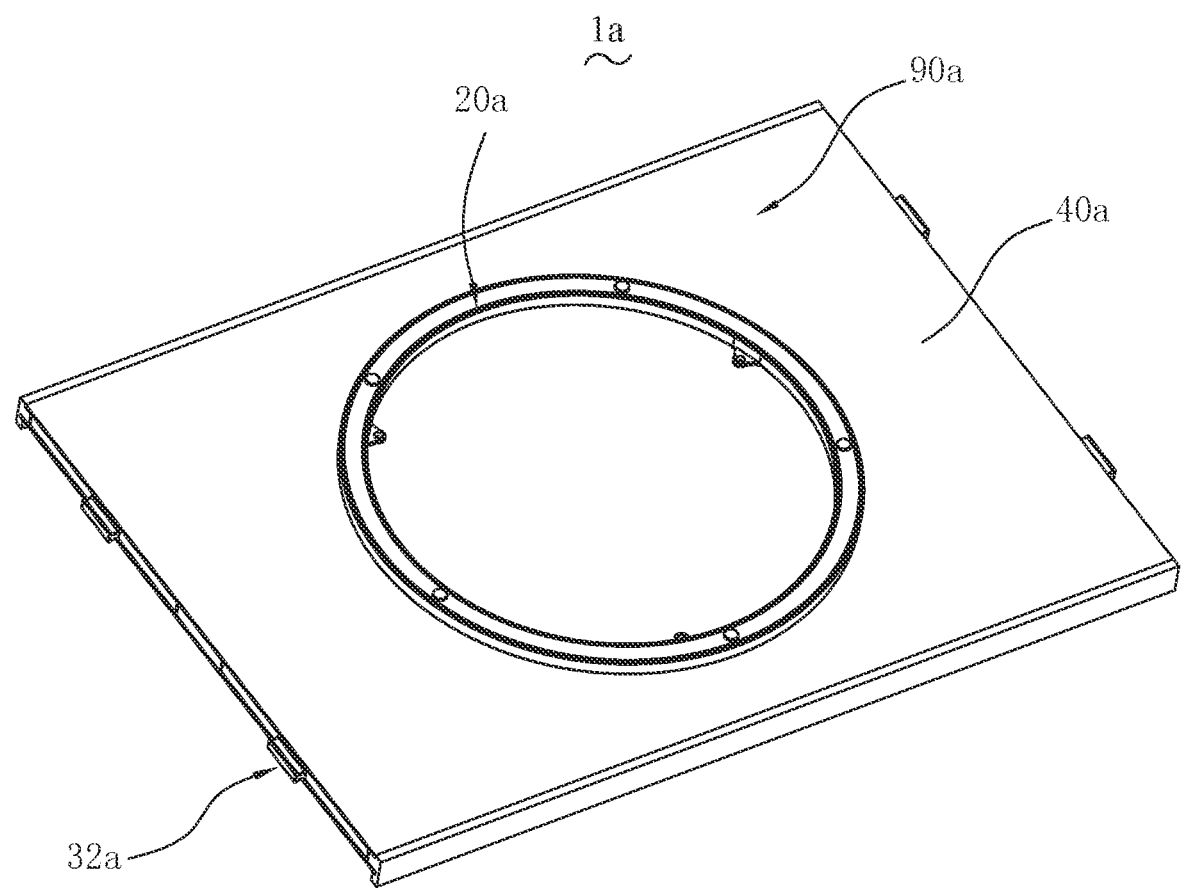
Fig. 15
Fig. 16

K-K

1L

MOVABLE PUZZLE PLATFORM

CROSS REFERENCES AND PRIORITIES

This application is a continuation-in-part of U.S. patent application Ser. No. 17/829,359 filed on Jun. 1, 2022 and a divisional application of U.S. patent application Ser. No. 18/235,416 filed on Aug. 18, 2023, and a continuation-in-part of U.S. patent application Ser. No. 18/541,685 filed on Dec. 15, 2023, the contents of each of which are incorporated by reference in their entirety.

BACKGROUND OF THE PRESENT INVENTION

Field of Invention

The present invention relates to puzzle game apparatus, and more particularly to a movable puzzle platform, wherein the puzzle platform is configured for retaining all the unfinished pieces and while allowing the player to conveniently play the puzzle.

Description of Related Arts

Puzzles are devised over the years and are among the most popular board games generally played alone by an individual. It is well known that puzzles are good for the brain. Studies have shown that playing puzzles can improve cognition and visual-spatial reasoning, and can train concentration and patience.

Other than as a means of entertainment and enjoyment, players would like to challenge themselves by playing higher piece counts of the puzzle. Generally speaking, the higher the piece count, the harder the puzzle is. However, a common drawback or a burden for the player is that the finished size of the puzzles is relatively large. For example, a finished size of 1,000 piece puzzles is about 30"×24", a finished size of 5,000 piece puzzles is about 60"×40", and so on. In other words, these puzzles require a relatively large playing surface such as the surface of a table or a puzzle board for putting all the pieces together to form a puzzle figure. Therefore, to play a relatively large puzzle, for example 60"×40" or more, the side length of the puzzle board is longer than the player's arm length that the player is unable to reach the other sides of the puzzle board, so that the player is required to move around the playing surface to put pieces at different directions and portions near each side of the puzzle board. As a skilled player, the strategies for playing the puzzles are configured for sorting the pieces into groups and assembling the border first. Therefore, the player will need to move from one side of the playing surface to another side thereof to play the puzzles. Furthermore, it could take hours, days or even months to compete a larger scale puzzle. One or more puzzle pieces could be missed accidentally or unintentionally. It is sad that the player usually finds out there is a missing piece at the end. Therefore, how to avoid losing any pieces, it is best to find a container to save all the unfinished pieces.

A need exists for a tool that retains all the unfinished pieces and while allowing the player to conveniently play the puzzle. It is to the provision of such a tool that the present disclosure is primarily directed.

SUMMARY OF THE PRESENT INVENTION

The invention is advantageous in that it provides a movable puzzle platform, wherein the puzzle platform is configured for allowing a player to conveniently play the puzzles. The movable puzzle platform comprises a board assembly comprising a puzzle board comprising a puzzle plate and a fixing portion extending from the puzzle plate, a supplement arrangement comprising a supporting portion having a first main supporting wall attached on the bottom surface of the puzzle board, and a restricting wall having a first extending wall upwardly extending from the fixing portion and stacked on the fixing portion of the puzzle board. The first extending wall and the fixing portion of the puzzle board are successively stacked on the first main supporting wall.

In the other aspect, the present invention provides another movable puzzle platform comprising a board assembly comprising a puzzle board comprising a puzzle board comprising a puzzle plate and a fixing portion extending from the puzzle plate, a supplement arrangement comprising a supporting portion having a first main supporting wall attached on the bottom surface of the puzzle board, and a restricting wall having a first extending wall upwardly extended from the fixing portion. The first extending wall is integral with a periphery of the first main supporting wall as a whole for forming a first receiving space for fixing the puzzle board.

Still further objects and advantages will become apparent from a consideration of the ensuing description and drawings. These and other objectives, features, and advantages of the present invention will become apparent from the following detailed description, the accompanying drawings, and the appended claims.

BRIEF DESCRIPTION OF THE DRAWINGS

FIG. 15 is a sectional view of a supplement arrangement of the movable puzzle platform shown in FIG. 1.

FIG. 16 is an illustrative isometric view of the movable puzzle platform according to a second embodiment of the present invention.

DETAILED DESCRIPTION OF THE PREFERRED EMBODIMENT

Figure 1:
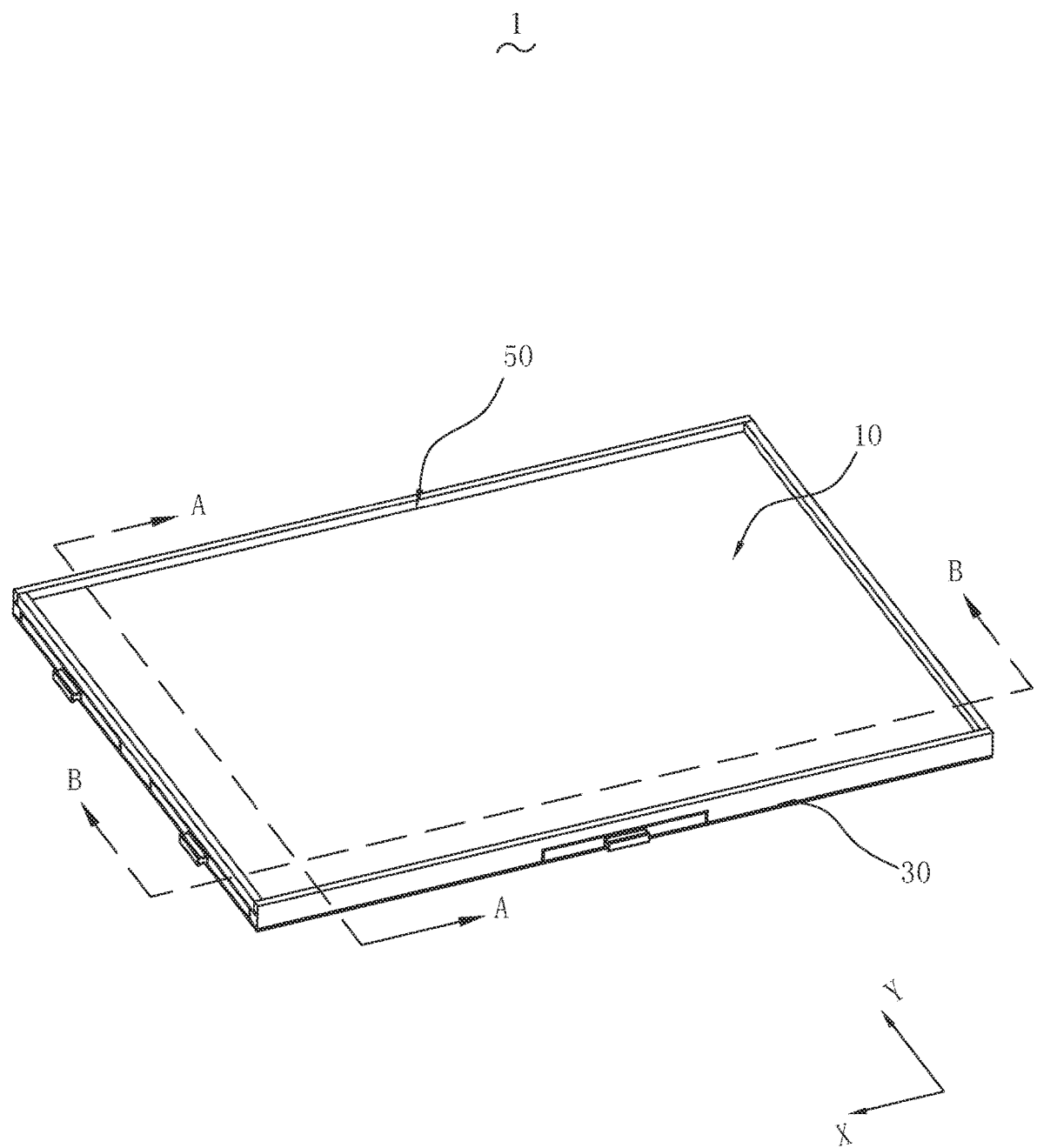
FIG. 1 is an illustrative isometric view of a movable puzzle platform according to a first embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 1 to 15, a movable puzzle platform 1 according to a first embodiment of the present invention is illustrated, wherein the movable puzzle platform 1 is arranged for a user or a player to assemble a plurality of puzzle pieces 100 thereon. Accordingly, the movable puzzle platform 1 comprises a board assembly 90 and a rotating assembly 20 attached on the board assembly 90. The board assembly 90 comprises a puzzle board 10 for placing the puzzle pieces 100, a supplement arrangement 30 attached on the puzzle board 10, a base 40 attached on the supplement arrangement 30, and a restricting wall 50 upwardly extended from a peripheral edge of the puzzle board 10. The rotating assembly 20 is configured for allowing the board assembly 90 sliding on a playing place and provides accessibility for the board assembly 90 to move the board assembly 90 at different planar directions with respect to the playing place. The supplement arrangement 30 is configured not only for storing the puzzle pieces 100 before they are assembled, but also for allowing the player to preassemble and store a section of the puzzle figure with a group of puzzle pieces 100. The supplement arrangement 30 and the restricting wall 50 are positioned at the two sides of the puzzle board 10, respectively. Although good results have been shown with the board assembly 90 that is rectangular in shape, it is within the scope of the present invention that numerous other shapes of the board assembly 90 could be used to achieve the desired functionality as described herein. The movable puzzle platform 1 is manufactured from a suitable durable material such as wood combined with durable fiberboard. In another embodiment, a movable puzzle platform could be manufactured from plastic or fiberglass. In yet another embodiment, a puzzle board is made of non-slip felt surfaces to keep the puzzle pieces secure.

Figure 2:
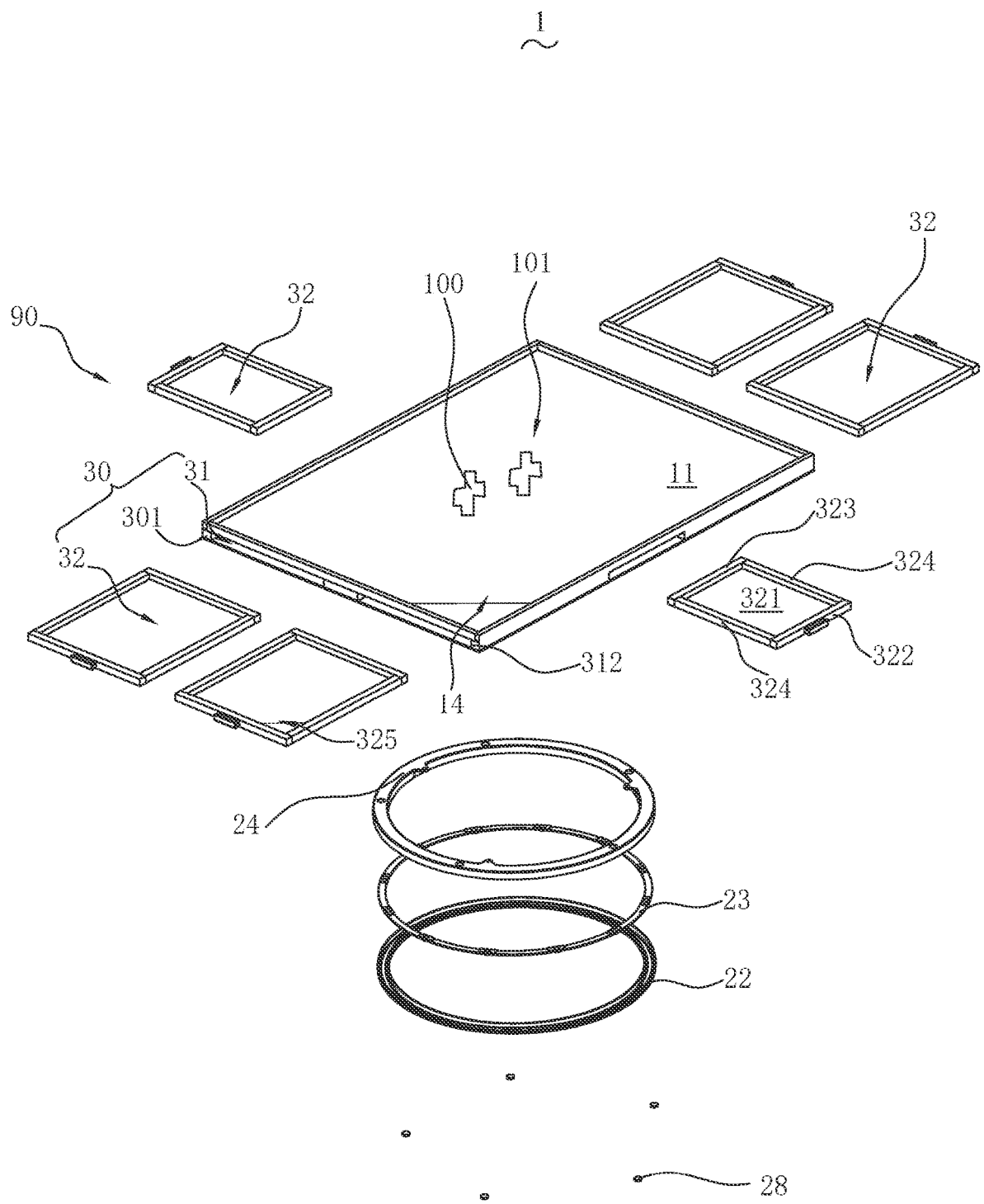
FIG. 2 is an exploded perspective view of the movable puzzle platform shown in FIG. 1.
Figure 3:
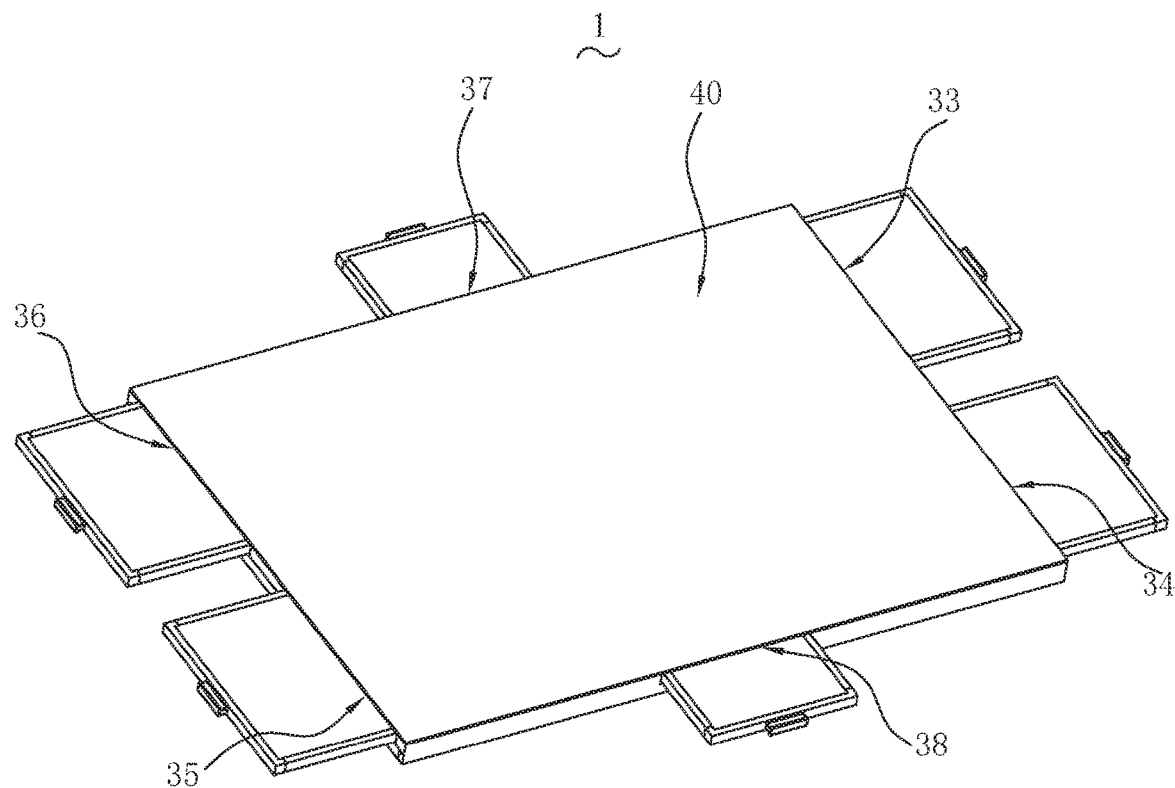
FIG. 3 is an illustrative isometric view of the movable puzzle platform shown in FIG. 1, puzzle drawers thereof being partially pulled out of a corresponding drawer cavity.
Figure 4:
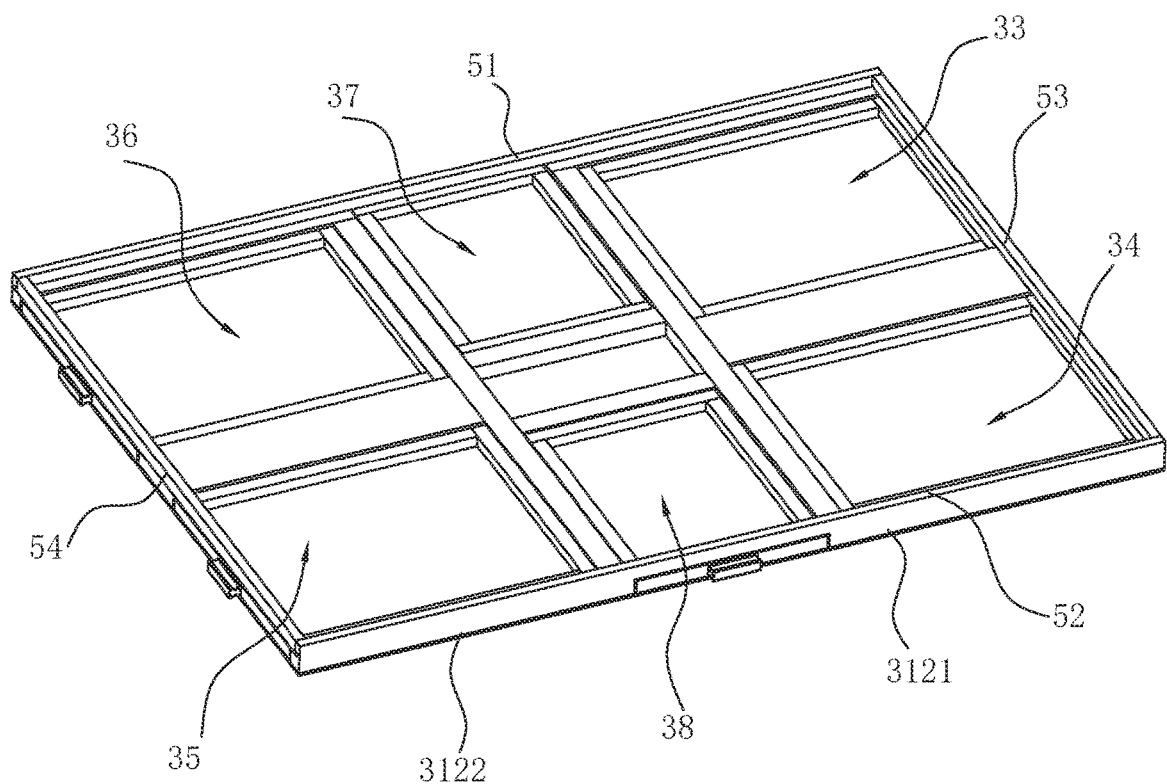
FIG. 4 is an illustrative isometric view of the movable puzzle platform shown in FIG. 1, a puzzle board and a rotating assembly thereof being removed away.
Figure 11:
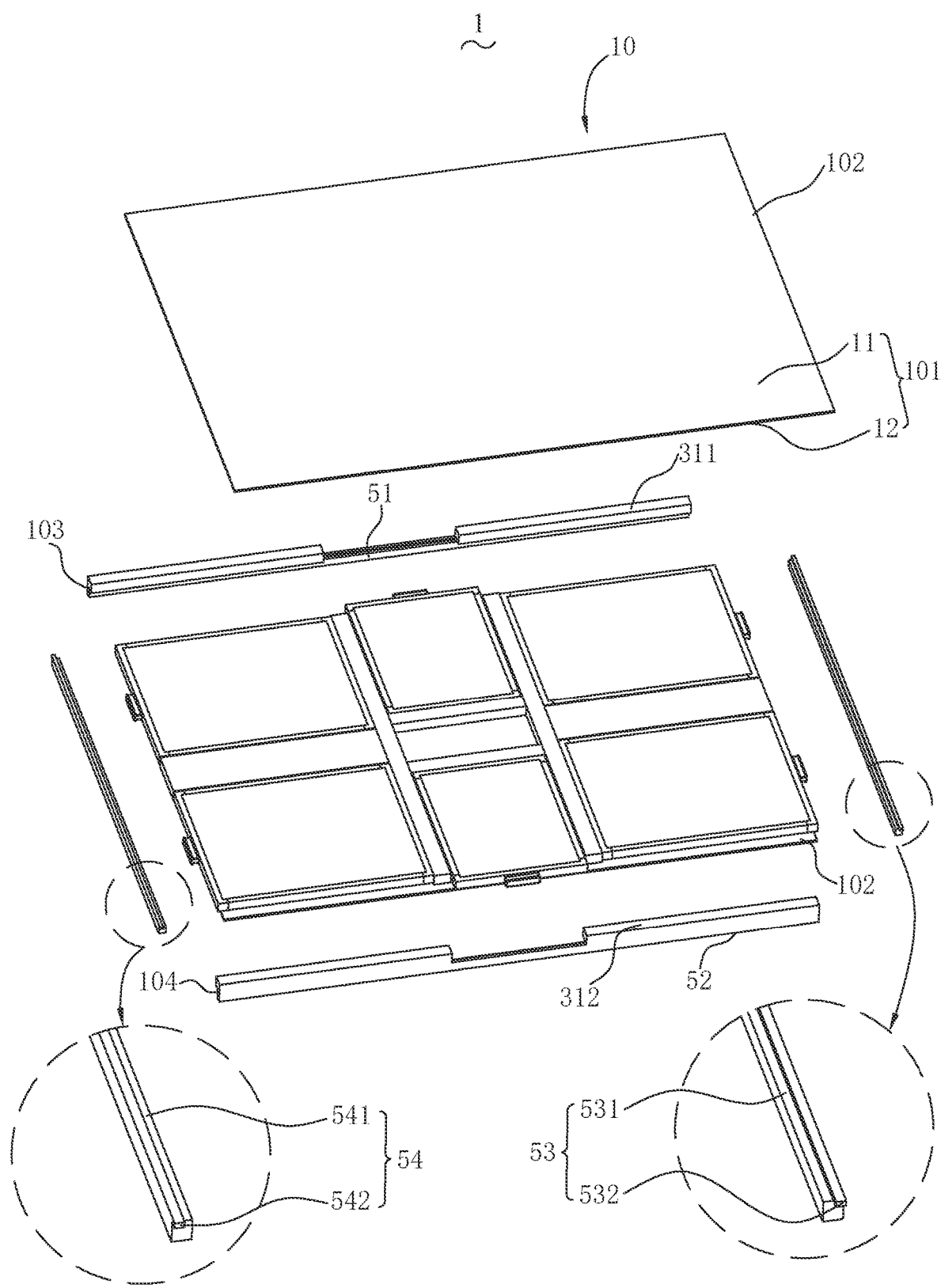
FIG. 11 is a partially exploded perspective view of the movable puzzle platform shown in FIG. 1.
Figure 12:
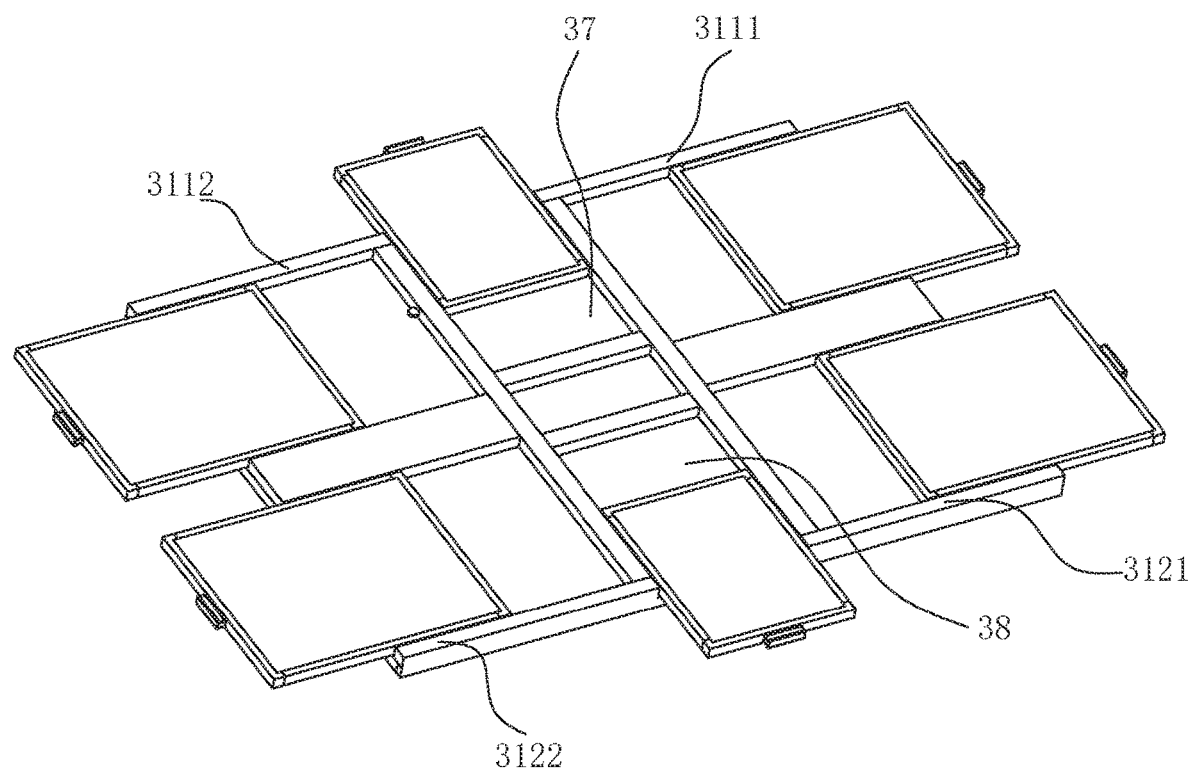
FIG. 12 is an illustrative isometric view of the movable puzzle platform shown in FIG. 1, puzzle drawers thereof being partially pulled out of a corresponding drawer cavity, and the base thereof being removed away.
Figure 13:
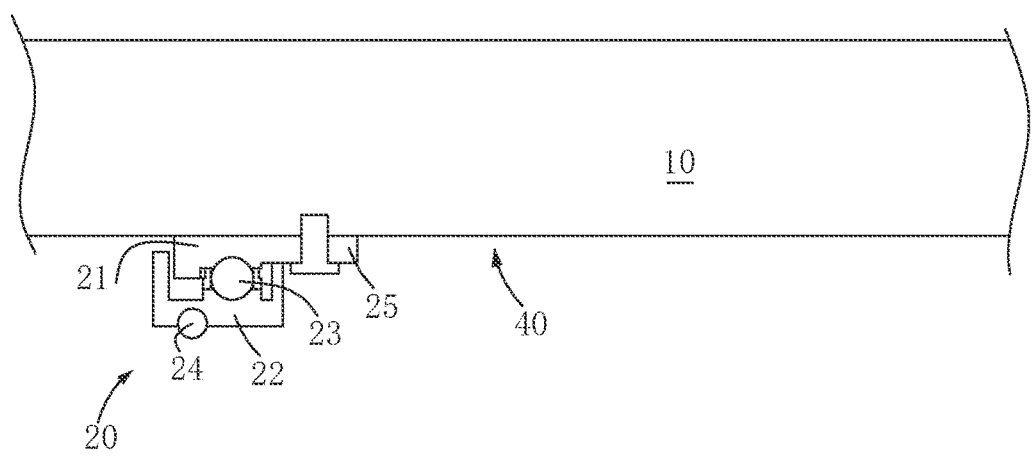
FIG. 13 is a side view of the rotating assembly of the movable puzzle platform shown in FIG. 1.

The puzzle board 10 with an even thickness may take any shape, such as circular, square, rectangular and so on. According to this embodiment as shown in FIGS. 1-2 and 11, the puzzle board 10 is embodied to have a rectangular shape defining two longer longitudinal sides provided along a longitudinal direction X and two shorter transverse sides provided along a lateral direction Y perpendicular to the longitudinal direction X. Accordingly, the puzzle board 10 defines XY coordinate surface. The puzzle board 10 comprises a puzzle plate 101 for playing the puzzle pieces 100 thereon and a fixing portion 102 extending from the edge of the puzzle plate 101 and connected with the supplement arrangement 30 and the restricting wall 50, respectively. The puzzle plate 101 comprises a flat playing surface 11 and a bottom surface 12 opposite to the playing surface 11. It is worth mentioning that an area of the playing surface 11 is not smaller than an area of the puzzle pieces 100 being put together. Preferably, the area of the playing surface 11 matches with the area of the puzzle pieces 100 after the puzzle pieces 100 are assembled. In other words, the puzzle board 10 serves as a puzzle frame for framing the puzzle pieces 100 after the puzzle pieces 100 are assembled. It is worth mentioning that the puzzle board 10 has a predetermined size adapted for a larger scale puzzle, such as at least 1,000 puzzle pieces, being assembled on the puzzle board 10.

In this embodiment, the restricting wall 50 is substantially perpendicular to the puzzle board 10 and is generally four-piece type. The restricting wall 50 comprises a first extending wall 51 mounted on the fixing portion 102 and arranged in the longitudinal direction X, a second extending wall 52 mounted on the fixing portion 102 and spaced apart from the first extending wall 51, a third extending wall 53 mounted on the fixing portion 102 and arranged in the lateral direction Y for connected with the adjacent first and second extending walls 51, 52, and a fourth extending wall 54 mounted on the fixing portion 102 and spaced apart from the third extending wall 53 for connected with the adjacent first and second extending walls 51, 52. The first and second extending walls 51, 52 are parallel to each other in the longitudinal direction X. The third and fourth extending walls 53, 54 are parallel to each other in the lateral direction Y. The restricting wall 50 is configured for preventing the players from accidentally or unintentionally pushing the puzzle pieces 100 off the puzzle plate 101. Each of extending walls is substantially strip-shaped and connected with the adjacent extending walls for forming the restricting wall 50 having a closed structure. The restricting wall with a closed curve shape is configured for preventing the puzzle pieces fall off from the puzzle board when the board assembly is rotated on the playing place via a rotation movement of the rotating assembly and/or when the board assembly is moved by a user or a player from one place to another. Each of extending walls may be detachably assembled edge-to-edge to form the restricting wall 50. It is optional that a restricting wall may be an integral unit. Optionally, adjacent extending walls are unconnected with each other. A restricting wall further four arc walls located on four corners of a puzzle plate and smoothly connecting two adjacent extending walls. It is optional that each arc wall is configured to be a part of a circle.

The supplement arrangement 30 comprises a supporting portion 301 connected with the bottom surface 12 of the puzzle plate 101 for forming at least one drawer cavity 31 and at least one puzzle drawer 32 received in the corresponding drawer cavity 31. The puzzle board 10 of the movable puzzle platform 1 has a thin and big size. A length and/or a width of the puzzle board 10 is much greater than a thickness of the puzzle board 10, so the supporting portion 301 is configured for improving the structural strength of the puzzle board 10. The supporting portion 301 is substantially perpendicular to the puzzle board 10 and may take any shape, such as circular, square, rectangular and so on. As shown in FIGS. 1-15, in this embodiment, the supplement arrangement 30 has six drawer cavities 31 and six puzzle drawers 32 received in the corresponding drawer cavity 31. The storing capacity of drawers vary as per varying sizes of the puzzle pieces. The drawer cavities 31 comprise four lateral cavities 302 and two longitudinal cavities 303. The four lateral cavities 302 comprise a first lateral cavity 33, a second lateral cavity 34, a third lateral cavity 35 and a fourth lateral cavity 36. The two longitudinal cavities 303 comprise a first longitudinal cavity 37 and a second longitudinal cavity 38. In this embodiment, the supporting portion is configured not only for improving the structural strength of the movable puzzle platform, but also for forming the drawer cavities together with the puzzle plate.

The supporting portion 301 comprises a first main supporting wall 311 attached on the bottom surface 12 of the puzzle board 10 along the longitudinal direction X, a second main supporting wall 312 attached on the bottom surface 12 of the puzzle board 10 along the longitudinal direction X and disposed opposite to the first main supporting wall 311, a first dividing supporting wall 313 attached on the bottom surface 12 of the puzzle board 10 along the longitudinal direction X and disposed between the first and second main supporting walls 311, 312, a second dividing supporting wall 314 attached on the bottom surface 12 of the puzzle board 10 along the longitudinal direction X and disposed between the first and second main supporting walls 311, 312, a first inner supporting wall 315 attached on the bottom surface 12 of the puzzle board 10 along the lateral direction Y and connected with the first and second main supporting walls 311, 312, and a second inner supporting wall 316 attached on the bottom surface 12 of the puzzle board 10 along the lateral direction Y and connected with the first and second main supporting walls 311, 312. The first and second dividing supporting walls 313, 314 are spaced apart from each other. The first and second inner supporting walls 315, 316 are spaced apart from each other and disposed parallel to each other. The first and second dividing supporting walls 313, 314 and the first and second main supporting walls 311, 312 are disposed parallel to each other. The first dividing supporting wall 313 connects with the first inner supporting wall 315 and the second dividing supporting wall 314 connects with the second inner supporting wall 316 for forming crossing structures, respectively. The first and second inner supporting walls 315, 316 are not exposed from the first and second main supporting walls 311, 312, respectively.

One end of the first dividing supporting wall 313 is connected with the first inner supporting wall 315 and is substantially perpendicular to the first inner supporting wall 315, and another end of the first dividing supporting wall 313 and the third extending wall 53 partly overlap in a thickness direction of the board assembly 90. One end of the second dividing supporting wall 314 is connected with the second inner supporting wall 316 and is substantially perpendicular to the second inner supporting wall 316 and another end of the second dividing supporting wall 314 and the fourth extending wall 54 partly overlap in a thickness direction of the board assembly 90. The first lateral cavity 33 is formed by the first main supporting wall 311 cooperated with the first dividing supporting wall 313 and the first inner supporting wall 315. The second lateral cavity 34 is formed by the second main supporting wall 312 cooperated with the first dividing supporting wall 313 and the first inner supporting wall 315. The third lateral cavity 35 is formed by the second main supporting wall 312 cooperated with the second dividing supporting wall 314 and the second inner supporting wall 316. The fourth lateral cavity 36 is formed by the first main supporting wall 311 cooperated with the second dividing supporting wall 314 and the second inner supporting wall 316. In this embodiment, the first dividing supporting wall 313 cooperates with the first and second main supporting wall 311,312 for varying volumes of the first and second lateral cavities 33, 34. Moreover, the second dividing supporting wall 314 cooperates with the first and second main supporting wall 311, 312 for varying volumes of the third and fourth lateral cavities 35, 36.

The supporting portion 30 further comprises a third dividing supporting wall 317 extending from the bottom surface 12 of the puzzle plate 101 along the longitudinal direction X and connected with the first and second inner supporting walls 315, 316 and a fourth dividing supporting wall 318 extending from the bottom surface 12 of the puzzle plate 101 along the longitudinal direction X and connected with the first and second inner supporting walls 315, 316. The third and fourth dividing supporting walls 317, 318 are located between the first and second inner supporting walls 315, 316 and spaced apart to each other. The third and fourth dividing supporting walls 317, 318 are parallel to the first and second main supporting walls 311, 312. The first and second main supporting walls and the first through fourth dividing supporting walls are configured for improving the structural strength of the movable puzzle platform along the longitudinal direction X, respectively. The first and second inner supporting walls are configured for improving the structural strength of the movable puzzle platform along the lateral direction Y, respectively. The first and second inner supporting walls and the first through fourth dividing supporting walls are arranged between the first and second main supporting walls, respectively. The main supporting walls and the inner supporting walls can be assembled together by threads, snap-fit, friction fit, screws, rivets or other similar complementary conformation. The inner supporting walls and the dividing supporting walls can be assembled together by threads, snap-fit, friction fit, screws, rivets or other similar complementary conformation. Optionally, each of the main supporting walls, each of the inner supporting walls and/or each of the dividing supporting walls may be extended in any direction, spaced apart with each other and/or spaced apart from the bottom surface of the puzzle board as long as it is configured for improving the structural strength of the board assembly and/or forming the drawer cavity together with the puzzle plate.

The first main supporting wall 311 comprises a right first part 3111 connected with the first inner supporting wall 315, a left first part 3112 connected with the second inner supporting wall 316 and spaced apart from the right first part 3111 for forming a first opening 3113. The first longitudinal cavity 37 is formed by the first and second inner supporting walls 315, 316 together with the third dividing supporting wall 317. The first longitudinal cavity 37 is communicated with the first opening 3113, so that the corresponding puzzle drawer 32 can be slide in-and-out through the first opening 3113. The second main supporting wall 312 comprises a right second part 3121 connected with the first inner supporting wall 315, a left second part 3122 connected with the second inner supporting wall 316 and spaced apart from the right second part 3121 for forming a second opening 3123. The second longitudinal cavity 38 is formed by the first and second inner supporting walls 315, 316 together with the fourth dividing supporting wall 318. The second longitudinal cavity 38 is communicated with the second opening 3123, so that the corresponding puzzle drawer 32 can be slide in-and-out through the second opening 3123.

According to the first embodiment, the four lateral cavities 302 are formed at the transverse sides of the puzzle board 10 respectively. Particularly, the first and second lateral cavities 33, 34 are spacedly formed at each of the transverse sides of the puzzle board 10. The third and fourth lateral cavities 35, 36 are spacedly formed at each of the other transverse sides of the puzzle board 10. In other words, two corresponding puzzle drawers 32 are slidably coupled at each of the transverse sides of the puzzle board 10. Therefore, four puzzle drawers 32 are slidably coupled at the transverse sides of the puzzle board 10. It is worth mentioning that each puzzle drawer 32 is independently actuated to slide in-and-out of the corresponding lateral cavity 302. Since the puzzle drawers 32 are slidably coupled at the transverse sides of the puzzle board 10, each puzzle drawer 32 is relatively long enough and each drawer cavity 31 is deep enough to retain the puzzle drawer 32 therein so as to prevent the puzzle drawer 32 being slid out of the drawer cavity 31 accidentally or unintentionally when moving the puzzle board 10 on the playing surface. Accordingly, a length of each puzzle drawer is slightly smaller than half of the length of the puzzle board between the transverse sides thereof.

Each of the puzzle drawer 32 comprises a rectangular bottom panel 321 slidably received in the corresponding drawer cavity 31, a front panel 322 extending from the bottom panel 321, a back panel 323 extending from the bottom panel 321 and opposite to the front panel 322, a pair of side panels 324 extending from the bottom panel 321 for connected with the front panel 322 and the back panel 323.

Optionally, each of the puzzle drawer 32 further comprises an anti-slipping layer 325 attached the bottom panel 321 for preassembling a group of puzzle pieces 100 to form a section of the puzzle figure and storing the puzzle pieces 100. Each of drawer cavity 302 comprises a gap 326 formed between the pair of side panels 324 and the corresponding supporting portion 301, thereby reducing the friction between the pair of side panels 324 and the corresponding supporting portion 301 when each of the puzzle drawer 32 is pulled and slid out of the corresponding drawer cavity 31.

The supplement arrangement 30 further comprises a drawer holder 304 provided at the puzzle board 10 to retain the puzzle drawers 32 in the drawer cavities 31 respectively. In this embodiment, the drawer holder 304 comprises a first magnetic element 331 provided at an inner wall of the drawer cavity 31 and a second magnetic element 332 provided at the puzzle drawer 32 to magnetically attract with the first magnetic element 331 so as to retain the puzzle drawer 32 in the drawer cavity 31. Due to the magnetically attracting force between the first and second magnetic elements 331, 332, the puzzle drawers 32 are held within the drawer cavities 31 respectively to prevent the puzzle drawer 32 being slid out of the drawer cavity 31 accidentally or unintentionally when moving the puzzle board 10 on the playing place. When a pulling force is applied at one of the puzzle drawers 32 to overcome the magnetically attracting force, the puzzle drawer 32 can be pulled and slid out of the drawer cavity 31.

In this embodiment, the first extending wall 51 is integral with a periphery of the first main supporting wall 311 as a whole for forming a first monolithic portion 55. The first monolithic portion 55 comprises a first receiving space 103 for fixing and receiving the fixing portion 102 of the puzzle board 10. The second extending wall 52 is integral with a periphery of the second main supporting wall 312 as a whole for forming a second monolithic portion 56. The second monolithic portion 56 comprises a second receiving space 104 for fixing and receiving the fixing portion 102 of the puzzle board 10. Optionally, a first monolithic portion further comprises a first fixing space positioned below the first receiving space and formed on the first main supporting wall for fixing and receiving one ends of the first and second inner supporting walls, respectively. A second monolithic portion further comprises a second fixing space positioned below the second receiving space and formed on the second main supporting wall for fixing and receiving another ends of the first and second inner supporting walls. When assembled, one ends of the first and second inner supporting walls are inserted into the first fixing space and are not exposed from the first main supporting wall of the first monolithic portion. Another ends of the first and second inner supporting walls are inserted into the second fixing space and are not exposed from the second main supporting wall of the second monolithic portion. The first receiving space is parallel to the first fixing space. The second receiving space is parallel to the second fixing space.

Figure 7:
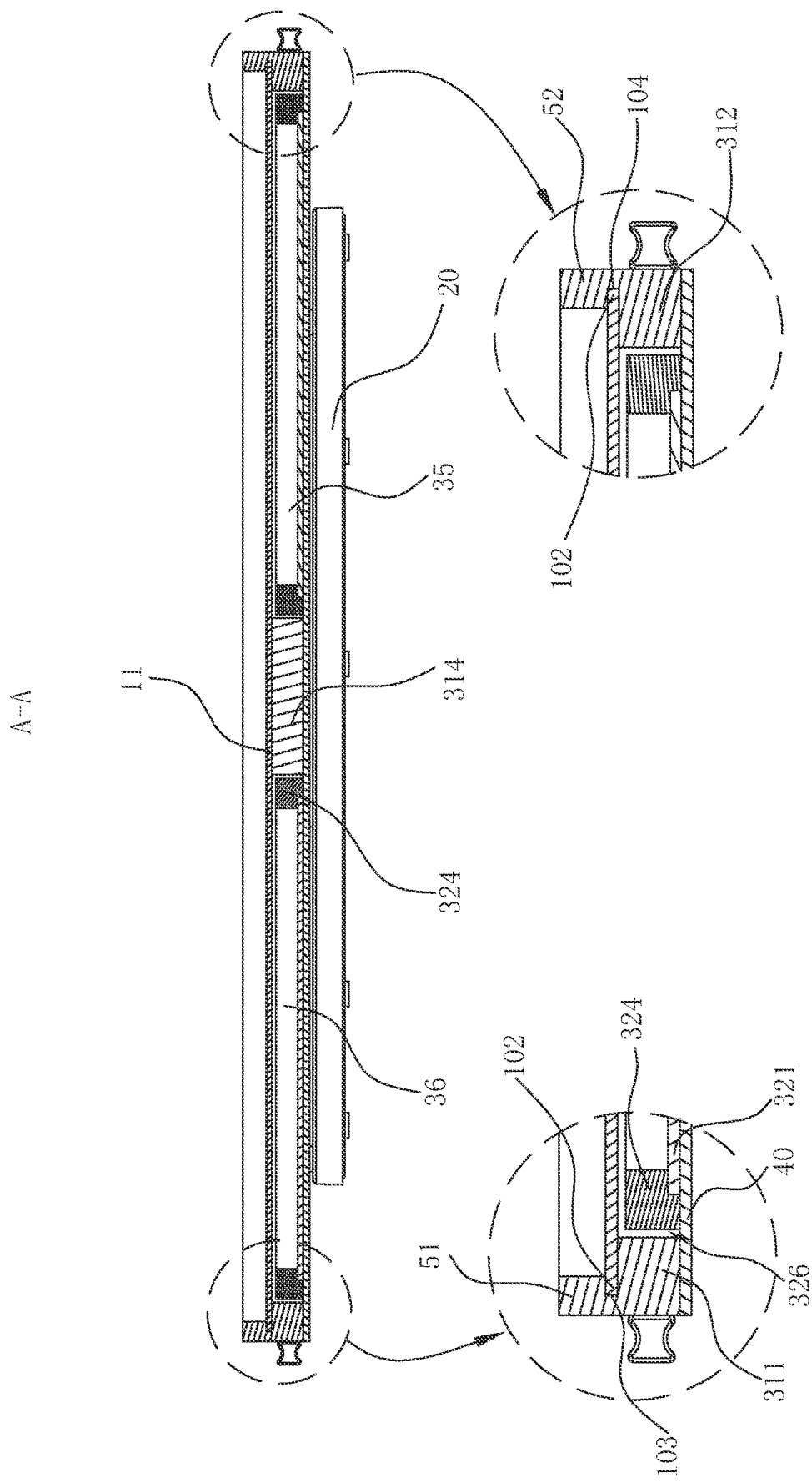
FIG. 7 is a cross-sectional view of the movable puzzle platform taken along line A-A of FIG. 1.
Figure 8:
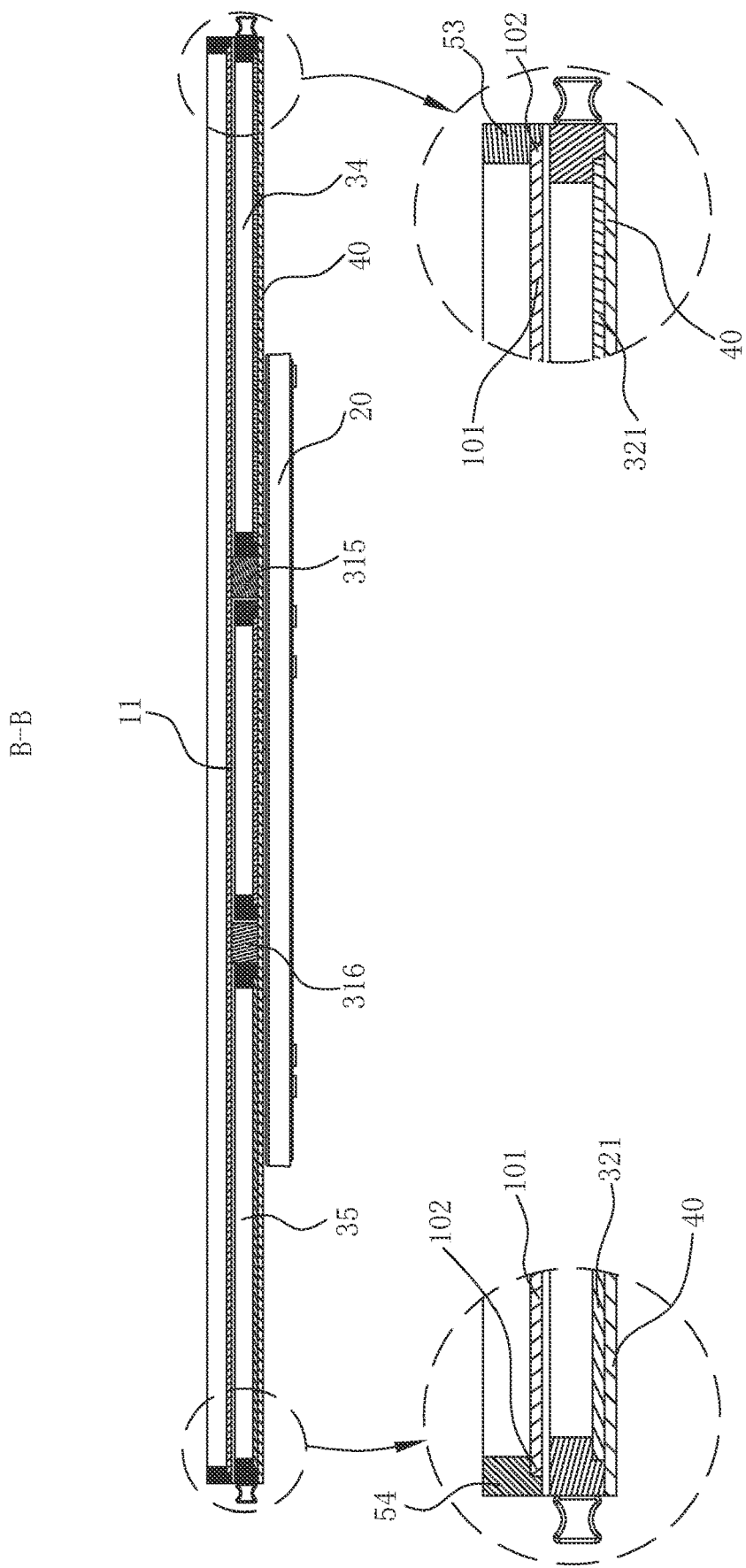
FIG. 8 is a cross-sectional view of the movable puzzle platform taken along line B-B of FIG. 1.
Figure 9:
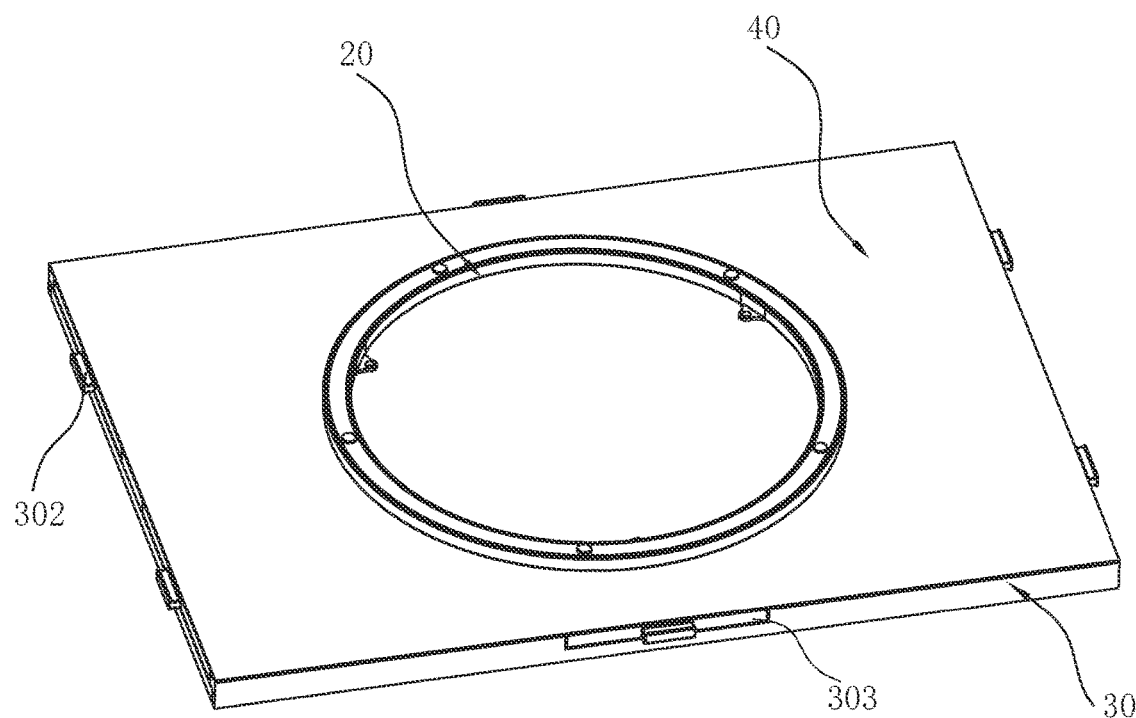
FIG. 9 is an illustrative isometric view of the movable puzzle platform shown in FIG. 1, but from another aspect.
Figure 10:
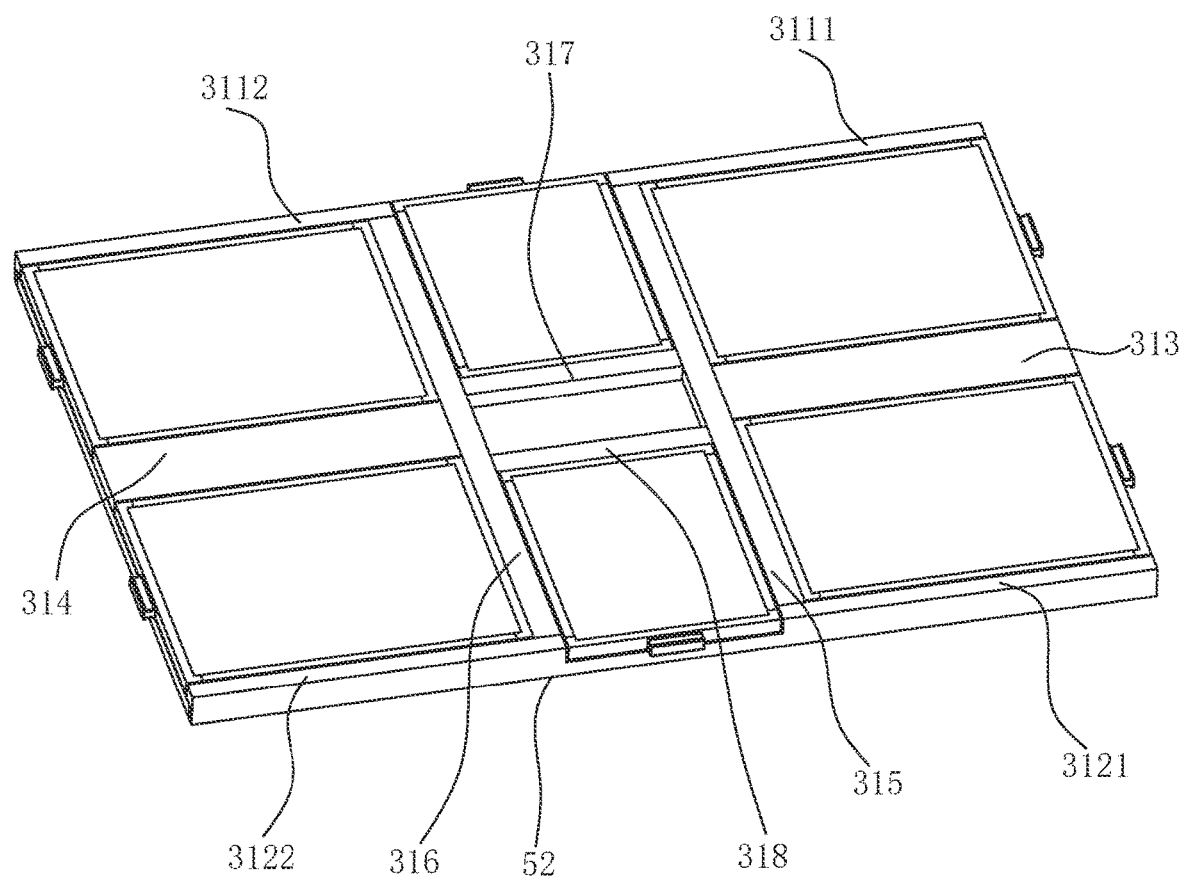
FIG. 10 is an illustrative isometric view of the movable puzzle platform shown in FIG. 1, a base and the rotating assembly thereof being removed away.

Therefore, the combination of the first extending wall 51, the puzzle board 10 and the first main supporting wall 311 is stable and reliable. The combination of the second extending wall 52, the puzzle board 10 and the second main supporting wall 312 is stable and reliable. The combination of first and second inner supporting walls 315, 316 and the first and second main supporting wall 311, 312 is stable and reliable. The side of the fixing portion 102 is accommodated in the first and second receiving spaces 103, 104, which is not exposed from the first and second monolithic portions 55, 56, thus can avoid the puzzle board 10 being removed from the restricting wall 50 and the first and second main supporting walls 311,312 under larger exterior impact, or under the condition of failure in gluing. The third extending wall 53 is directly stacked on the fixing portion 102 of the puzzle board 10 and the fourth extending wall 54 is directly stacked on the fixing portion 102 of the puzzle board 10. The third and fourth extending walls are stacked on the fixing portion 102 of the puzzle board 10 by suitable chemical or mechanical methods such as but not limited to glue or wood screws, respectively. When assembled, the side of the fixing portion 102 is exposed out of the third and fourth extending walls 53, 54, thus reducing difficulties in assembling of the movable puzzle platform and improving manufacturing efficiency. Referring to FIGS. 7-8, an upper surface of the puzzle plate 101 is coplanar with respect to an upper surface of the fixing portion 102. A thickness of the puzzle plate 101 is substantially equal to a thickness of the fixing portion 102. The puzzle plate 101 is integral with the fixing portion 102 as a whole.

Figure 5:
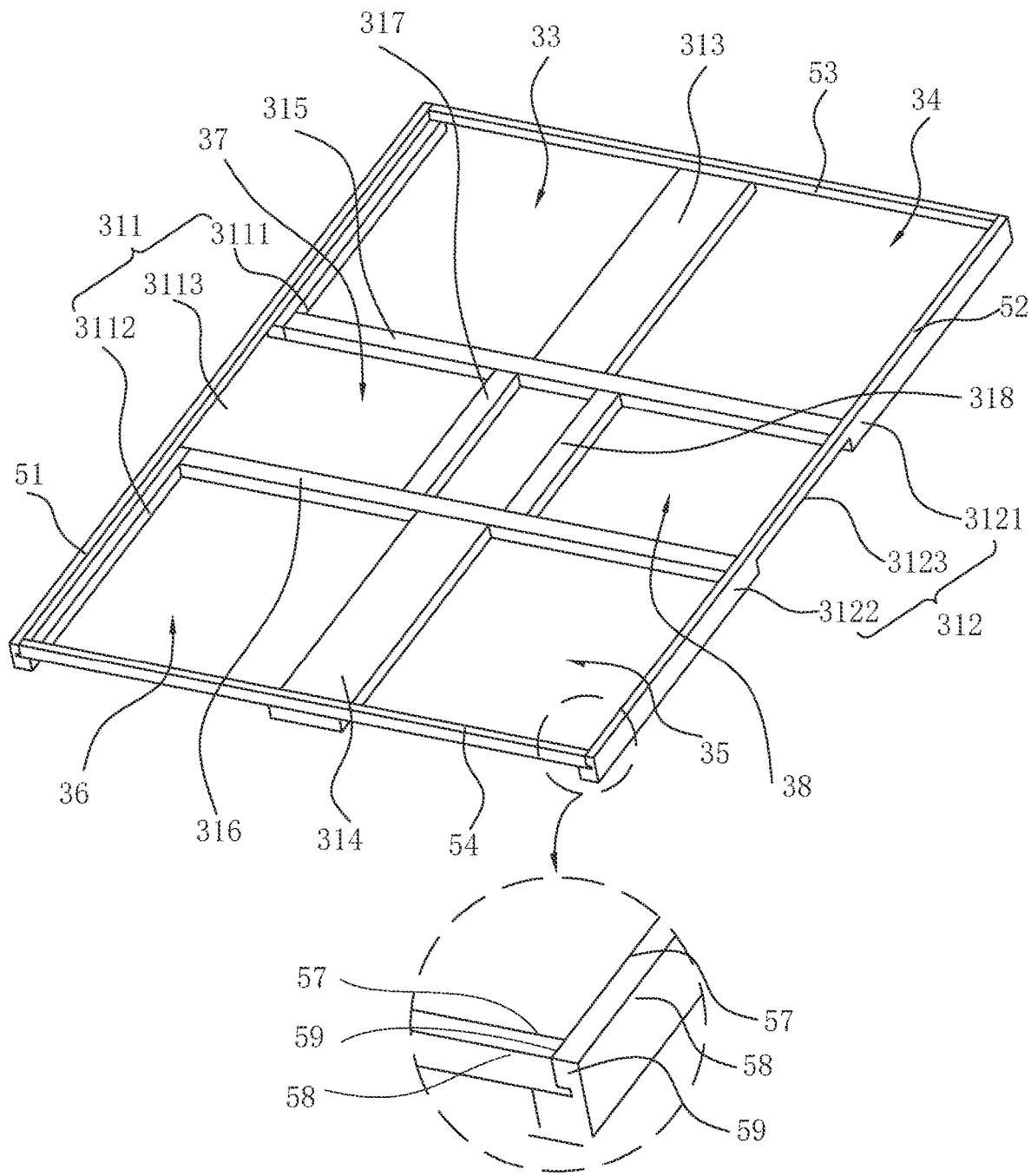
FIG. 5 is an illustrative isometric view of a restricting wall and a supporting portion of the movable puzzle platform shown in FIG. 1.
Figure 6:
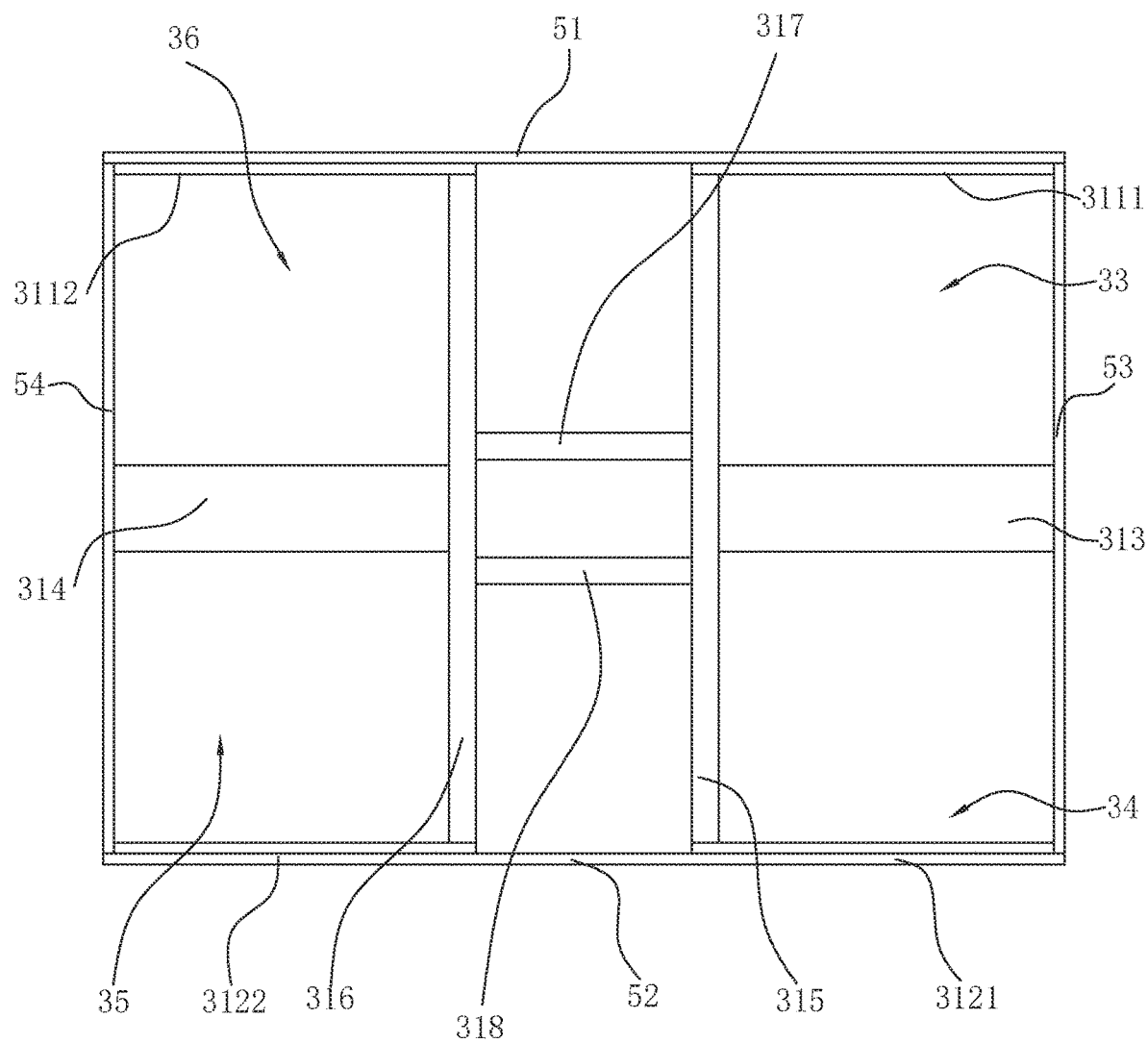
FIG. 6 is an illustrative isometric view of the restricting wall and the supporting portion of the movable puzzle platform shown in FIG. 1, but from another aspect.

Referring to FIGS. 5 and 11, each of extending walls comprises an inner surface 57, an outer surface 58 opposite to the inner surface 57, and a pair of side surfaces 59 connecting the inner and outer surfaces 57, 58. The side surface of one extending wall is engaged with the inner surface of the adjacent extending wall. Particularly, the side surface of the third and fourth extending walls are engaged with the inner surface of the adjacent first and second extending walls, respectively. In other words, the side surface of extending wall extending along the lateral direction Y is engaged with the inner surface of the adjacent extending wall extending along the longitudinal direction X. The longitudinal side surface is exposed from the adjacent extending wall. The third extending wall 53 comprises a third extending body 531 and a pair of third fastening portions 532 projecting from two ends of the third extending body 531 and inserted and fixed in the first and second receiving spaces 103, 104 for improving the structural strength of the movable puzzle platform 1. The fourth extending wall 54 comprises a fourth extending body 541 and a pair of fourth fastening portions 542 projecting from two ends of the fourth extending body 541 and inserted and fixed in the first and second receiving spaces 103, 104 for improving the structural strength of the movable puzzle platform 1. Optionally, a fastening portion may be provided on the longitudinal extending wall and a receiving space may be provided on the lateral extending wall for receiving and fixing the fastening portion.

The first extending wall 51 and/or the first main supporting wall 311 are/is made of plastic, wood, or metal. When the first extending wall 51 is made of plastic by molding, the first main supporting wall 311 is preferred to be integrally molded on the first extending wall 51 as a whole. When the first extending wall 51 is made of metal by stamping, the first main supporting wall 311 is preferred to be integrally molded on the first extending wall 51 as a whole. If the first extending wall 51 and/or the first main supporting wall 311 are/is made of aluminum, the weight of the movable puzzle platform 1 can be reduced. If the first extending wall 51 and/or the first main supporting wall 311 are/is made of stainless steel or tempered steel, the structural strength of the movable puzzle platform 1 can be improved. If the first extending wall 51 and/or the first main supporting wall 311 are/is made of plastic or wood, the manufacturing cost of the movable puzzle platform 1 can be reduced. The second extending wall 52 has the same structure as the first extending wall 51 and the second main supporting wall 312 has the same structure as the first main supporting wall 311.

The base 40 is assembled with the supporting portion 301 of the supplement arrangement 30 for supporting the movable puzzle platform 1 on the playing place such as a table surface, a wall surface, a floor surface, and the like or even a support frame for supporting the movable puzzle platform 1 on ground. The base 40 is generally the type of one-piece with a whole entirety platy shape and have a rectangular shape for matching and covering the supporting portion 301. In this embodiment, the bottom panel 321 of each of the puzzle drawer 32 is mounted on the base 40 and slid on the base 40 directly. So, the base is configured not only holding the puzzle drawer 32 and preventing the puzzle drawer 32 from falling off the supporting portion 301, but also for allowing each of the puzzle drawer 32 to be slid in-and-out of the corresponding drawer cavity 31. The base 40 is stacked on the supporting portion 301 by suitable chemical or mechanical methods such as but not limited to glue or wood screws. Optionally, a base is integral with at least a part of the supporting portion of the supplement arrangement as a whole for forming a stable and reliable structure.

As shown in FIG. 2, the puzzle board 10 further comprises an anti-slipping layer 14 overlappedly provided on the playing surface 11 for preventing the puzzle pieces 100 being slipped thereon. Preferably, the anti-slipping layer 14 has a self adhesive bottom surface adhered on the playing surface 11, wherein the anti-slipping layer 14 can be removed from the playing surface 11 without damaging the playing surface 11 and the anti-slipping layer 14. Therefore, the anti-slipping layer 14 is reusable to place on the playing surface 11. Furthermore, the anti-slipping layer 14 serves as a backing layer of the puzzle pieces 100 after the puzzle pieces 100 are assembled.

It is appreciated that electronic puzzle game is provided as software or APP that the user or player can play the puzzle game with a display such as a TV screen, LED screen or computer monitor. However, the player may generally use a smaller screen to play because a relatively larger screen such as 50" or more TV screen supported on a playing surface is difficult for the player to reach all sizes of the screen. In one alternative embodiment, the puzzle board 10 can be embodied as an electronic screen, such as a TV display or LED screen, and the playing surface 11 is the screen surface that serves as puzzle floor for the player to select and put puzzle piece images together, wherein the rotating assembly 20 is mounted to the bottom of the electronic board assembly 90 for allowing the electronic board assembly 90 to smoothly slide on the playing place that provides accessibility for moving the electronic board assembly 90 at different planar directions with respect to the playing place.

As shown in FIGS. 2, 9 and 13-15, the rotating assembly 20 comprises a first moving member 21 coupled at the base 40 and a second moving member 22 rotatably coupled to the first moving member 21. It is worth mentioning that the rotating assembly 20 is preferred to be coupled coaxially with a center of gravity of the board assembly 90, for example at a center portion of the board assembly 90, such that the board assembly 90 can be moved on the playing place in a balancing manner.

According to this embodiment of the present invention, the board assembly 90 is adapted for being self-rotated 360° on the playing place via a rotation movement between the first and second moving members 21, 22. In other words, the user is able to selectively rotate the board assembly 90 from one longitudinal side to another opposed longitudinal side or to any one of the shorter transverse sides without walking around the board assembly 90. For example, the user is able to assemble one puzzle piece 100 at one side of the board assembly 90 and to rotate the board assembly 90 at 180° in order to assembly another puzzle piece 100 at an opposed side of the board assembly 90, so as to speed up the assembling time of the puzzle pieces 100. It should be understood that a rotating angle of the puzzle board 10 can be adjusted to be smaller than 360°.

In this embodiment, the rotating assembly 20 is detachably coupled at the base 40. As shown in FIGS. 2, 9 and 13-15, the rotating assembly 20 comprises a plurality of coupling members 25 extended from the first moving member 21 to detachably couple at the base 40. Preferably, the coupling members 25 are integrally extended from an inner circumferential surface of the first ring member, i.e. the first moving member 21, wherein each of the coupling members 25 has a coupling slot formed thereon to detachably couple at the base 40 by inserting screws through the coupling slot to the base 40. It is worth mentioning that a plurality of screw holes are formed at the base 40, such that the screws can engage with the screw holes through the coupling slot to couple the rotating assembly 20 at the base 40.

The rotating assembly 20 further comprises a second bearing unit 24 provided at a bottom side of the second moving member 22 for sliding the puzzle board 10 on the playing surface at different planar directions via the second moving member 22. Via the second bearing unit 24 at the second moving member 22, the puzzle board 10 is able to selectively slide on the playing place at any direction with respect to the XY coordinate surface. Via the first bearing unit 23, the puzzle board 10 is able to selectively rotate on the playing surface with respect to XY coordinate surface. In other words, the puzzle board 10 is able to freely move at XY coordinate surface, so as to adjust the planer angle of the puzzle board 10 with respect to the user conveniently.

Figure 14:
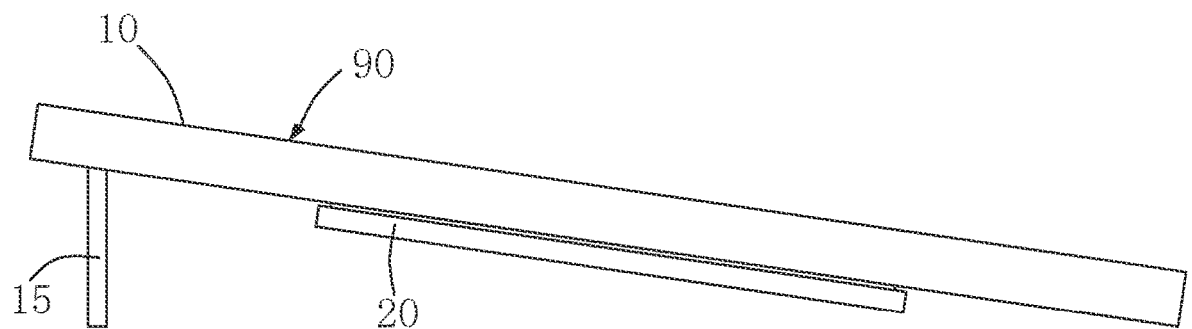
FIG. 14 is a side view of the movable puzzle platform according to the above preferred embodiment of the present invention, illustrating a kickstand being pivotally folded to support the puzzle board at an inclined manner on a playing surface.
Figure 17:
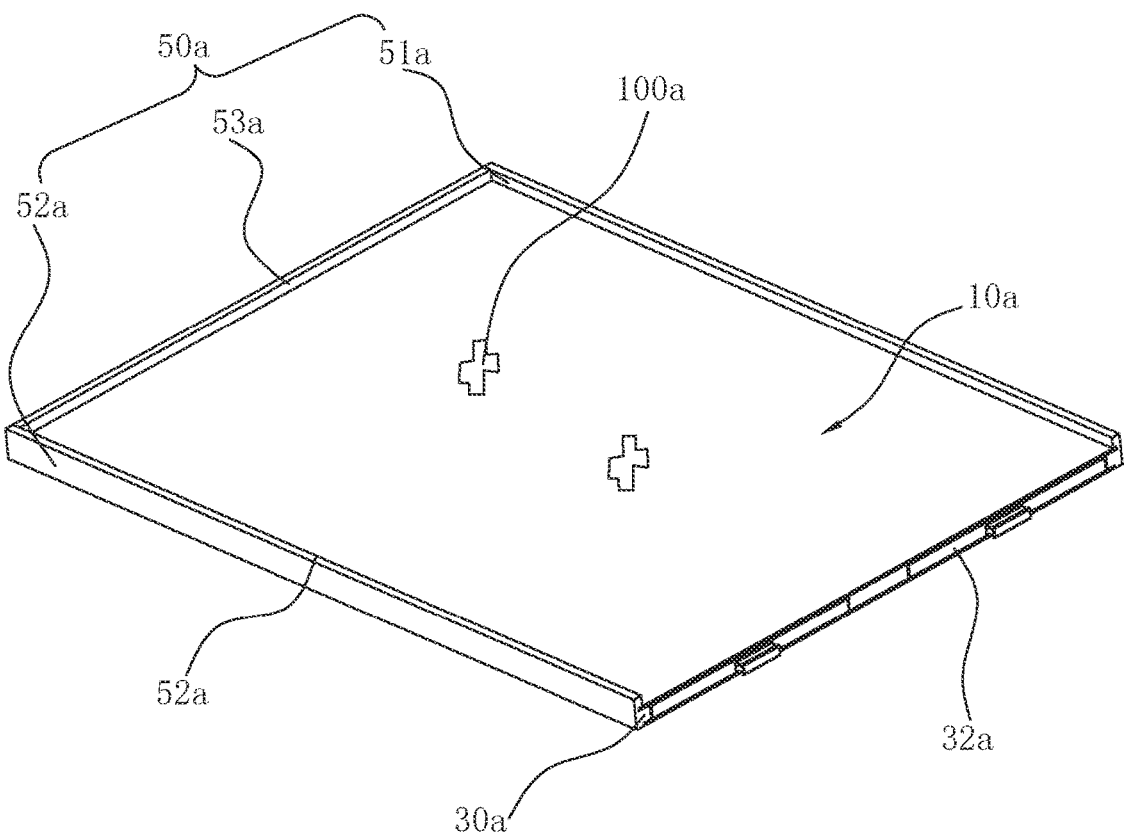
FIG. 17 is an illustrative isometric view of the movable puzzle platform shown in FIG. 16, but from another aspect.
Figure 18:
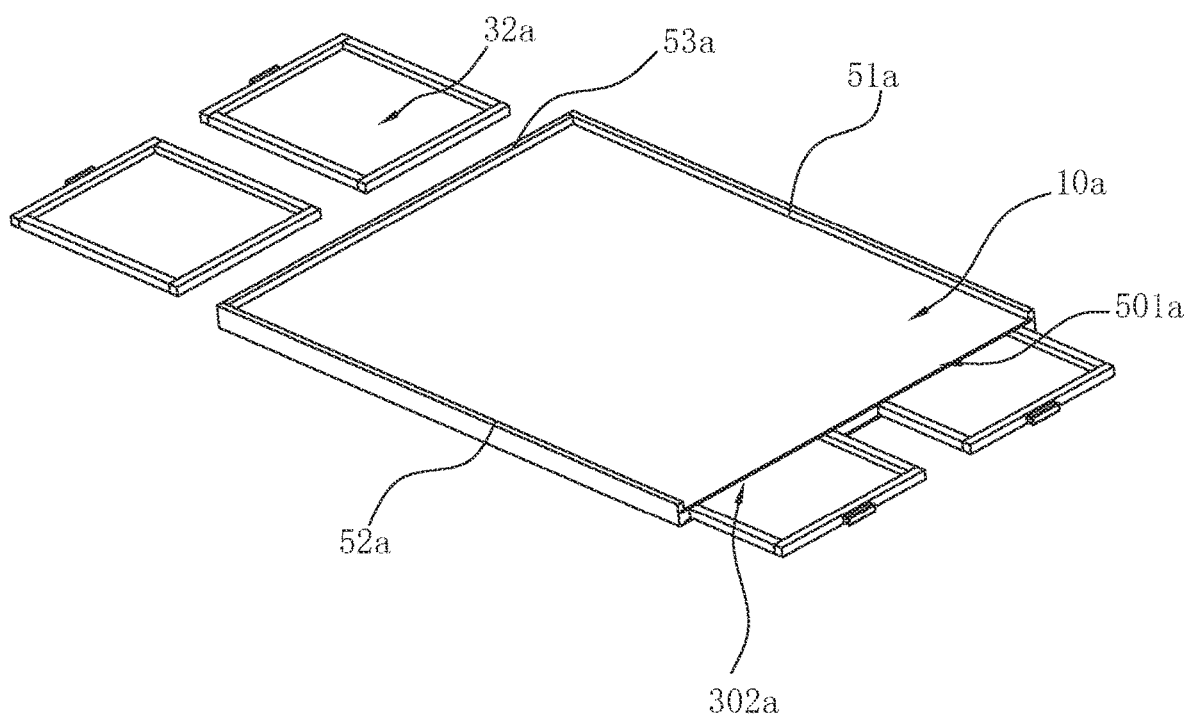
FIG. 18 is an illustrative isometric view of the movable puzzle platform shown in FIG. 16, puzzle drawers thereof being partially pulled out of a corresponding drawer cavity.
Figure 19:
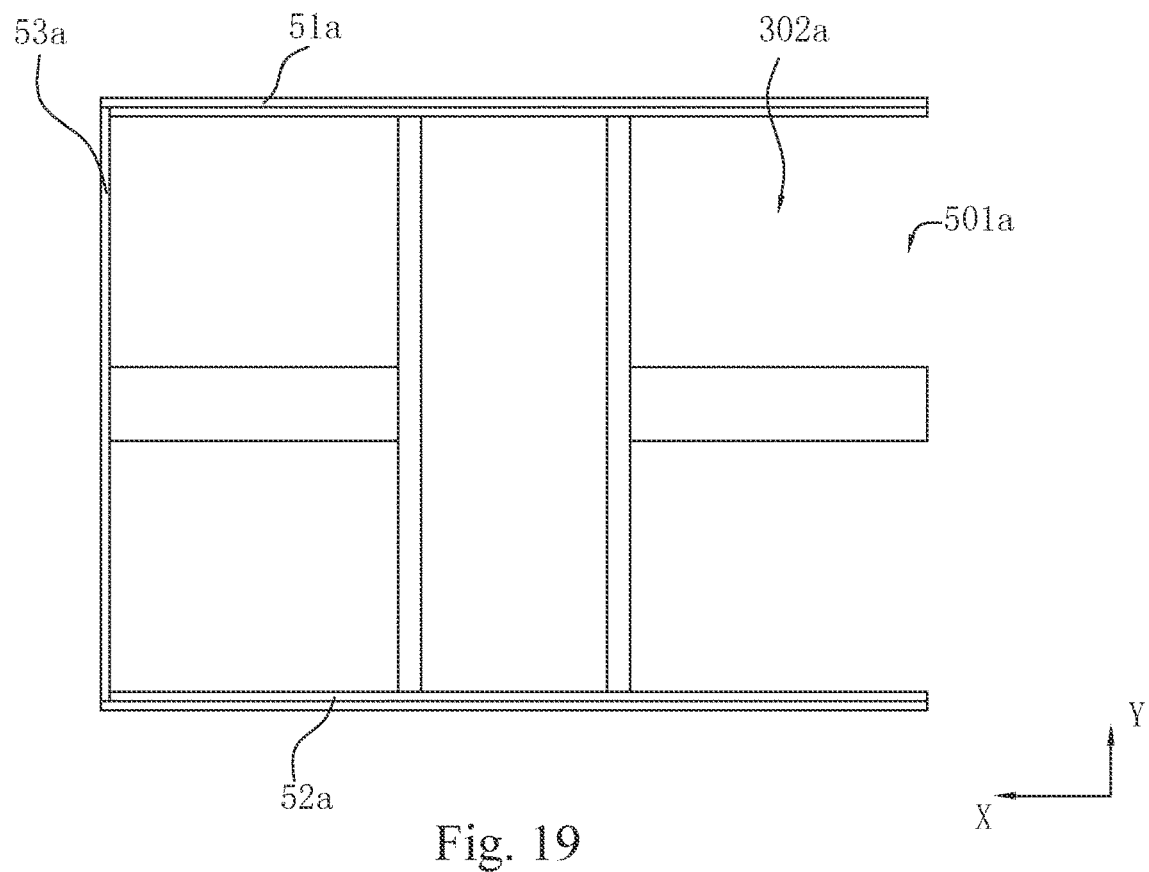
FIG. 19 is an illustrative isometric view of a restricting wall and a supporting portion of the movable puzzle platform shown in FIG. 16.

Alternatively, as shown in FIG. 14, the movable puzzle platform 1 further comprises a kickstand 15 pivotally coupled at the board assembly 90. Particularly, one end of the kickstand 15 is pivotally coupled at the board assembly 90 while a free end of the kickstand 15 is adapted to pivotally fold from the board assembly 90 to support on the playing surface. Therefore, when the kickstand 15 is pivotally folded on the board assembly 90, the board assembly 90 is movable on the playing surface via the rotating assembly t 20 and the kickstand is in a non-working state. When the kickstand 15 is pivotally folded for supporting on the playing surface, the puzzle board 10 of the board assembly 90, the puzzle drawer 32 and the rotating assembly 20 is inclined and supported on the playing surface and the kickstand 15 is in a non-working state. The kickstand 15 cooperates with at least a part of the board assembly 90 for supporting the board assembly 90 on the playing surface, and the board accessible unit is in a non-working state. The rotating assembly 20 and the kickstand 15 are located on a same side of the board assembly 90. The rotating assembly 20 is separated from the kickstand 15 along an extension direction of the puzzle board 10. The movable puzzle platform 1 further comprises a space formed between the rotating assembly 20 and the kickstand 15 to supply sufficient folding space for the kickstand 15. When the kickstand 15 is pivotally folded for supporting on the playing surface, the rotating assembly 20 is spaced from the playing surface.

The rotating assembly 20 is coupled with the base 40 and made of plastic or metal and so on. In this embodiment, the first and second moving members 21, 22 are first and second ring members respectively coaxially engaged with each other. In other words, a diameter of the first moving member 21 is smaller than a diameter of the second moving member 22. The rotating assembly 20 further comprises a first bearing unit 23 coupled between the first and second moving members 21, 22, such that when the first moving member 21, i.e. the first ring member, is rotated within the second moving member 22, i.e. the second ring member, the board assembly 90 is self-rotated 360° on the playing place. Particularly, an outer circumferential surface of the first moving member 21 is engaged with an inner circumferential surface of the second moving member 22 via the first bearing unit 23 to enable the second moving member 22 being coaxially rotated with respect to the first moving member 21.

The rotating assembly 20 further comprises a plurality of friction pads 28 intervally attached on the second moving member 22 for enhancing relative friction between the second moving member 22 and the playing place and ensuring the position of the movable puzzle platform 1, so that the board assembly 90 is in rotatable state. The rotating assembly with friction pads is easy to conveniently control the board assembly compared with castors or other similar swivel-type wheels attached on the board assembly.

FIGS. 16-19 show a movable puzzle platform 1a of a second embodiment of the present invention. A movable puzzle platform 1a according to the second embodiment of the present invention is illustrated, wherein the movable puzzle platform 1a is arranged for a user or a player to assemble a plurality of puzzle pieces 100a thereon. Accordingly, the movable puzzle platform 1a comprises a board assembly 90a and a rotating assembly 20a attached on the board assembly 90a. The board assembly 90a comprises a puzzle board 10a, a supplement arrangement 30a attached on the puzzle board 10a, a base 40a attached on the supplement arrangement 30a, and a restricting wall 50a upwardly extended from a peripheral edge of the puzzle board 10a.

The second embodiment is similar to the first embodiment of the present invention except that: (1) The restricting wall 50a is generally three-piece type. At least one extending wall can be omitted. In this embodiment, an extending wall located on a shorter transverse side of a puzzle board 10a can be omitted, so the restricting wall 50a is an unclosed structure for forming a surrounding opening 501a. (2) Two longitudinal cavities can be omitted. The supplement arrangement 30a has four lateral drawer cavities 302a and four puzzle drawers 32a received in the corresponding drawer cavity 302a.

In this embodiment, the restricting wall 50a is substantially perpendicular to the puzzle board 10a and comprises a first extending wall 51a mounted on the puzzle board 10a and arranged in the longitudinal direction X, a second extending wall 52a mounted on the puzzle board 10a and spaced apart from the first extending wall 51a, and a third extending wall 53a mounted on the puzzle board 10a and arranged in the lateral direction Y for connected with the adjacent first and second extending walls 51a, 52a. The first and second extending walls 51a, 52a are parallel to each other in the longitudinal direction X. The surrounding opening 501a is configured for providing comfort for the player's arm while using the board assembly 90a while seated at the surrounding opening 501a. The assembled puzzle pieces 100 can be removed out completely via the surrounding opening 501a. It is optional that any one of the four extending walls can be omitted, or any two or three extending walls can be omitted, or all the extending walls can be omitted. The restricting wall 50a can be easily disassembled and reassembled from the puzzle board 10a.

Figure 20:
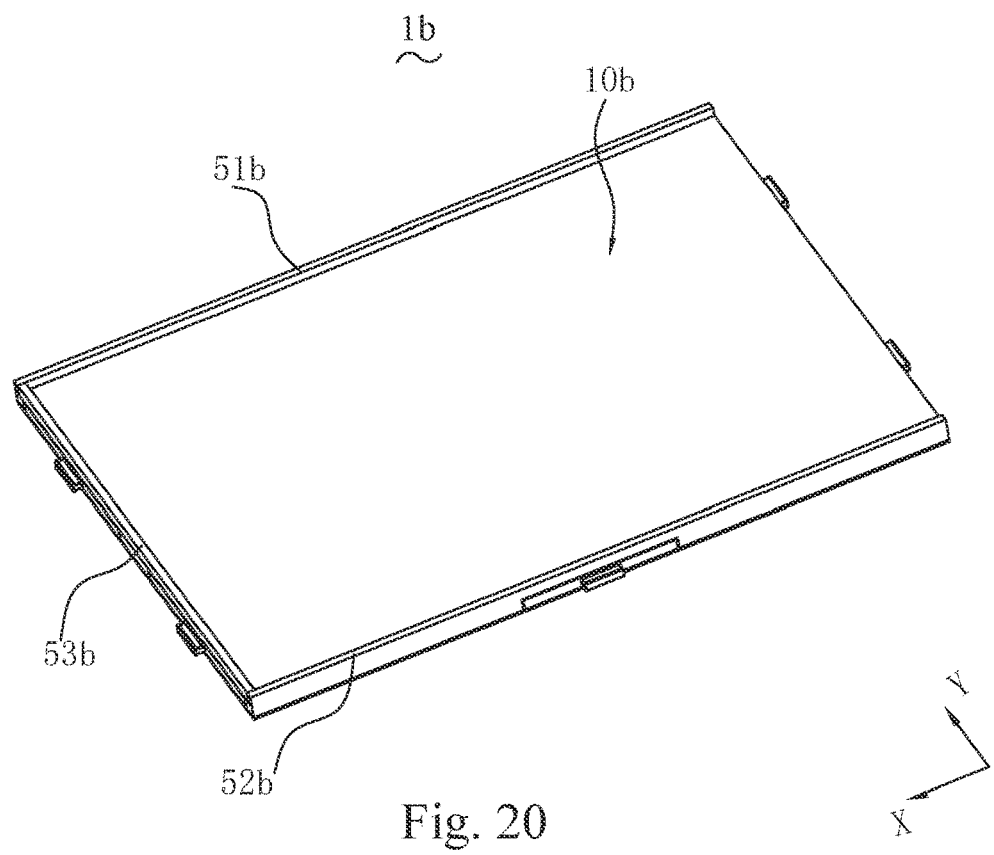
FIG. 20 is an illustrative isometric view of a movable puzzle platform according to a third embodiment of the present invention.
Figure 21:
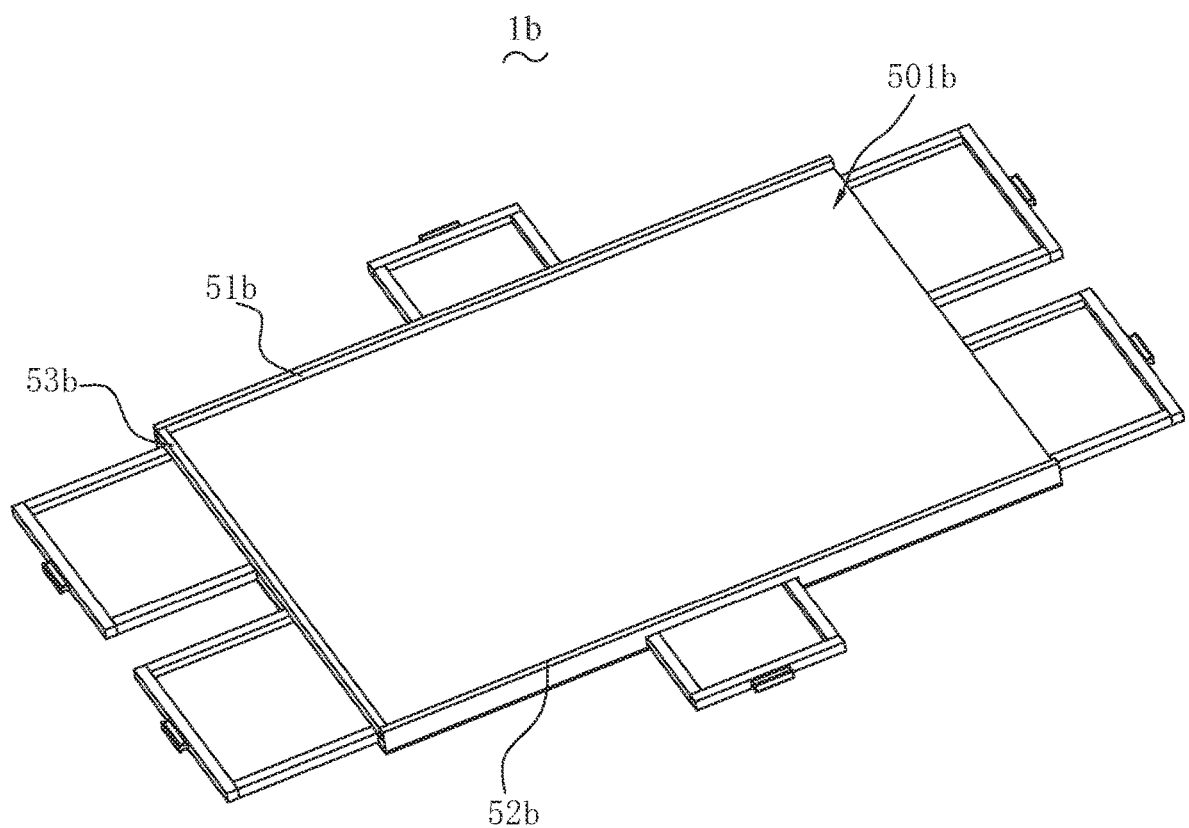
FIG. 21 is an illustrative isometric view of the movable puzzle platform shown in FIG. 20, puzzle drawers thereof being partially pulled out of a corresponding drawer cavity.
Figure 22:
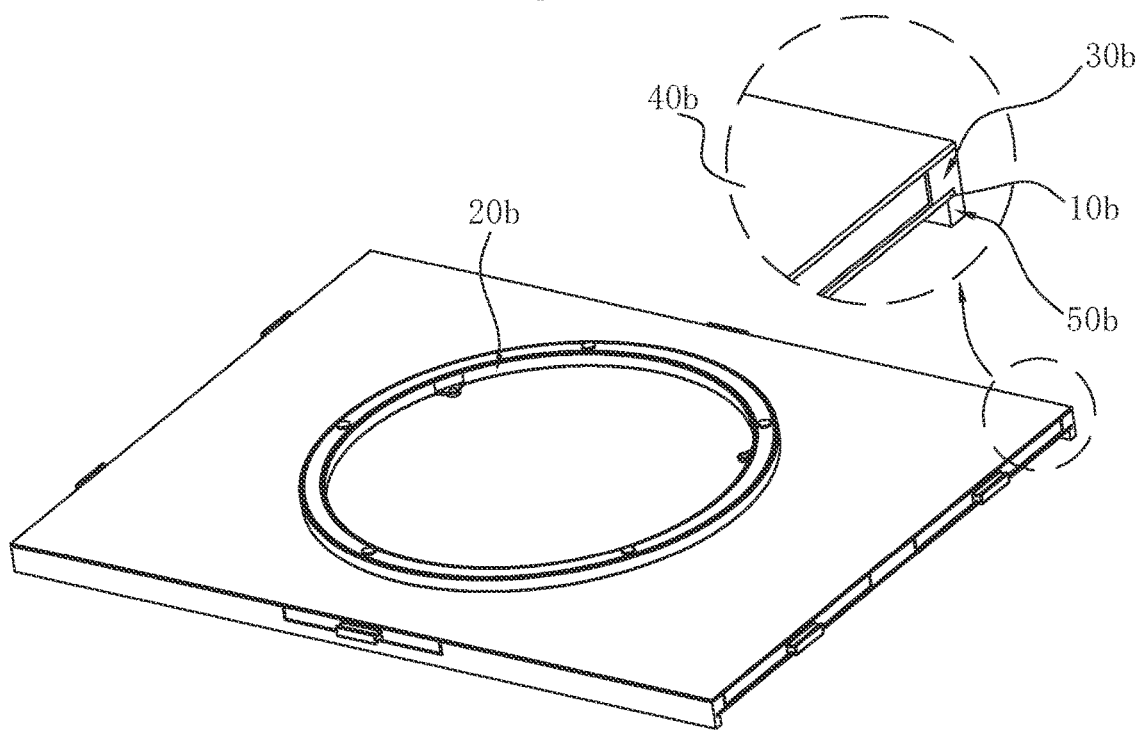
FIG. 22 is an illustrative isometric view of the movable puzzle platform shown in FIG. 20, but from another aspect.
Figure 23:
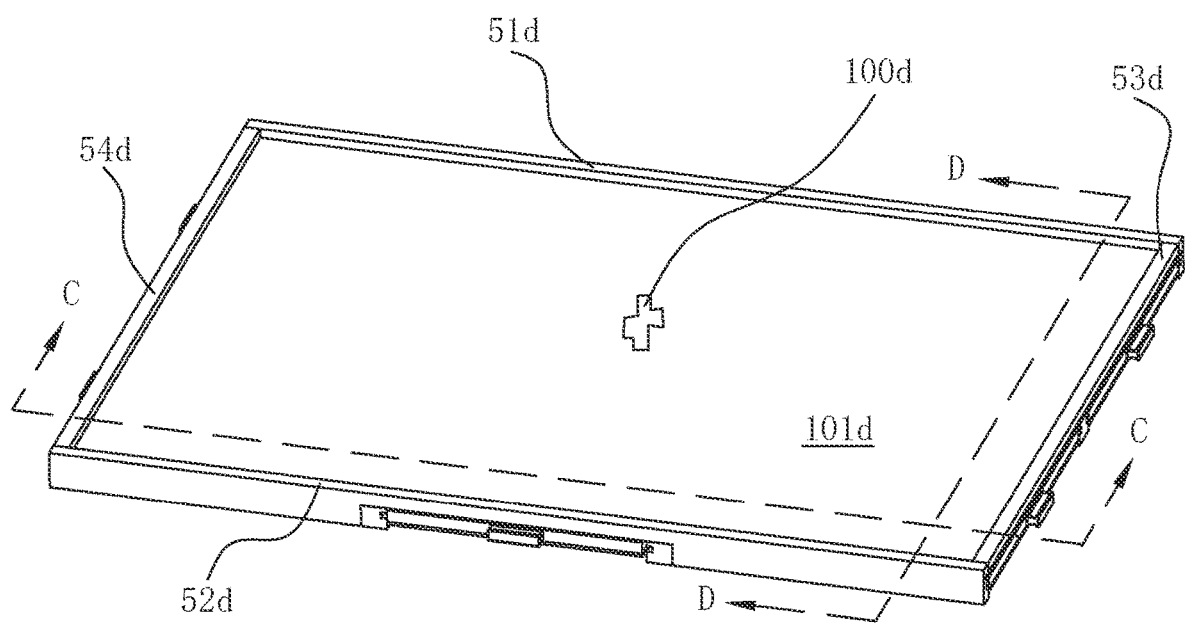
FIG. 23 is an illustrative isometric view of a movable puzzle platform according to a fourth embodiment of the present invention.
Figure 24:
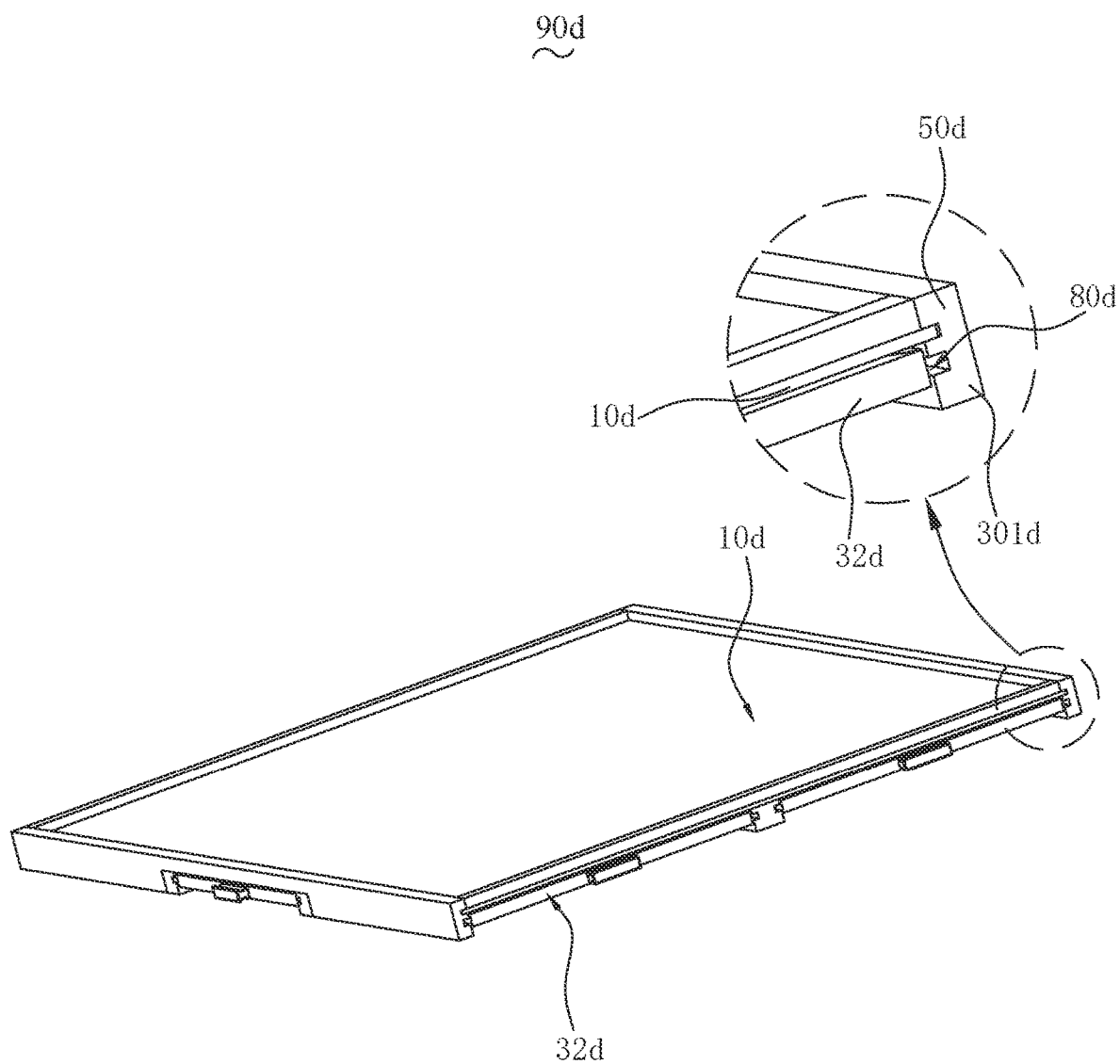
FIG. 24 is an illustrative isometric view of the movable puzzle platform shown in FIG. 23, but from another aspect.
Figure 25:
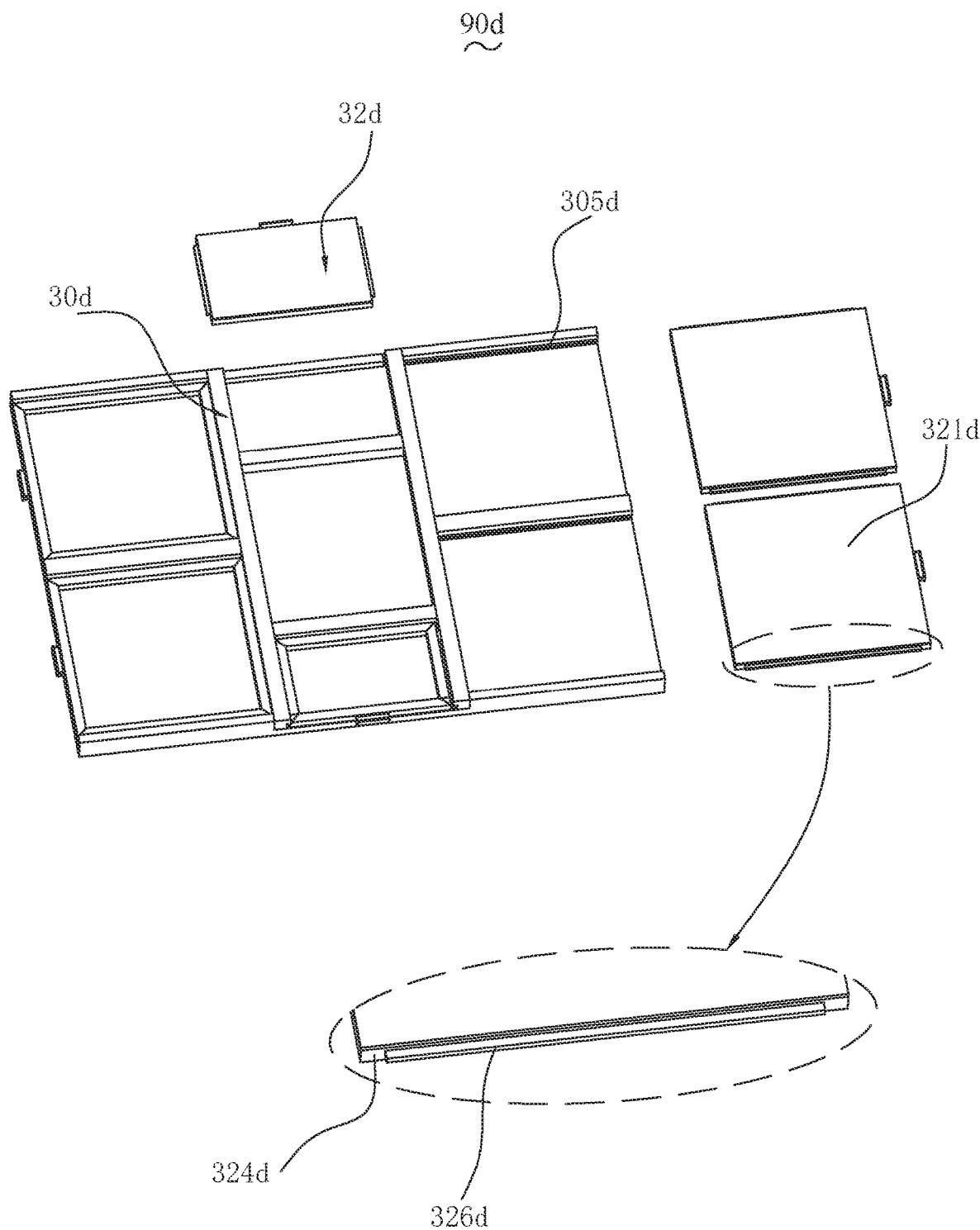
FIG. 25 is an illustrative isometric view of the movable puzzle platform shown in FIG. 23, two puzzle drawers thereof being pulled out of a corresponding drawer cavity.
Figure 26:
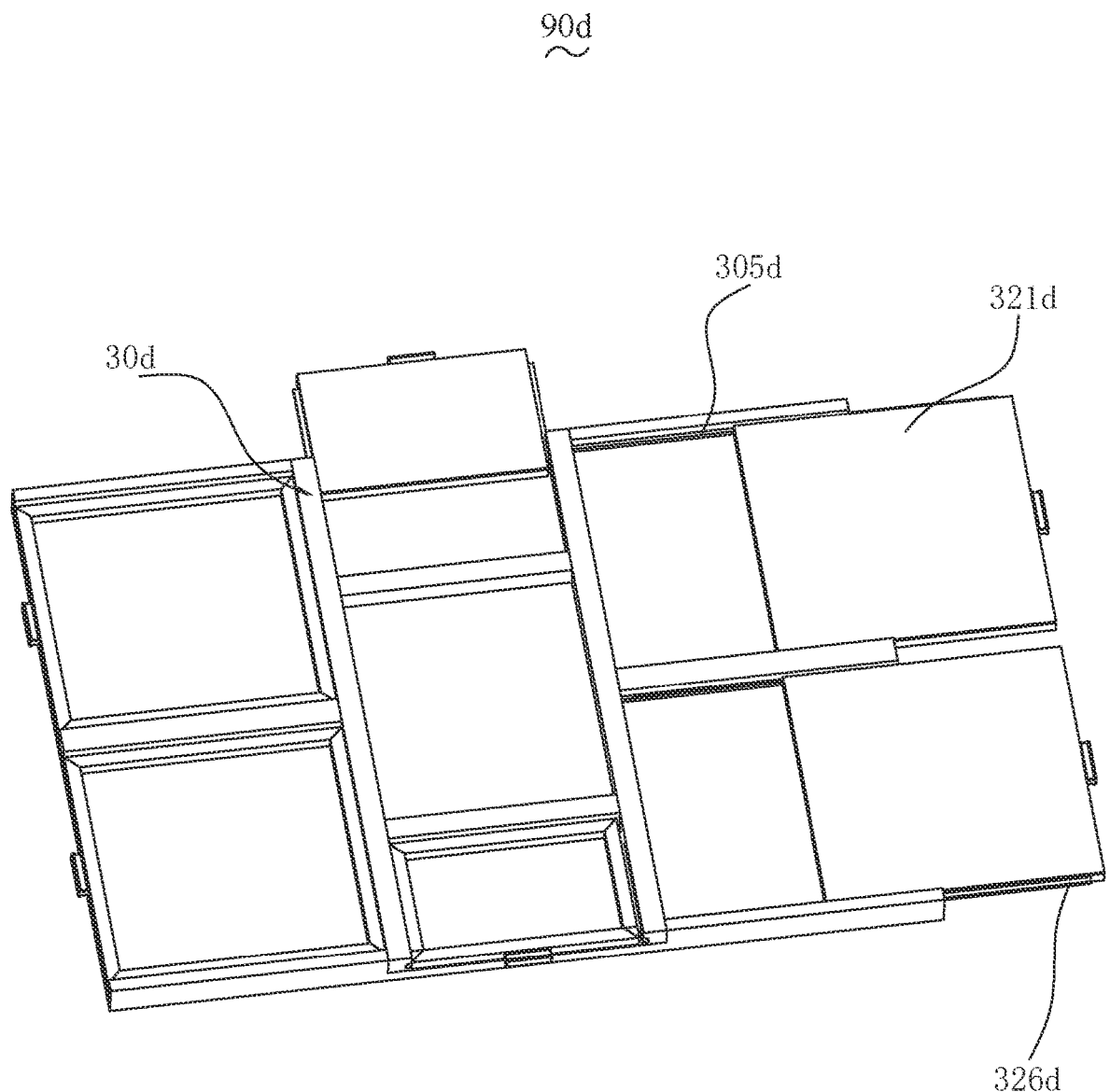
FIG. 26 is an illustrative isometric view of the movable puzzle platform shown in FIG. 23, three puzzle drawers thereof being partially pulled out of a corresponding drawer cavity.
Figure 27:
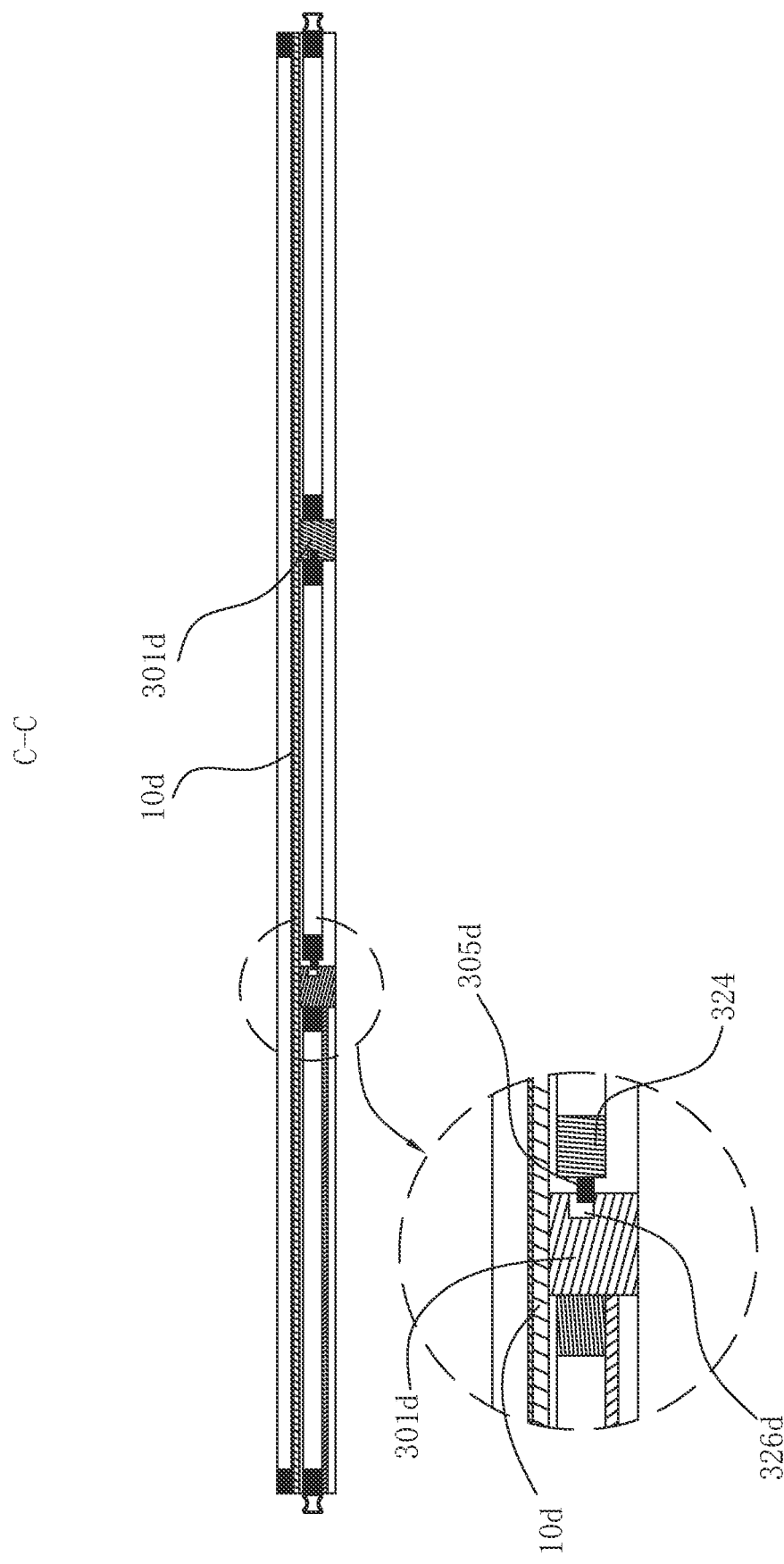
FIG. 27 is a cross-sectional view of the movable puzzle platform taken along line C-C of FIG. 23.
Figure 28:
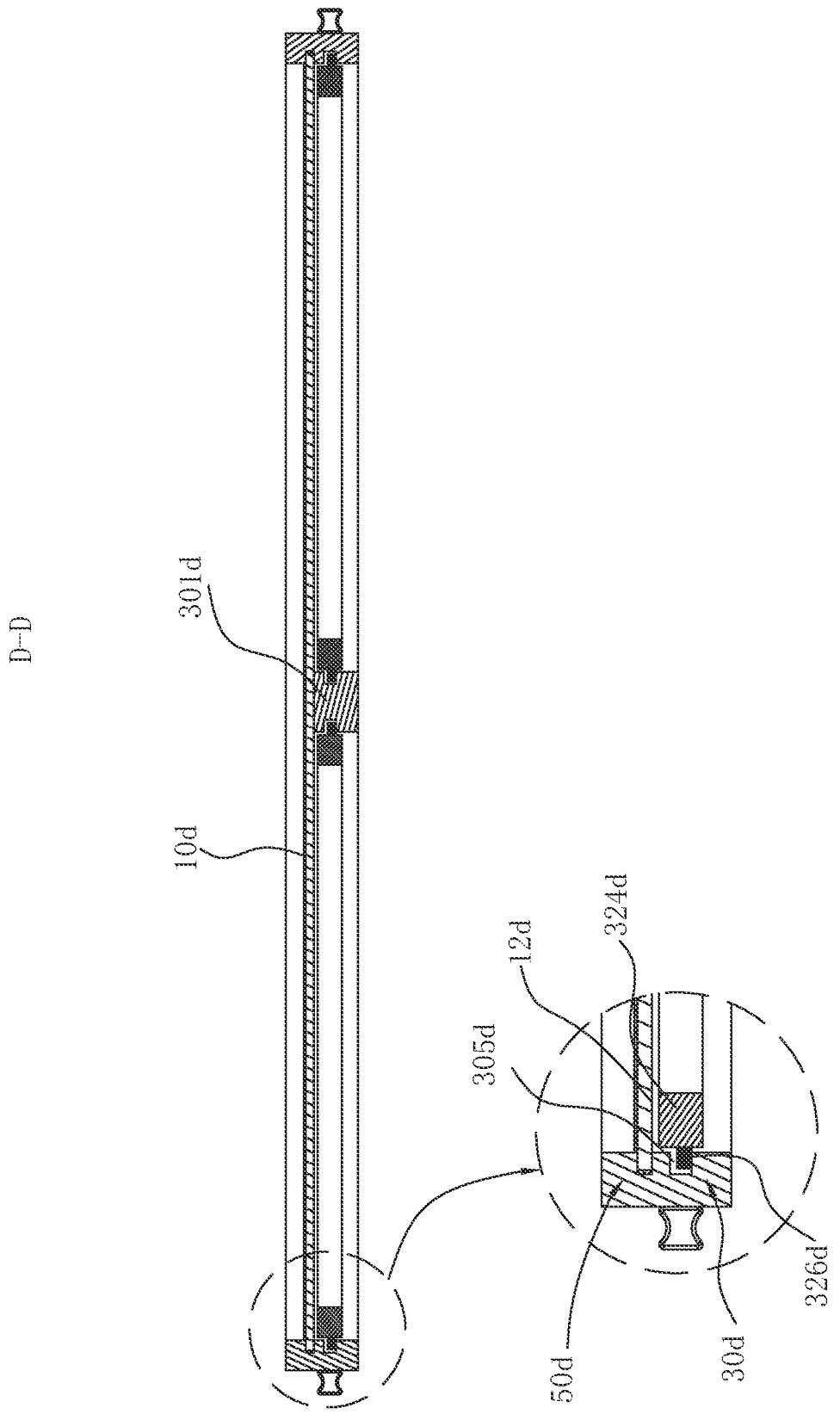
FIG. 28 is a cross-sectional view of the movable puzzle platform taken along line D-D of FIG. 23.
Figure 29:
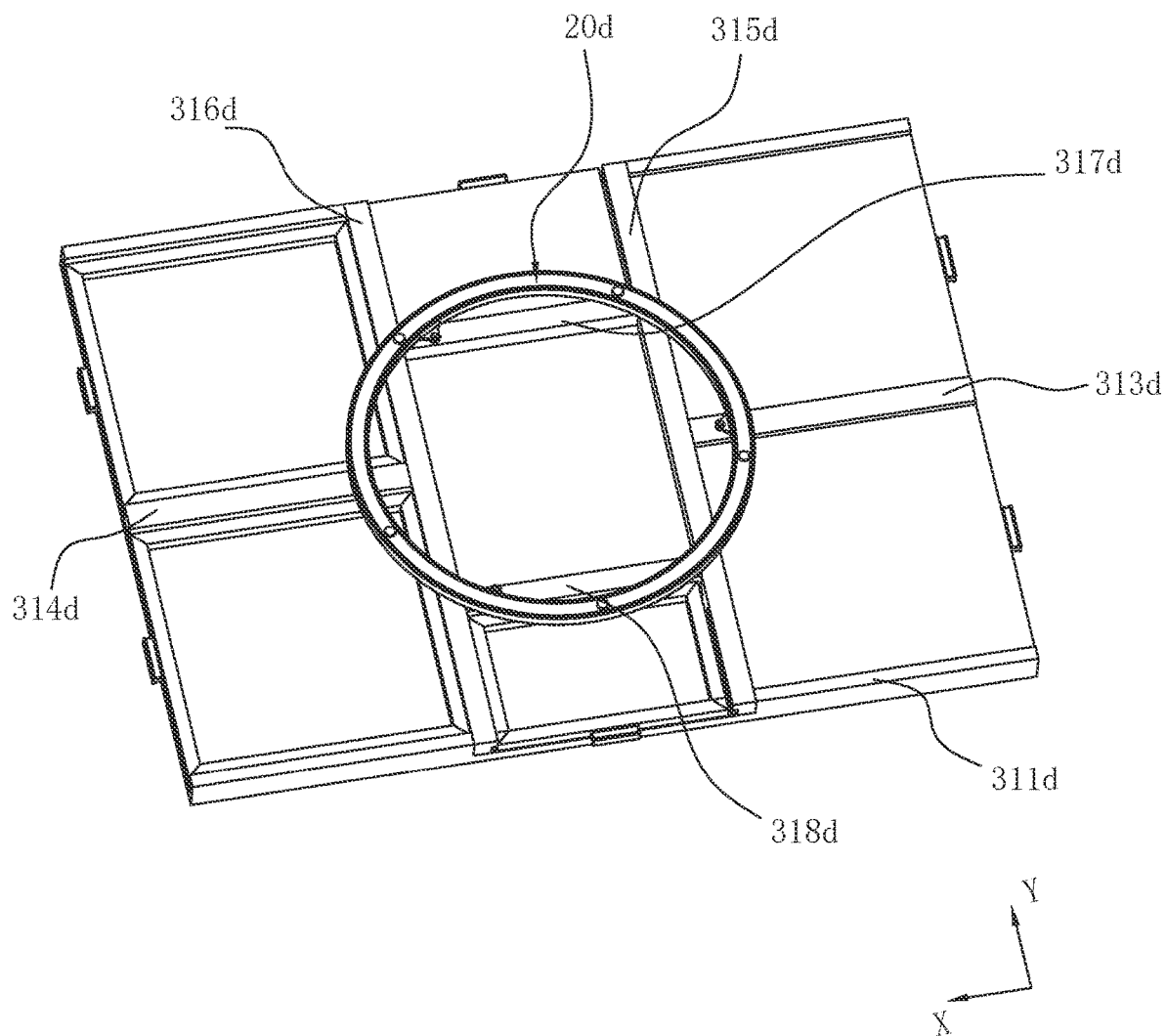
FIG. 29 is an illustrative isometric view of the movable puzzle platform shown in FIG. 23, but from another aspect.
Figure 30:
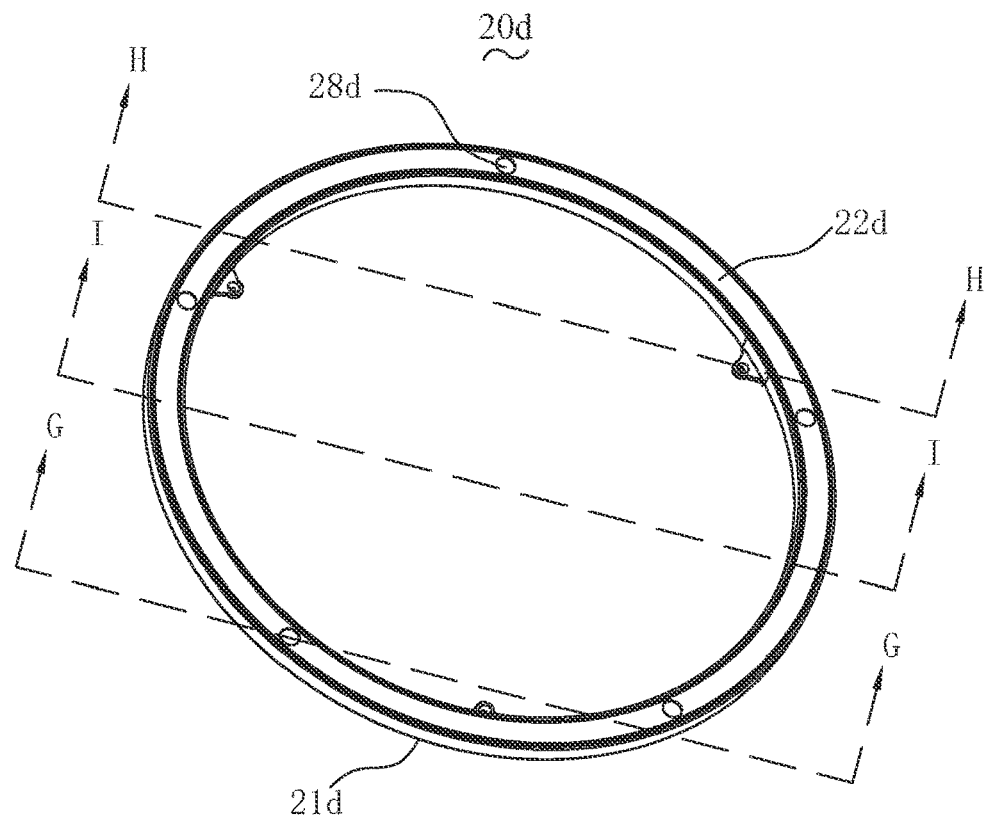
FIG. 30 is an illustrative isometric view of a rotating assembly of the movable puzzle platform shown in FIG. 23.
Figure 31:
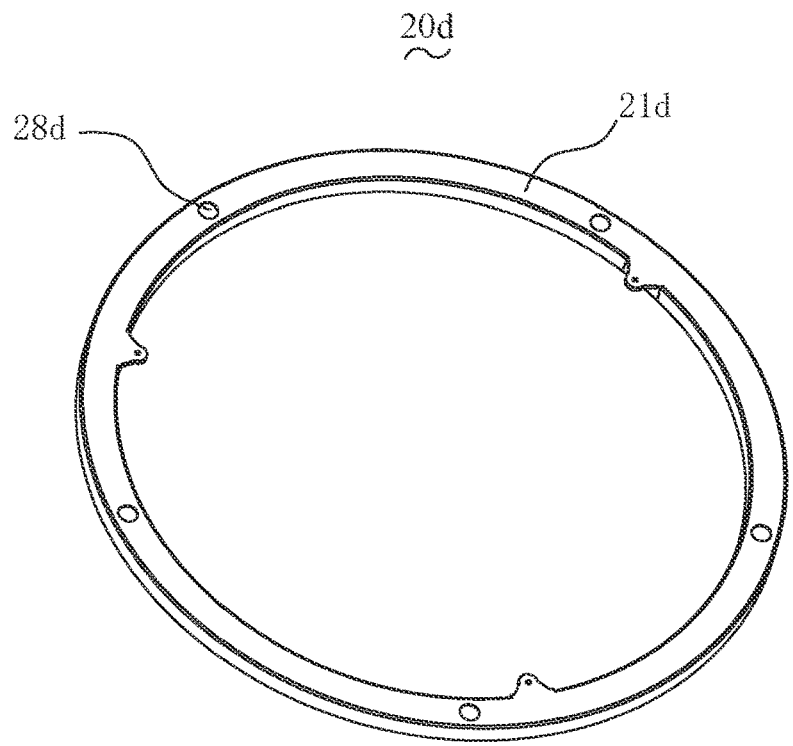
FIG. 31 is an illustrative isometric view of the rotating assembly of the movable puzzle platform shown in FIG. 23, but from another aspect.
Figure 32:
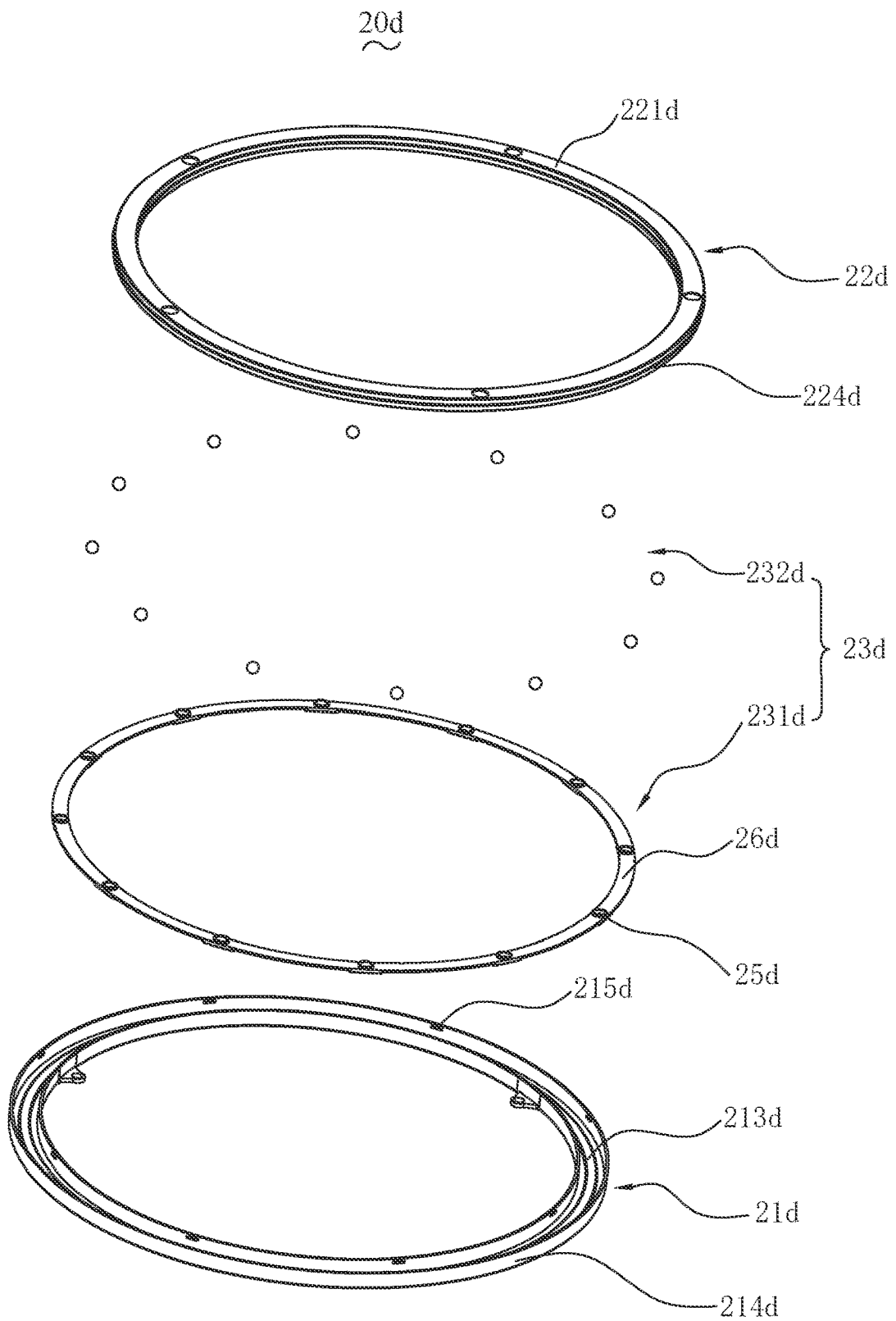
FIG. 32 is an exploded perspective view of the rotating assembly of the movable puzzle platform shown in FIG. 23.
Figure 33:
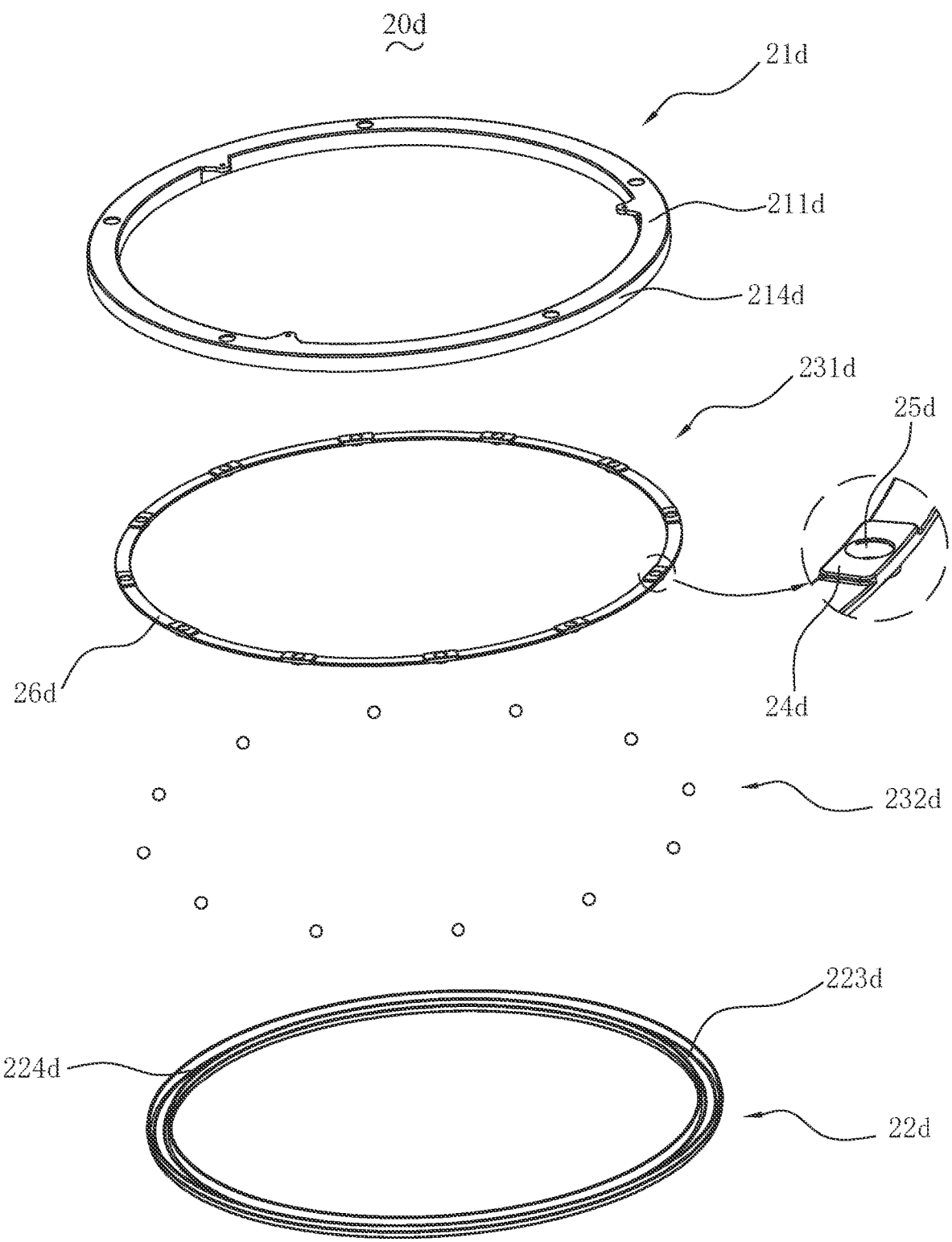
FIG. 33 is an exploded perspective view of the rotating assembly of the movable puzzle platform shown in FIG. 23, but from another aspect.
Figure 34:
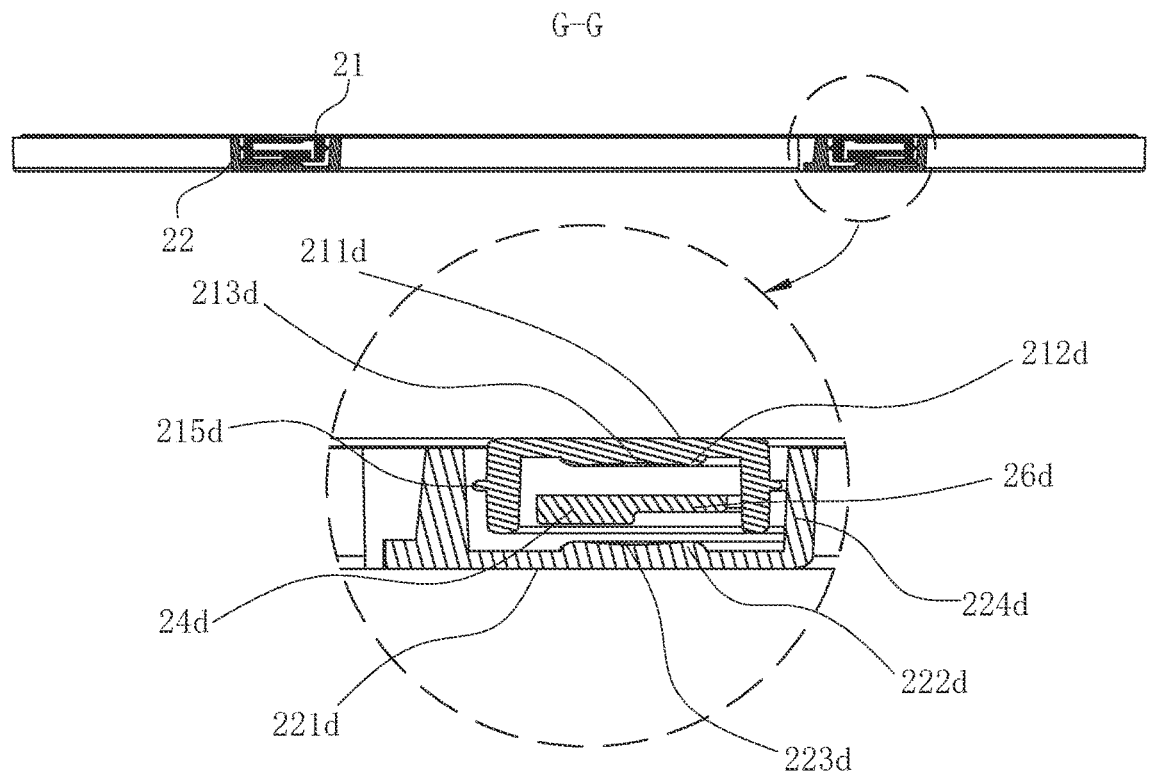
FIG. 34 is a cross-sectional view of the rotating assembly of the movable puzzle platform taken along line G-G of FIG. 30.
Figure 35:
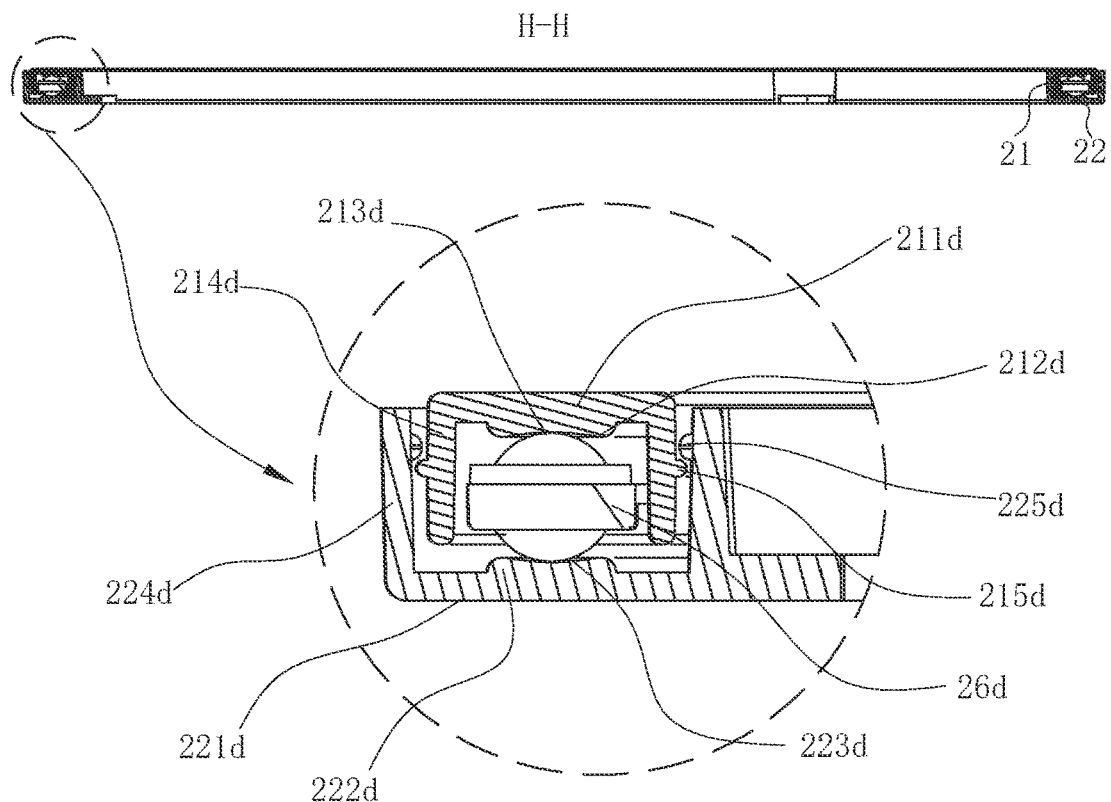
FIG. 35 is a cross-sectional view of the rotating assembly of the movable puzzle platform taken along line H-H of FIG. 30.
Figure 36:
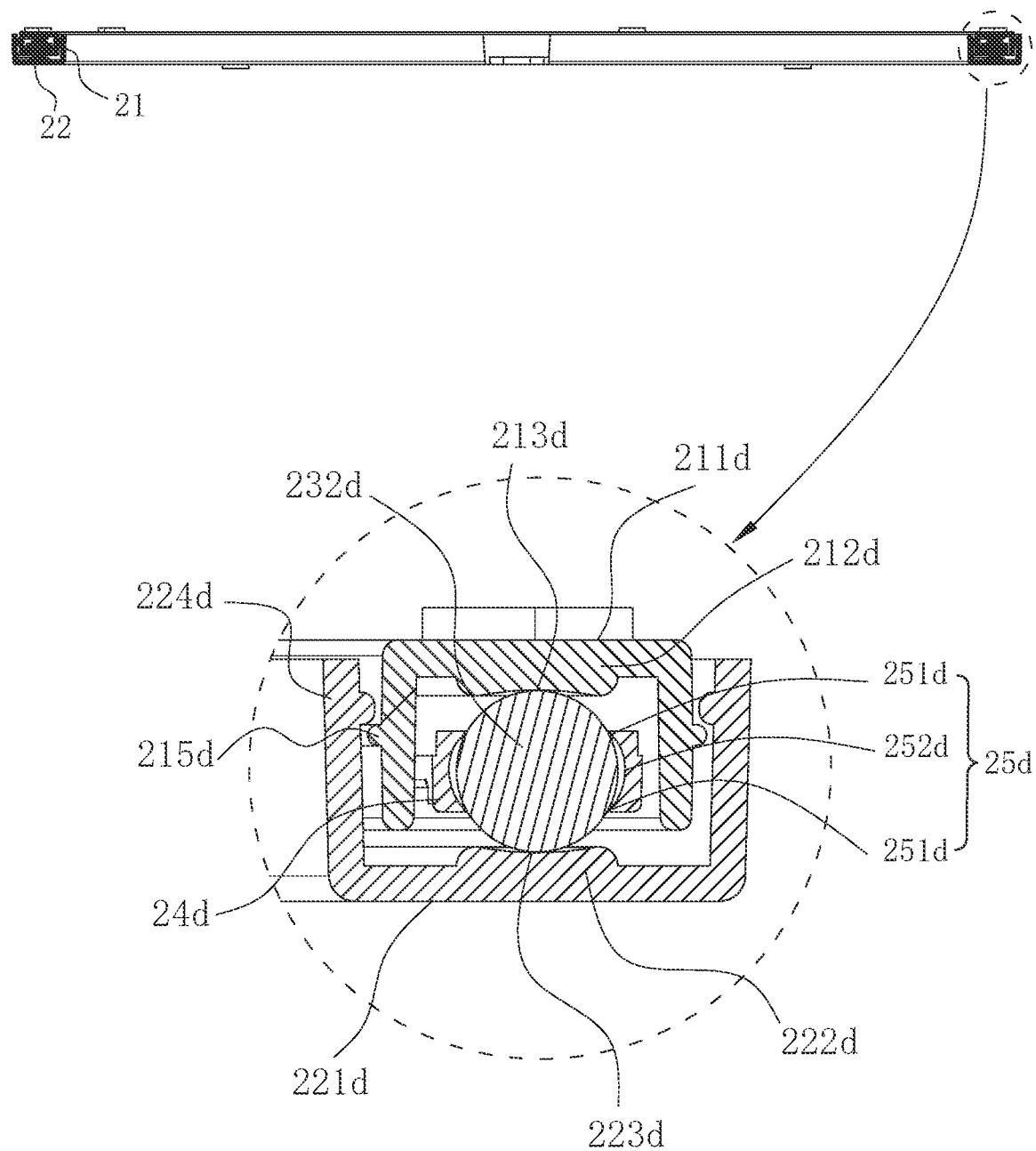
FIG. 36 is a cross-sectional view of the rotating assembly of the movable puzzle platform taken along line I-I of FIG. 30.
Figure 37:
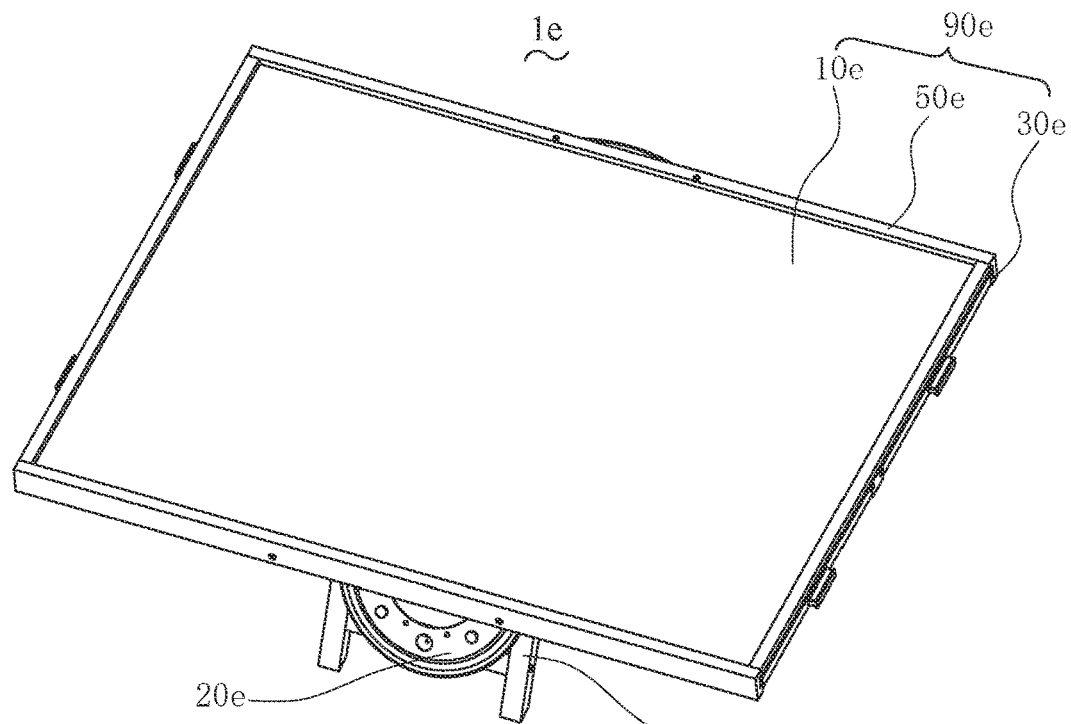
FIG. 37 is an illustrative isometric view of a movable puzzle platform according to a fifth embodiment of the present invention.
Figure 38:
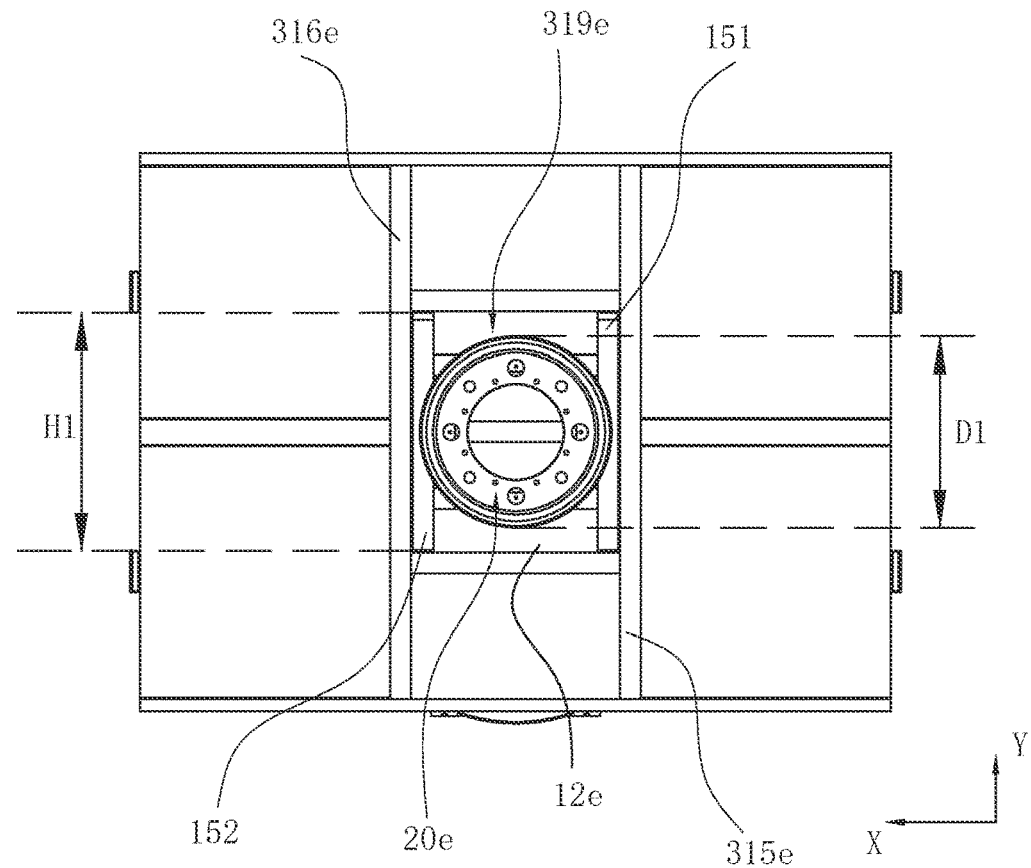
FIG. 38 is an illustrative isometric view of the movable puzzle platform shown in FIG. 37, illustrating a kickstand being in close position.
Figure 39:
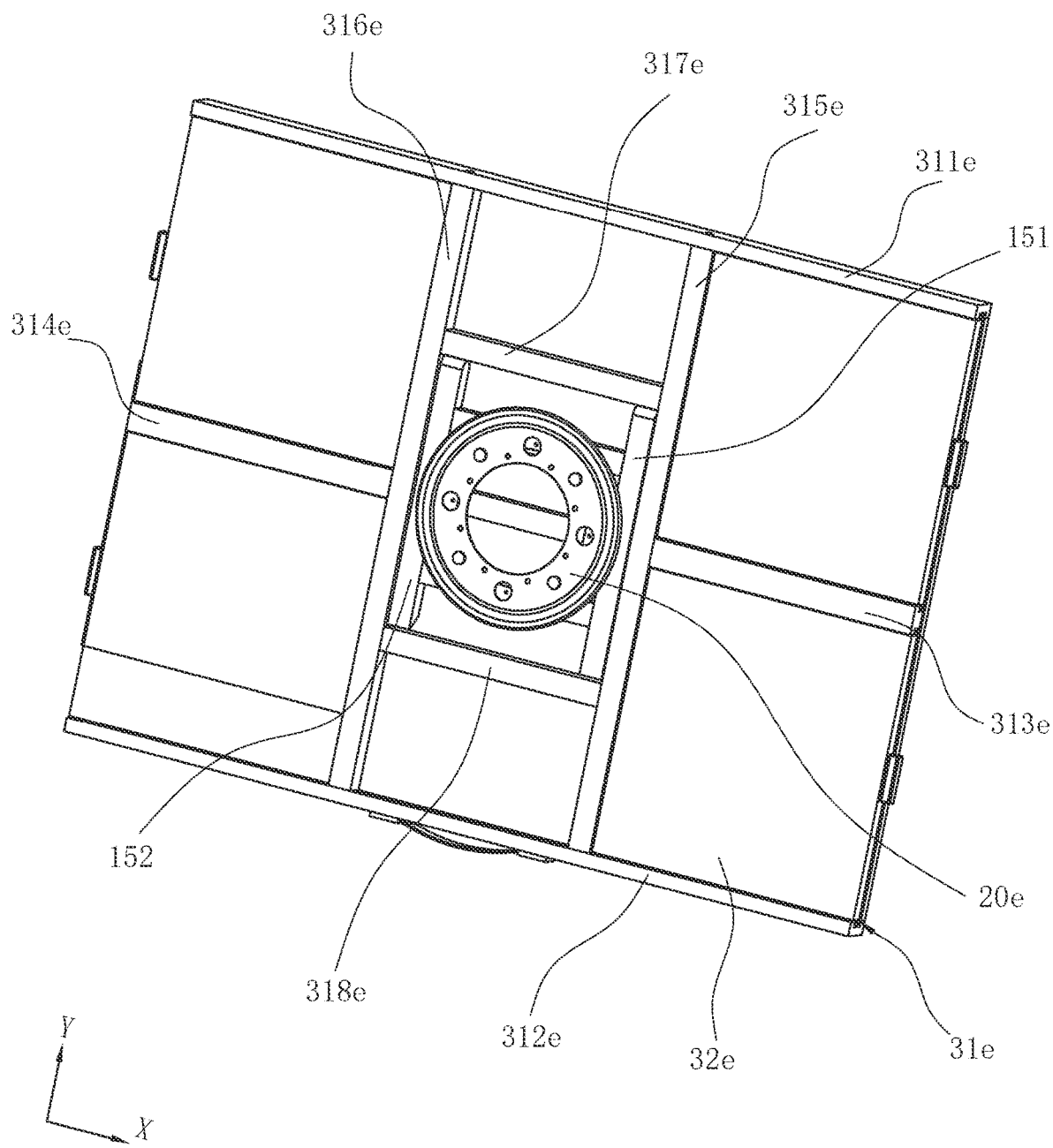
FIG. 39 is an illustrative isometric view of the movable puzzle platform shown in FIG. 37, illustrating the kickstand being in close position, but from another aspect.
Figure 40:
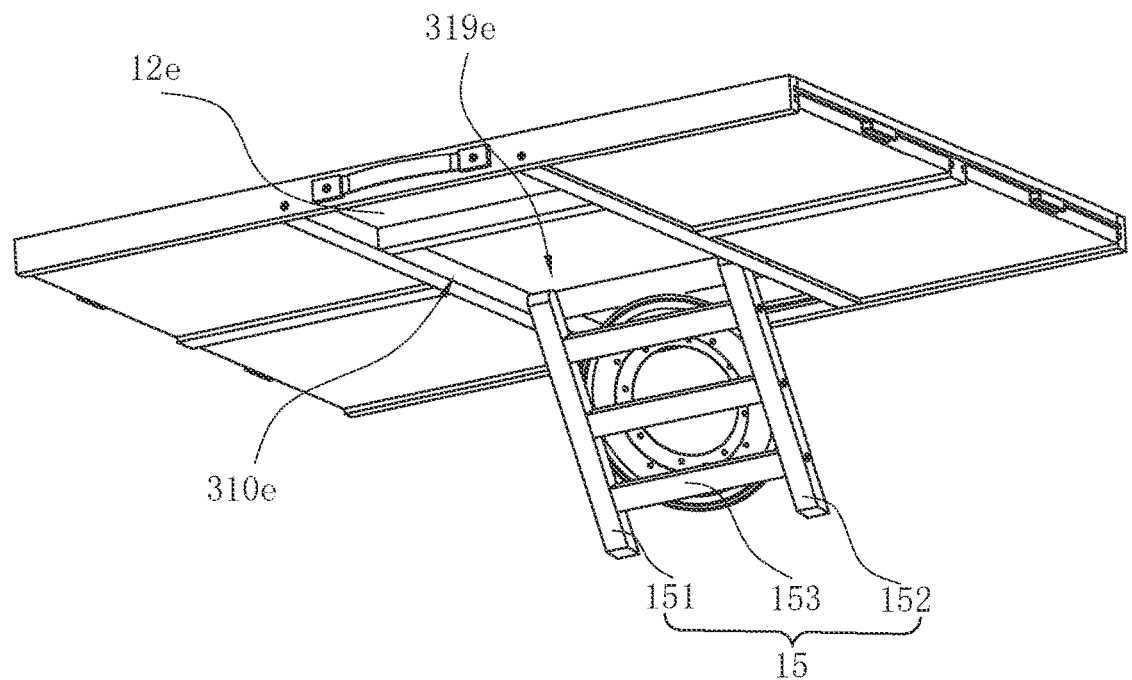
FIG. 40 is a side view of the movable puzzle platform shown in FIG. 37, illustrating the kickstand being pivotally folded to support a board assembly at an inclined manner on a playing place in open position.
Figure 41:
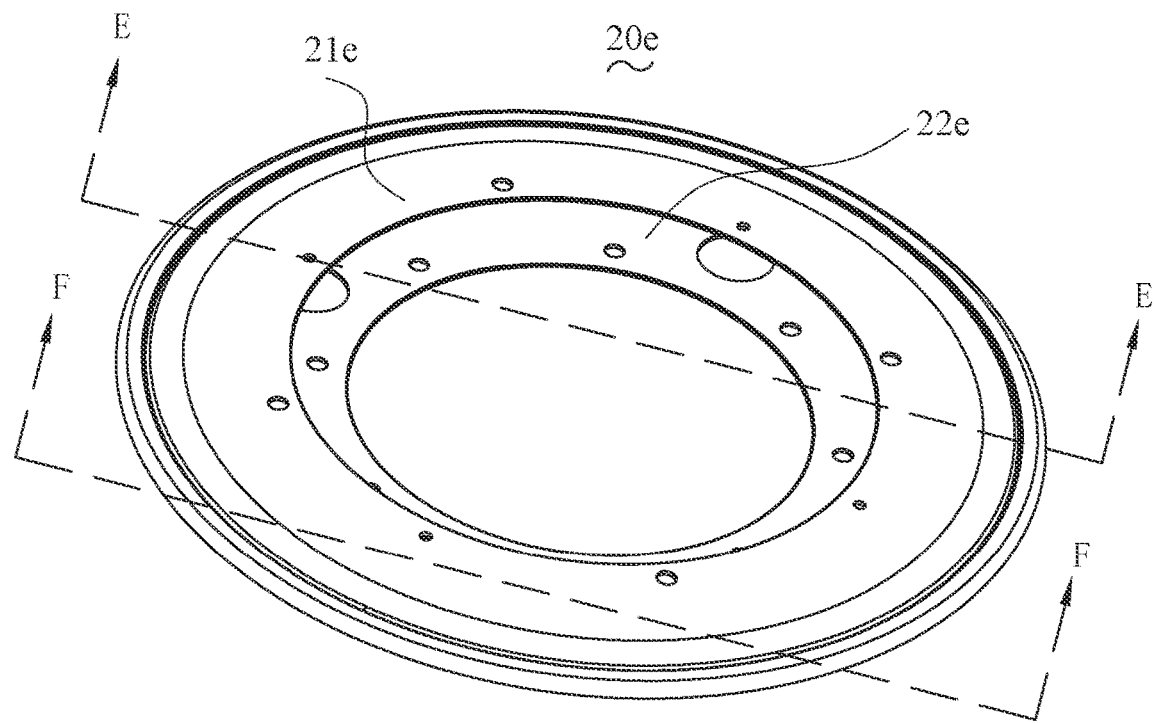
FIG. 41 is an illustrative isometric view of a rotating assembly of the movable puzzle platform shown in FIG. 37.
Figure 42:
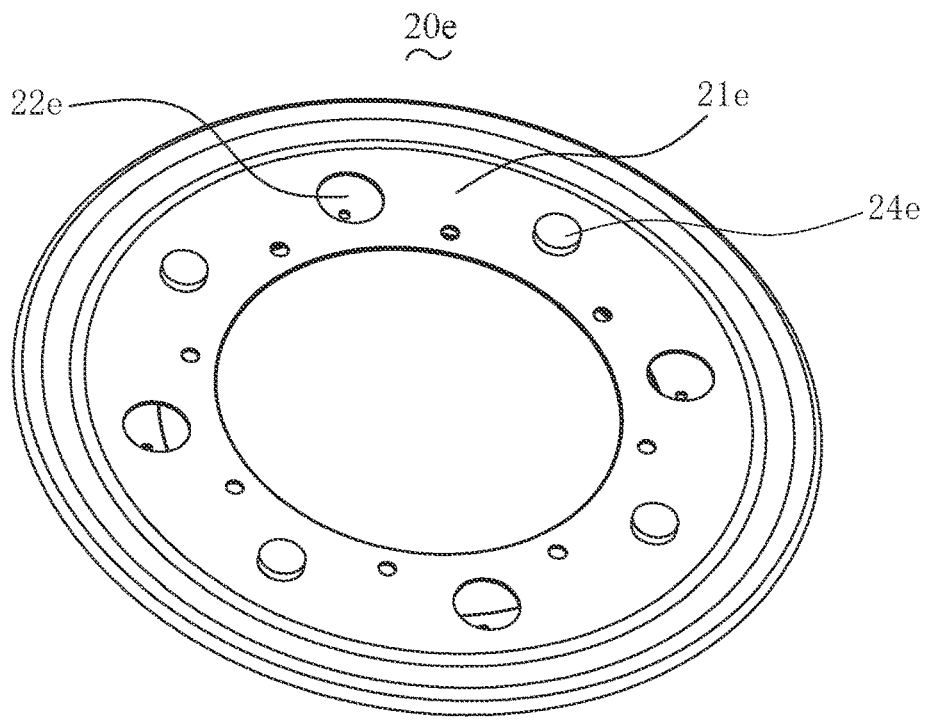
FIG. 42 is an illustrative isometric view of the rotating assembly of the movable puzzle platform shown in FIG. 37, but from another aspect.
Figure 43:
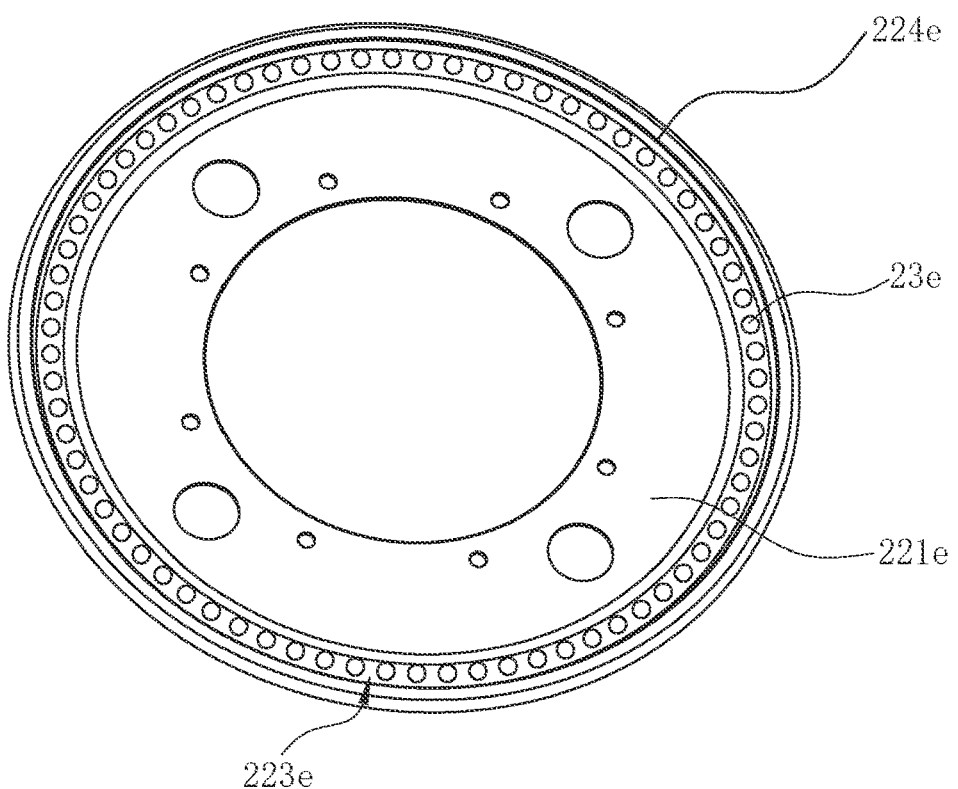
FIG. 43 is an illustrative isometric view of the rotating assembly of the shown in FIG. 37, a first moving member thereof being removed away.
Figure 44:
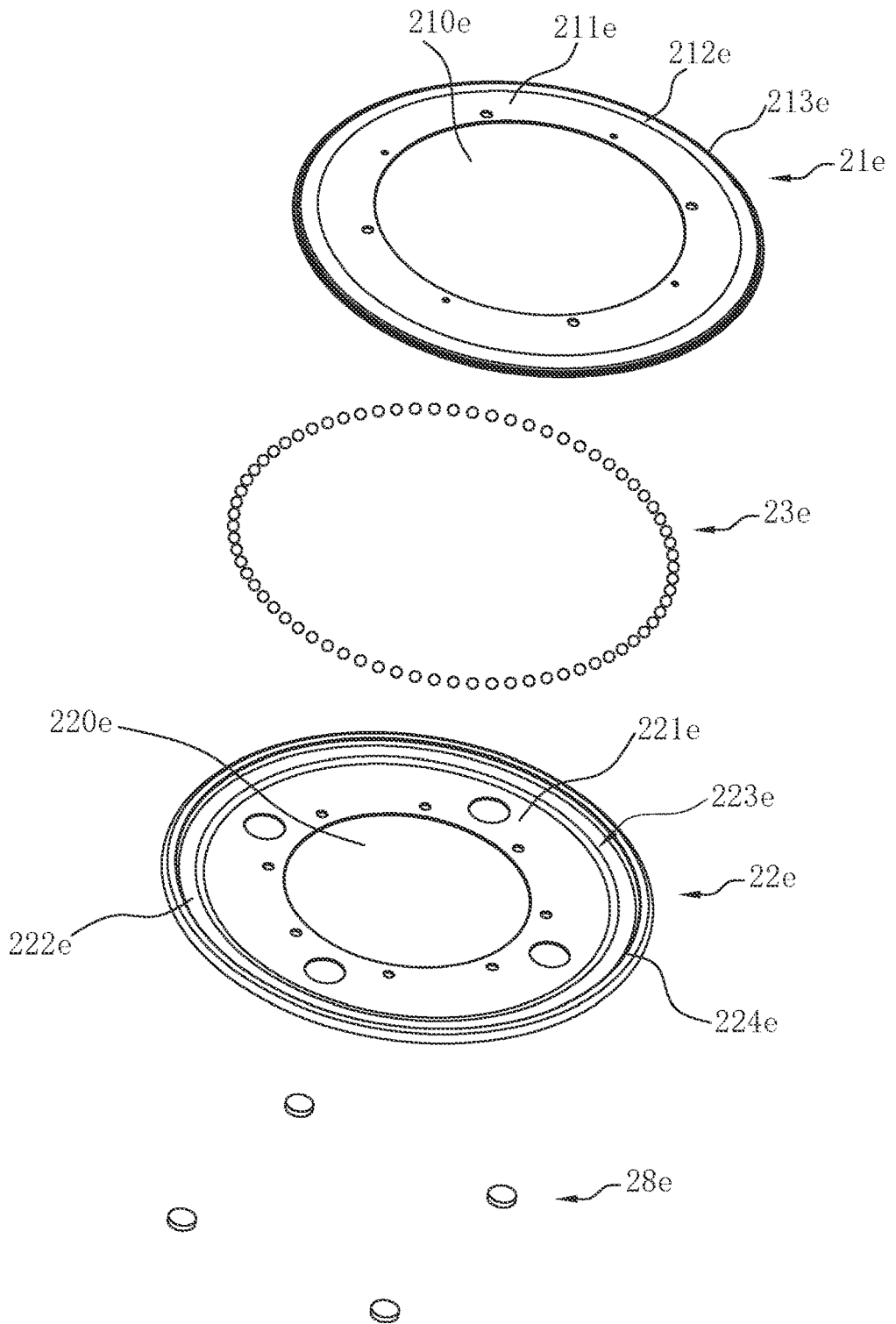
FIG. 44 is an exploded perspective view of the rotating assembly of the movable puzzle platform shown in FIG. 37.
Figure 45:
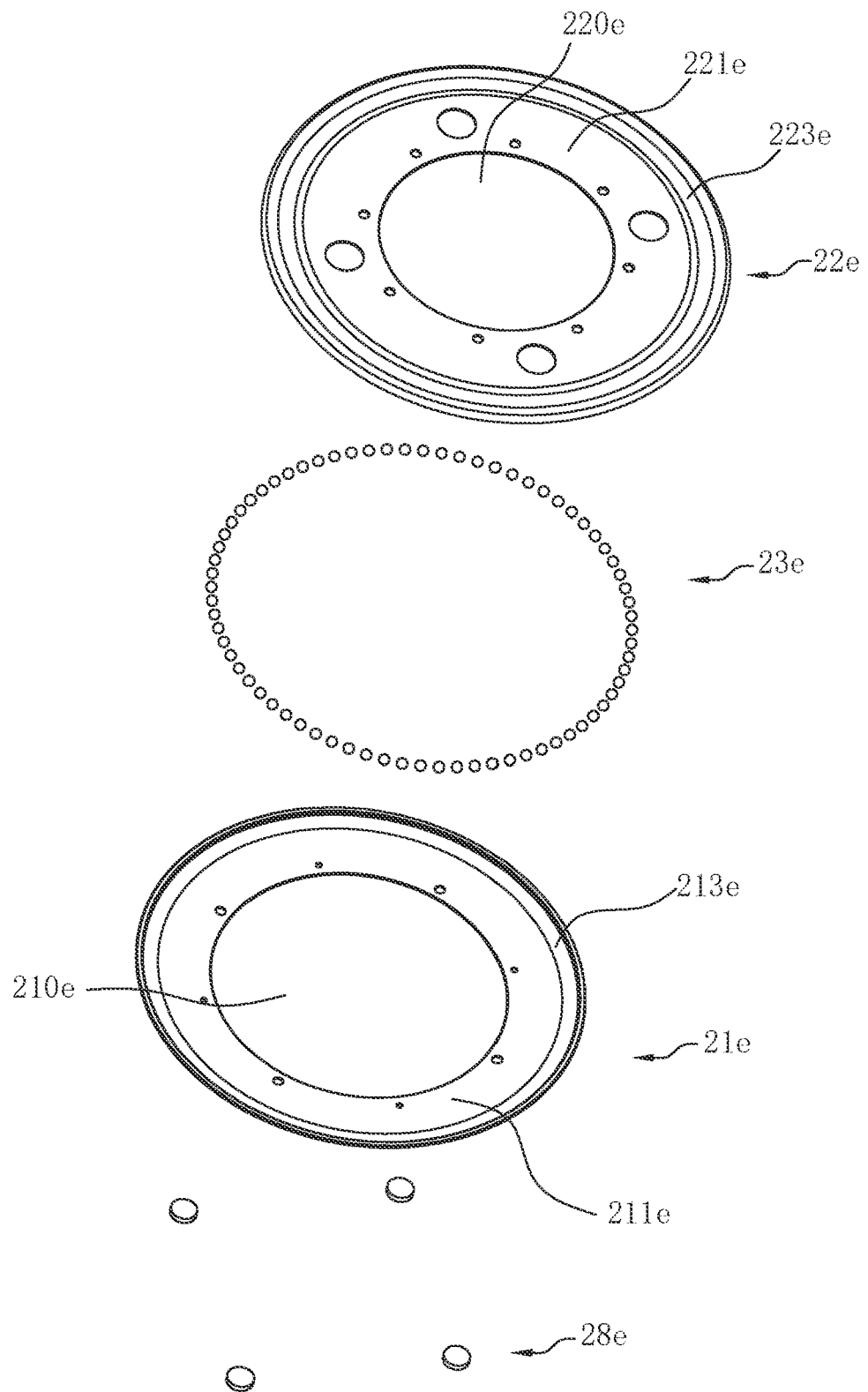
FIG. 45 is an exploded perspective view of the rotating assembly of the movable puzzle platform shown in FIG. 37, but from another aspect.
Figure 46:
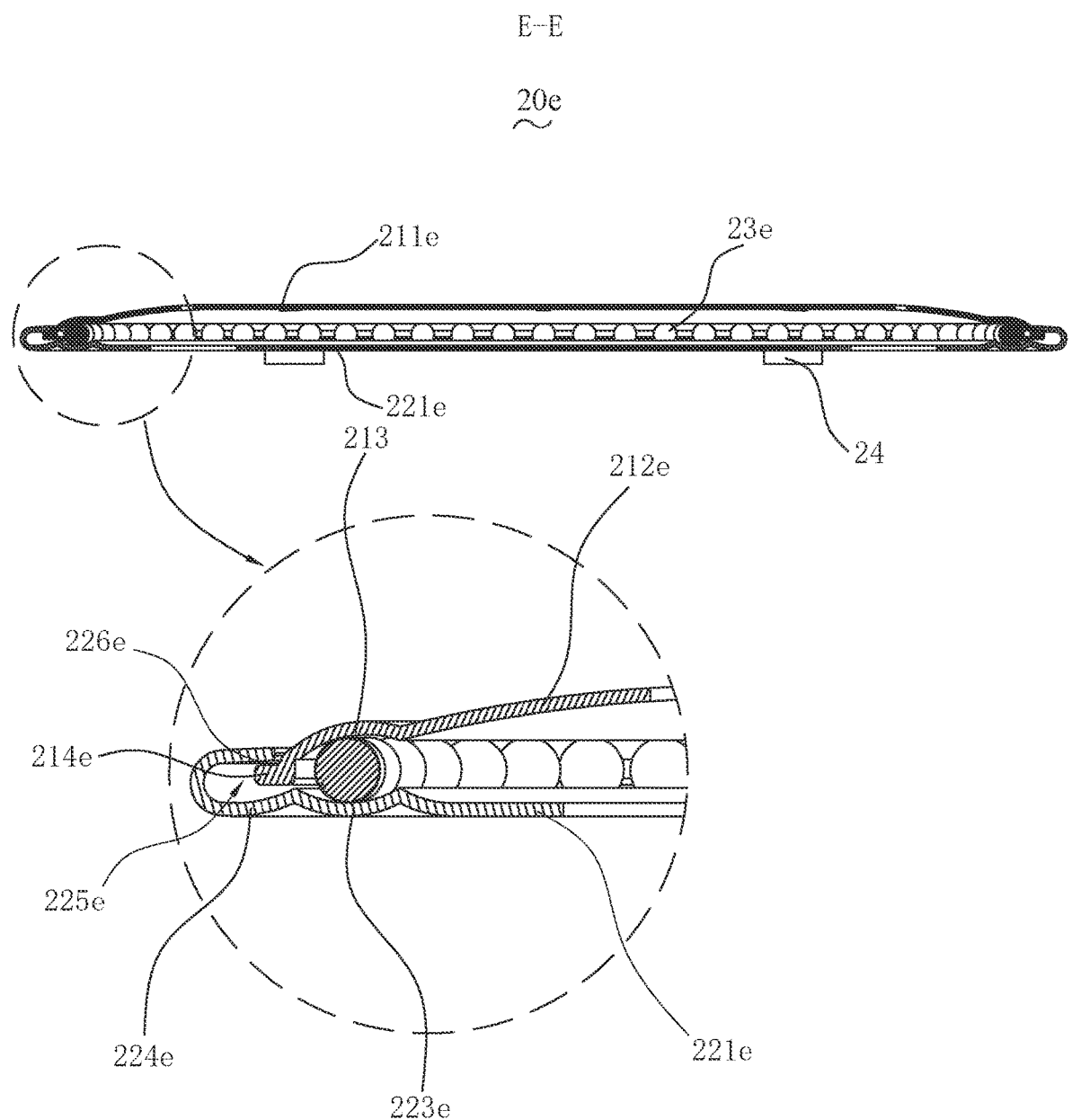
FIG. 46 is a cross-sectional view of the rotating assembly of the movable puzzle platform taken along line E-E of FIG. 41.
Figure 47:
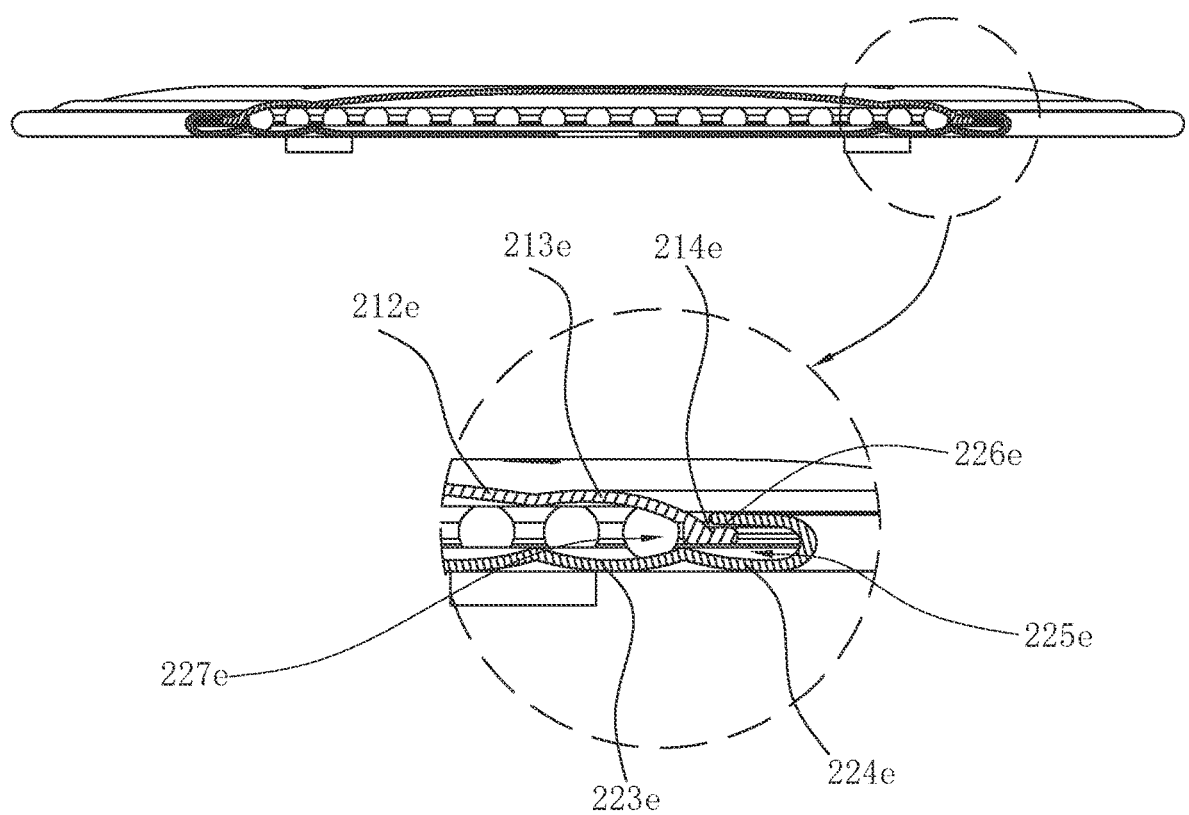
FIG. 47 is a cross-sectional view of the rotating assembly of the movable puzzle platform taken along line F-F of FIG. 41.

FIGS. 20-22 show a movable puzzle platform 1b of a third embodiment of the present invention. A movable puzzle platform 1*b* according to the third embodiment of the present invention is illustrated, wherein the movable puzzle platform 1*b* comprises a puzzle board 10*b*, a rotating assembly 20*b* attached on the puzzle board 10*b*, a supplement arrangement 30*b* attached on the puzzle board 10*b*, a base 40*b* attached on the supplement arrangement 30*b*, and a restricting wall 50*b* upwardly extended from a peripheral edge of the puzzle board 10*b*.

The third embodiment is similar to the first embodiment of the present invention except that the restricting wall 50*b* is generally three-piece type. At least one extending wall can be omitted. In this embodiment, an extending wall located on a shorter transverse side of a puzzle board can be omitted, so the restricting wall 50*b* is an unclosed structure for forming a surrounding opening 501*b*. In this embodiment, the restricting wall 50*b* is substantially perpendicular to the puzzle board 10*b* and comprises a first extending wall 51*b* mounted on the puzzle board 10*b* and arranged in the longitudinal direction X, a second extending wall 52*b* mounted on the puzzle board 10*b* and spaced apart from the first extending wall 51*b*, and a third extending wall 53 mounted on the puzzle board 10*b* and arranged in the lateral direction Y for connected with the adjacent first and second extending walls 51*b*, 52*b*. The first and second extending walls 51*b*, 52*b* are parallel to each other in the longitudinal direction X. The surrounding opening 501*a* is configured for the convenience of the player's arm is supported directly on the puzzle board 10. Optionally, any one of the four extending walls can be omitted, or any two or three extending walls can be omitted, or all extending walls can be omitted.

FIGS. 23-36 show a movable puzzle platform 1*d* of a fourth embodiment of the present invention comprises a board assembly 90*d* and a rotating assembly 20*d* attached on the board assembly 90*d*. The board assembly 90*d* comprises a puzzle board 10*d*, a supplement arrangement 30*d* attached on the puzzle board 10*d*, and a restricting wall 50*d* upwardly extended from a peripheral edge of the puzzle board 10*d*. The puzzle board 10*d* comprises a puzzle plate 101*d* with a bottom surface 12*d* for playing the puzzle pieces 100*d* thereon. The supplement arrangement 30*d* comprises at least one puzzle drawer 32*d*, at least one drawer cavity 31*d* for receiving the corresponding puzzle drawer 32*d*, and a supporting portion 301*d* connected with the bottom surface 12*d* of the puzzle plate 101*d* for forming the drawer cavity 31*d*.

The four embodiment is similar to the first embodiment of the present invention except that the movable puzzle platform 1*d* further comprises a complementary conformation 80*d* provided between the puzzle drawer 32*d* and the corresponding supporting portion 301*d* for holding the puzzle drawer 32*d* and preventing the puzzle drawer 32*d* from falling off the supporting portion 301*d*, so a base can be omitted and the rotating assembly 20*d* is directly attached on the supplement arrangement 30*d*. Each of the puzzle drawer 32*d* comprises a rectangular bottom panel 321*d* slidably received in the corresponding drawer cavity 31*d* and a pair of side panels 324*d* extending from the bottom panel 321*d*. The complementary conformation 80*d* comprises a pair of engaging portions 326*d* extending outwardly from a pair of side panels 324*d* towards the corresponding supporting portion 301*d* and a pair of engaging slots 305*d* provided on the corresponding supporting portion 301*d* for receiving the corresponding engaging portions 326*d*. In usage state, each of the engaging portions 326*d* is configured for smoothly sliding in the corresponding engaging slot 305*d*. The extending direction of the slots 305*d* is parallel to that of the corresponding supporting portion 301*d*.

The supporting portion 301*d* further comprises a pair of main supporting walls 311*d*, a first inner supporting portions 315*d* attached on the bottom surface 12*d* of the puzzle board 10*d* along the lateral direction Y and positioned between the pair of main supporting walls 311*d*, and a second inner supporting wall 316*d* attached on the bottom surface 12*d* of the puzzle board 10*d* along the lateral direction Y, a first dividing supporting wall 313*d* attached on the bottom surface 12*d* of the puzzle board 10*d* along the longitudinal direction X and extending from the first inner supporting portion 315*d* away from the second inner supporting wall 316*d*, a second dividing supporting wall 314*d* attached on the bottom surface 12*d* of the puzzle board 10*d* along the longitudinal direction X and extending from the second inner supporting portion 316*d* away from the first inner supporting wall 315*d*, a third dividing supporting wall 317*d* extending from the bottom surface 12*d* of the puzzle board 10*d* along the longitudinal direction X and connected with the first and second inner supporting walls 315*d*, 316*d* and a fourth dividing supporting wall 318*d* extending from the bottom surface 12*d* of the puzzle board 10*d* along the longitudinal direction X and connected with the first and second inner supporting walls 315*d*, 316*d*. An outer diameter of the rotating assembly 20*d* is greater than a distance from the first inner supporting wall 315*d* to the second inner supporting wall 316*d*. The rotating assembly 20*d* is connected with the first and second inner supporting portions 315*d*, 316*d* and the first through fourth dividing supporting walls 313*d*, 314*d*, 317*d*, 318*d*, respectively. The first and second inner supporting walls 315*d*, 316*d* are exposed from the main supporting walls 311*d*, respectively. Optionally, each of engaging slots is long enough to retain a corresponding supporting portion therein so as to improve the structural strength of a movable puzzle platform, such that an inner supporting wall is able to be inserted into the corresponding engaging slot of the main supporting wall or the dividing supporting wall is able to be inserted into the corresponding engaging slot of the inner supporting wall.

The rotating assembly 20*d* comprises a first moving member 21*d* coupled at the supporting portion 301*d* of the supplement arrangement 30*d*, a second moving member 22*d* rotatably coupled to the first moving member 21*d*, and a bearing unit 23*d* coupled between the first and second moving members 21*d*, 22*d*. The bearing unit 23*d* is constructed to have a holding ring 231*d* and a plurality of ball bearings 232*d* spacedly retained at the holding ring 231*d* in a rotatable manner, such that when the holding ring 231*d* is coaxially held between the first and second moving members 21*d*, 22*d*, the ball bearings 232*d* are rotatably sandwiched between the first and second moving members 21*d*, 22*d* so as to enable the first and second moving members 21*d*, 22*d* being coaxially moved with each other. In this embodiment, the first moving member 21*d* is rotatably and mounted to the second moving member 22*d* by the bearing unit 23*d*, thereby enabling the puzzle board 10*d* to be self-rotated on the playing place. In one embodiment, a ratio of an inner diameter of the first moving member to an outer diameter of the first moving member is in a range of 0.95 to 0.5, a ratio of an inner diameter of the second moving member to an outer diameter of the second moving member is in a range of 0.95 to 0.5.

The first moving member 21*d* comprises a flat first middle portion 211*d*, a first projecting portion 212*d* extending from the center of the first middle portion 211*d* toward the second moving member 22*d*, a first rolling surface 213*d* provided on the first projecting portion 212*d* for directly engaging with the ball bearings 232*d*, a pair of first engaging wall 214*d* extending from the first middle portion 211d and spaced apart from the first projecting portion 212d and a first engaging body 215d projecting from the first engaging wall 214d toward the second moving member 22d. The second moving member 22d comprises a flat second middle portion 221d, a second projecting portion 222d extending from the center of the second middle portion 221d toward the first moving member 21d, a second rolling surface 223d provided on the second projecting portion 221d for engaging with the ball bearings 232d, a pair of second engaging wall 224d extending from the second middle portion 221d and spaced apart from the second projecting portion 222d and a second engaging body 225d projecting from the second engaging wall 224d and constantly engaged with the first engaging body 215d to enable the second moving member 22 being coaxially rotated with respect to the first moving member 21. The first and second rolling surfaces 213d,223d may be a ring-shaped groove. Optionally, the first and second rolling surfaces can be omitted. Ball bearings are engaged with a first projecting portion and a second projecting portion directly. The rotating assembly 20 further comprises a plurality of friction pads 28d intervally attached on the second moving member 22 and/or the first moving member 21 for enhancing relative friction between the second moving member 22 and the playing place and/or the board assembly 90 and the first moving member 21 and ensuring the position of the movable puzzle platform 1d, so that the board assembly 90 is in rotatable state.

The holding ring 231d is a substantially flat ring, which is a whole entirety ring and indivisible, and comprises a retaining ring 26d having a diameter generally equal to the circular first and second rolling surfaces 213d, 223d, a plurality of retaining base 24d intervally and integrally protruded on one side of the retaining ring 26d and a plurality of retaining holes 25d drilled completely through the corresponding retaining base 24d for the plurality of ball bearings 232d being rotatably retained therein respectively. Each of the retaining holes 25d comprises a pair of locking openings 251d spaced apart from each other and a connecting hole 252d integrally and smoothly connected with the pair of locking openings 251d and coaxial with respect to the locking openings 251d. An upper surface of the retaining holes 25d is coplanar with that of the retaining ring 26d. Diameters of the locking openings 251d are slightly smaller than that of the ball bearings 232d so as to lock the plurality of ball bearings 232d in position respectively while allowing the plurality of ball bearings 232d in a free rolling manner. The connecting hole 252d is slightly greater than of ball bearings 232d for receiving the ball bearings 232d in a rollable manner. In this embodiment, a side edge of the retaining ring 26d is aligned with that of the first and second projecting portions 212d, 222d, respectively.

FIGS. 37-47 show a movable puzzle platform 1e of a fifth embodiment of the present invention comprises a board assembly 90e and a rotating assembly 20e attached on the board assembly 90e. The board assembly 90e comprises a puzzle board 10e, a supplement arrangement 30e attached on the puzzle board 10e, and a restricting wall 50e upwardly extended from a peripheral edge of the puzzle board 10e.

The supplement arrangement 30e comprises a supporting portion 301e connected with a bottom surface 12e of the puzzle board 10e for forming at least one drawer cavity 31e and at least one puzzle drawer 32e received in the corresponding drawer cavity 31e. The supporting portion 301e comprises a first main supporting wall 311e attached on the bottom surface 12e of the puzzle board 10e along the longitudinal direction X, a second main supporting wall 312e attached on the bottom surface 12e of the puzzle board 10 along the longitudinal direction X and disposed opposite to the first main supporting wall 311e, a first dividing supporting wall 313e attached on the bottom surface 121e of the puzzle board 10e along the longitudinal direction X and disposed between the first and second main supporting walls 311e, 312e, a second dividing supporting wall 314e attached on the bottom surface 12e of the puzzle board 10e along the longitudinal direction X and disposed between the first and second main supporting walls 311e, 312e, a first inner supporting wall 315e attached on the bottom surface 12e of the puzzle board 10e along the lateral direction Y and connected with the first and second main supporting walls 311e, 312e, and a second inner supporting wall 316e attached on the bottom surface 12e of the puzzle board 10e along the lateral direction Y and connected with the first and second main supporting walls 311e, 312e. The first and second dividing supporting walls 313e, 314e are spaced apart from each other. The first and second inner supporting walls 315e, 316e are spaced apart from each other and disposed parallel to each other for forming a supporting space 319e. The first and second dividing supporting walls 313e, 314e and the first and second main supporting walls 311e, 312e are disposed parallel to each other. The first dividing supporting wall 313e connects with the first inner supporting wall 315e and the second dividing supporting wall 314e connects with the second inner supporting wall 316e.

The movable puzzle platform 1e further comprises a kickstand 15 pivotally coupled at the board assembly 90e. The kickstand 15 is manufactured from a suitable durable material such as wood, plastic, fiberglass or metal. In this embodiment, the kickstand 15 is collapsible and pivotally coupled at the supplement arrangement 30e. Particularly, one end of the kickstand 15 is pivotally coupled at the supplement arrangement 30e while a free end of the kickstand 15 is adapted to pivotally fold from the puzzle board 10e to support on a playing place. Therefore, when the kickstand 15 is pivotally folded on the puzzle board 10e, the board assembly 90e is movable on the playing place via the rotating assembly 20e. In another words, in open position, the kickstand 15 is pivotally folded for supporting on the playing place and the puzzle board 10e is inclined and supported on the playing place. The open position is the desired position for the user of the movable puzzle platform 1e during the assembly process. In closed position, the kickstand 15 is pivotally received in the supporting space 319e of the supporting portion 301e and substantially parallel to the board assembly 90e. This position is desirable for storage, movement and transportation of the movable puzzle platform 1e. The kickstand 15 having a generally H-shaped and comprises a first supporting arm 151 pivotally coupled at the first inner supporting wall 315e, a second supporting arm 152 parallel to the first supporting arm 151 and pivotally coupled at the second inner supporting wall 316e, at least one fastening arm 153 detachably connected with the first and second supporting arms 151, 152. Each of the supporting arms 151, 152 is capable of detachably fastening to the corresponding inner supporting walls 315e, 316e. An extending direction of the first supporting arm 151 is different from that of the fastening arm 153. Optionally, when a board assembly of a movable puzzle platform further comprise a base, a kickstand may pivotally coupled at the base directly.

The supporting portion 30 further comprises a third dividing supporting wall 317e extending from the bottom surface 12d of the puzzle board 10e along the longitudinal direction X and connected with the first and second inner supporting walls 315e, 316e and a fourth dividing supporting wall 318e extending from the bottom surface 12e of the puzzle board 10e along the longitudinal direction X and connected with the first and second inner supporting walls 315e, 316e. The supporting space 319e is formed by the first and second inner supporting walls 315e, 316e and the third and fourth dividing supporting walls 317e, 318e. Optionally, the first and second supporting arms may pivotally couple at the third or fourth dividing supporting wall.

In this embodiment, the rotating assembly 20e is coupled with the kickstand 15 and comprises a first moving member 21e coupled at the kickstand 40e and a second moving member 22e rotatably coupled to the first moving member 21e. It is worth mentioning that the rotating assembly 20e is preferred to be coupled coaxially with a center of gravity of the board assembly 90e, such that the puzzle board 10e can be moved on the playing place in a balancing manner. The rotating assembly 20e further comprises a plurality of ball bearings 23e rotatably sandwiched between the first and second moving members 21e, 22e, such that when the first moving member 21e is rotated within the second moving member 22e, the board assembly 90e is self-rotated 360° on the playing place.

The first moving member 21e comprises a first middle portion 211e, an inclining portion 212e extending downwardly from the periphery of the first middle portion 211e and surrounding the first middle portion 211e for avoiding the first moving member 21e colliding with the puzzle board 10e of the board assembly 90e, a first projecting portion 213e extending upwardly from the periphery of the inclining portion 212e and surrounding the inclining portion 212e, and an edge portion 214e extending the periphery of the first projecting portion 213e and away from the first middle portion 211e. The second moving member 22e comprises a second middle portion 221e, a second projecting portion 223e extending downwardly from the periphery of the second middle portion 212e away from the first projecting portion 213e, and a bending portion 224e bent upward from the periphery of the second projecting portion 213e for forming an accommodating space 225e for receiving the edge portion 214e. The bending portion 224e is unconnected with the edge portion 214e for forming a rotating gap 226e to enable the second moving member 22 being coaxially rotated with respect to the first moving member 21 and preventing the first moving member 21e detaching from the second moving member 22e. The accommodating space 225e cooperated with the rotating gap 226e is configured to supply sufficient rotating space for the edge portion 214e of the first moving member 21e. The first moving member 21e and a second moving member 22e is substantially circular platy shape. The first moving member 21e further comprises a first through hole 210e provide on the first middle portion 211e for greatly reducing material cost. The second moving member 22e further comprises a second through hole 220e provide on the second middle portion 221e for greatly reducing material cost. The rotating assembly 20e is made of aluminum, stainless steel by metal stamping techniques. Optionally, a bending portion is connected with the edge portion as long as a second moving member is coaxially rotated with respect to a first moving member and preventing the first moving member detaching from the second moving member.

In order to completely open the kickstand 15 from the puzzle board 10e and avoid the rotating assembly 20e colliding with the puzzle board 10e, an outer diameter D1 of the rotating assembly 20e is slightly smaller than lengths H1 of the supporting arms 151, 152. In order to receive the kickstand 15, a length of the supporting space 319e is not smaller than a distance between the supporting arms 151, 152.

The first and second projecting portions 213e, 223e are spaced apart from each other for forming a holding space 227e. The plurality of ball bearings 23e retained at the holding space 227e in a rotatable manner, such that when the ball bearings 23e are rotatably sandwiched between the first and second moving members 21e, 22e, so as to enable the first and second moving members 21e, 22e being coaxially moved with each other. An inner circumferential surface of the first moving member 21e is engaged with an inner circumferential surface of the second moving member 22e via the ball bearings 23e to enable the second moving member 22e being coaxially rotated with respect to the first moving member 21e. In usage state, referring to FIGS. 46-47, adjacent ball bearings 23e may be engaged with each other or spaced apart from each other as long as the ball bearings 23e are in constantly contact with a top inner surface of the first projecting portion 213e and the bottom inner surface of the second projecting portion 223e to effectively enable the first and second moving members 21e, 22e being coaxially moved with each other.

The rotating assembly 20e further comprises a plurality of friction pads 28e intervally attached on the second moving member 22e and/or the first moving member 21e for enhancing relative friction between the second moving member 22e and the playing place and/or the board assembly 90e and the first moving member 21e and ensuring the position of the movable puzzle platform 1e, so that the board assembly 90e is in rotatable state.

Figure 48:
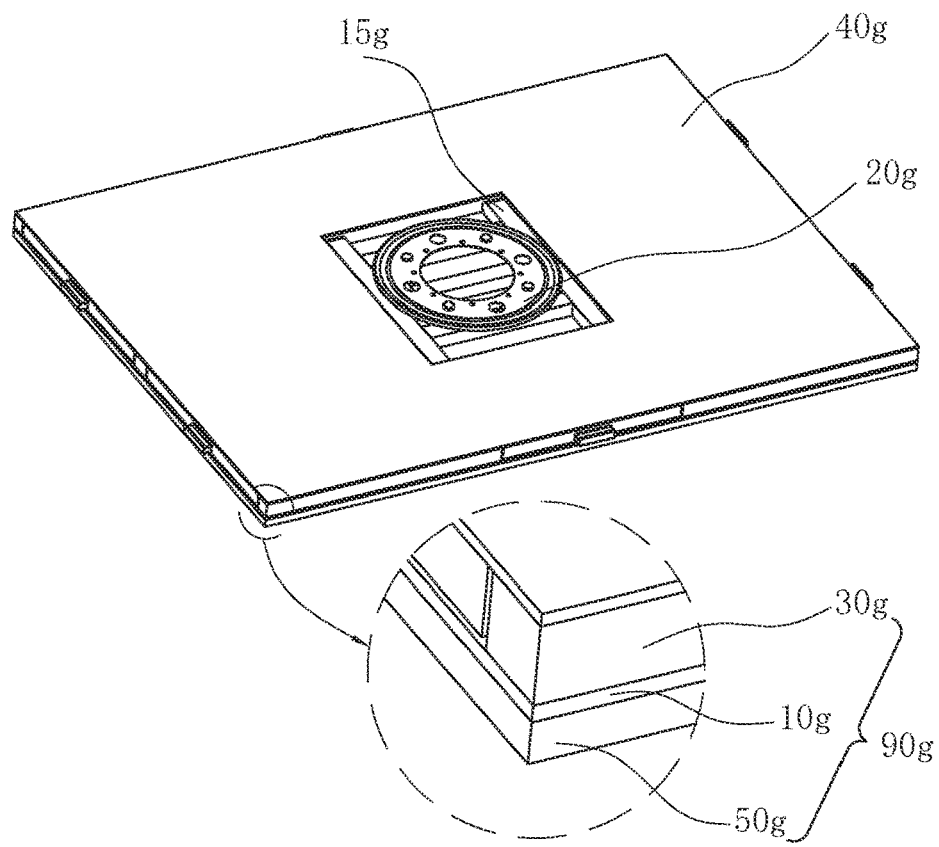
FIG. 48 is an illustrative isometric view of a movable puzzle platform according to a sixth embodiment of the present invention.
Figure 49:
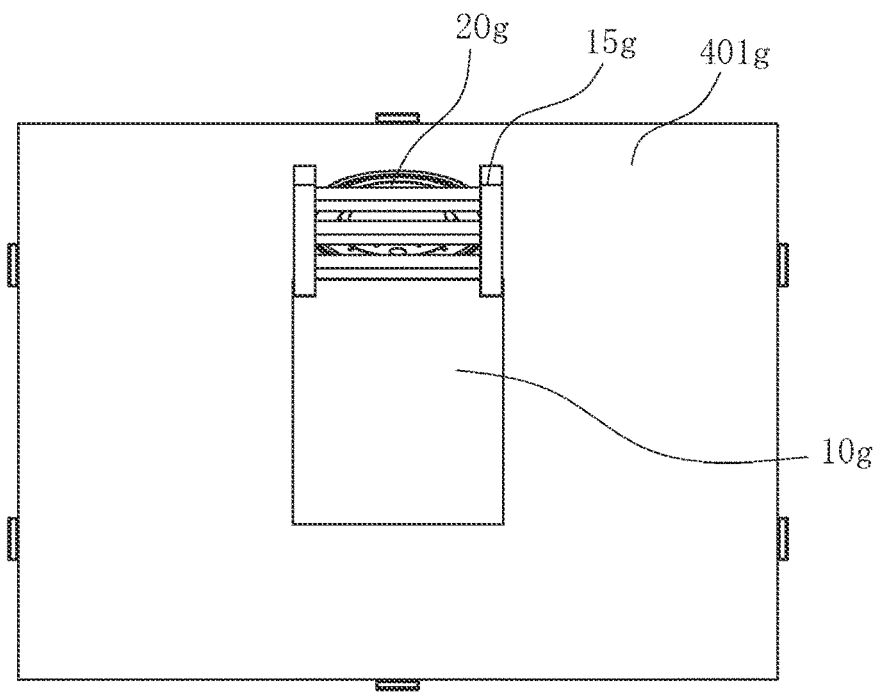
FIG. 49 is an illustrative isometric view of the movable puzzle platform shown in FIG. 48, illustrating a kickstand being in open position.
Figure 50:
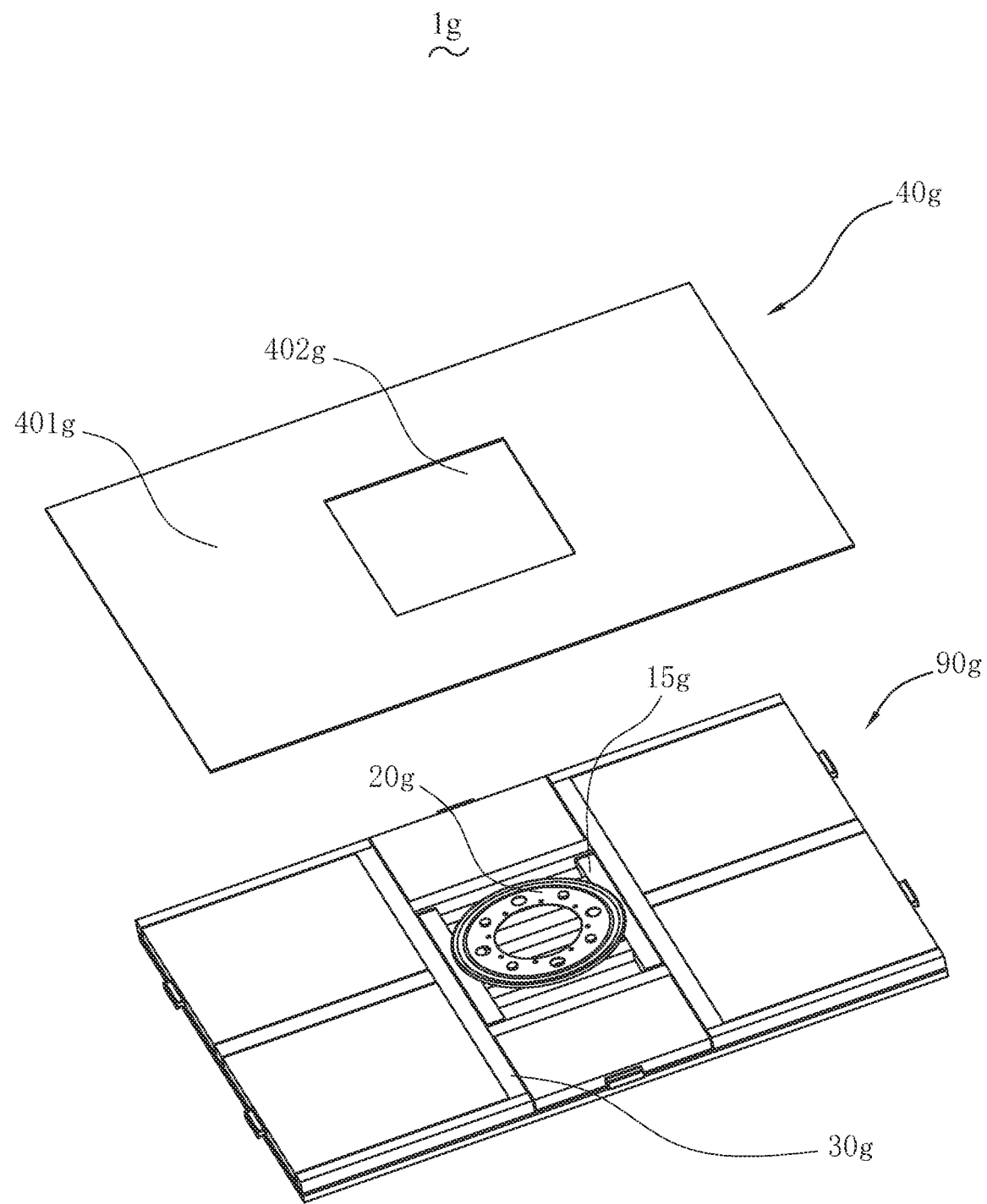
FIG. 50 a partially exploded perspective view of the movable puzzle platform shown in FIG. 48.
Figure 51:
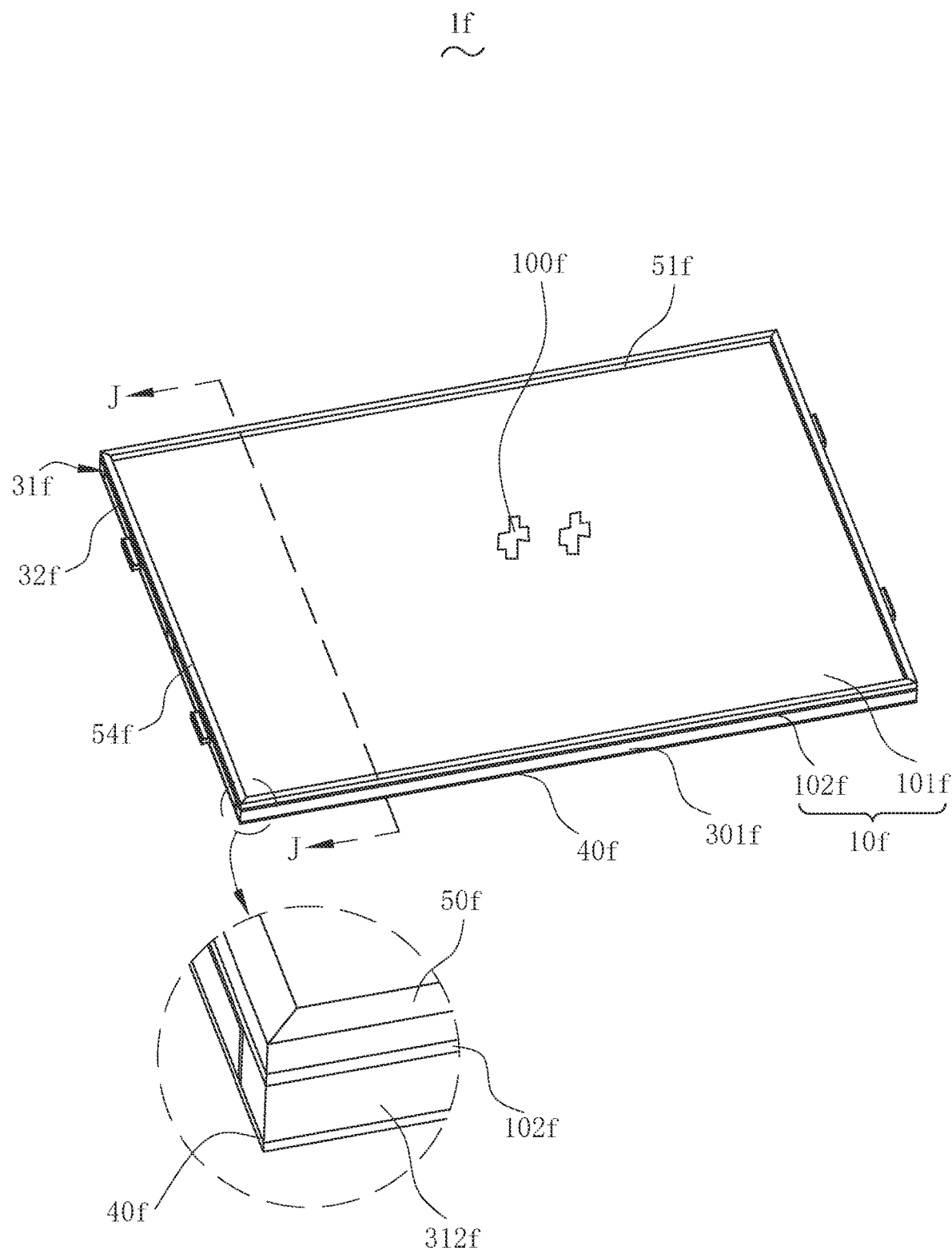
FIG. 51 is an illustrative isometric view of a movable puzzle platform according to a seventh embodiment of the present invention.
Figure 52:
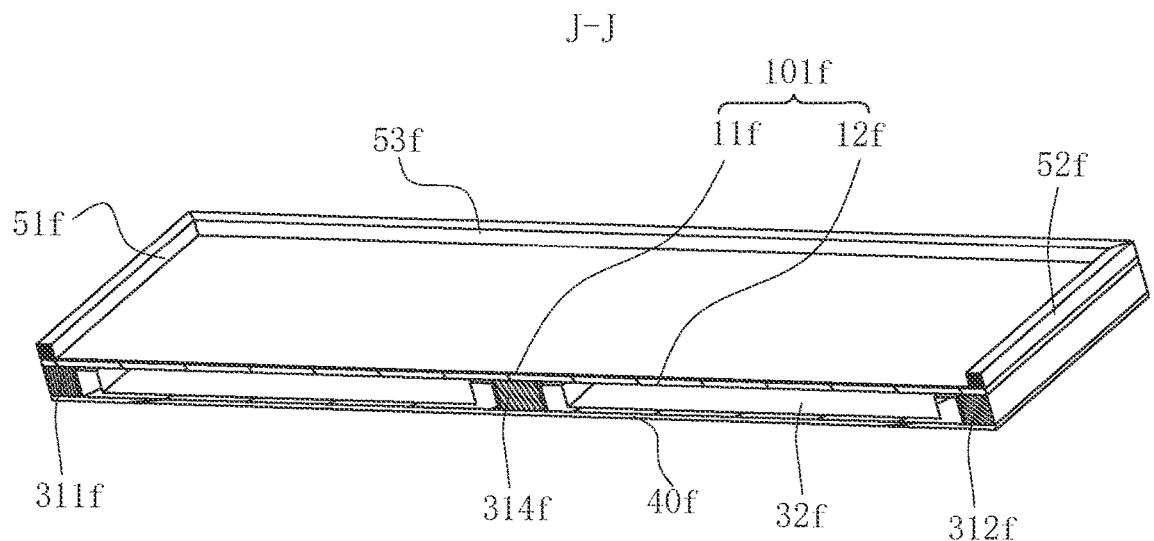
FIG. 52 is a cross-sectional view of the movable puzzle platform taken along line J-J of FIG. 51.
Figure 53:
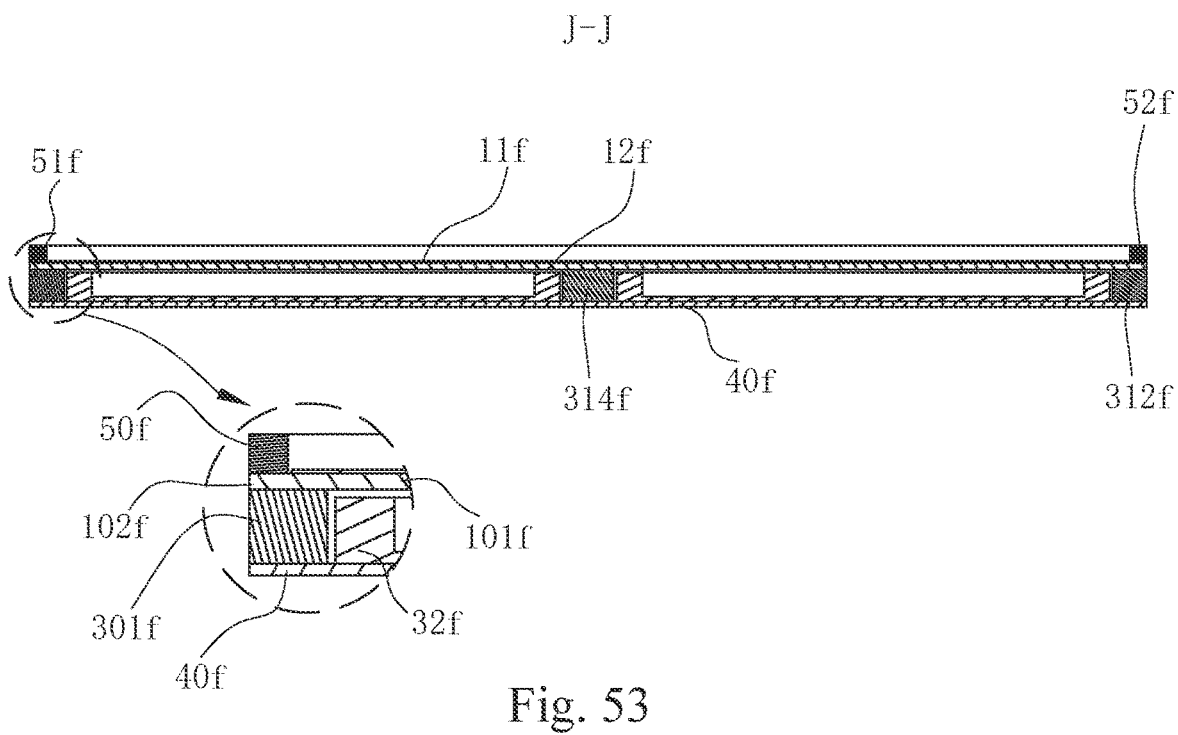
FIG. 53 is a cross-sectional view of the movable puzzle platform taken along line J-J of FIG. 51, but from another aspect.
Figure 54:
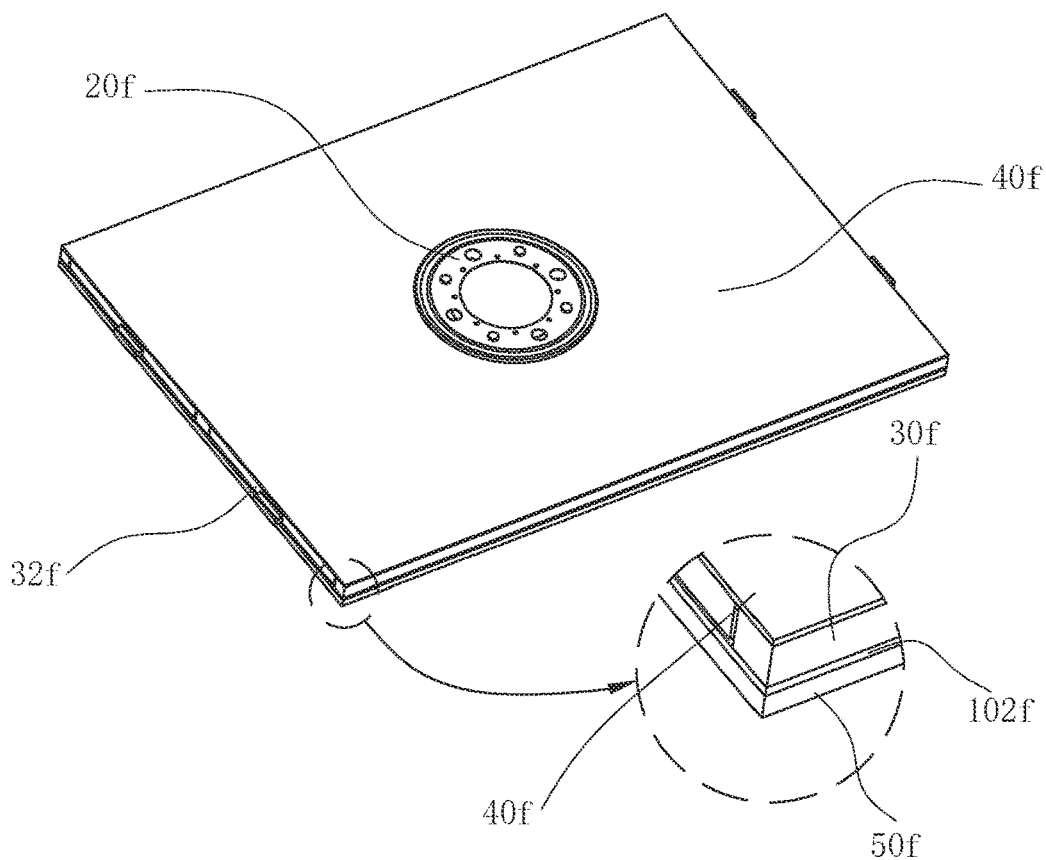
FIG. 54 is an illustrative isometric view of the movable puzzle platform shown in FIG. 51, but from another aspect.
Figure 55:
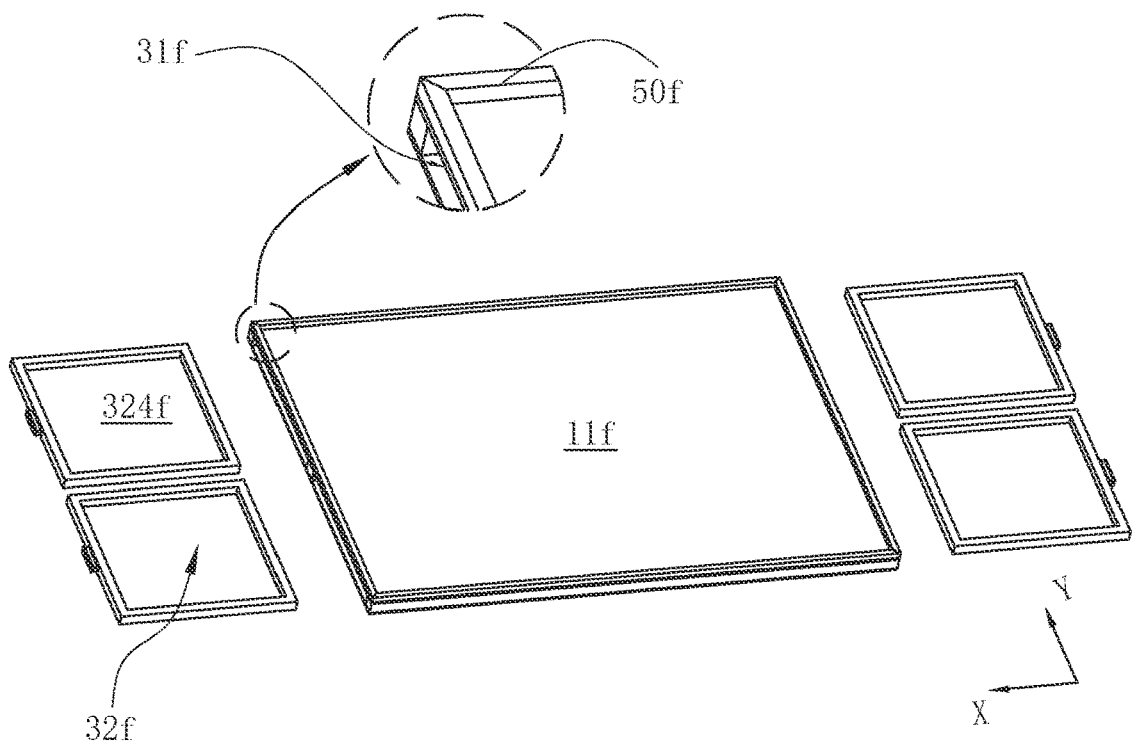
FIG. 55 is an illustrative isometric view of the movable puzzle platform shown in FIG. 51, puzzle drawers thereof being pulled out of a corresponding drawer cavity.
Figure 56:
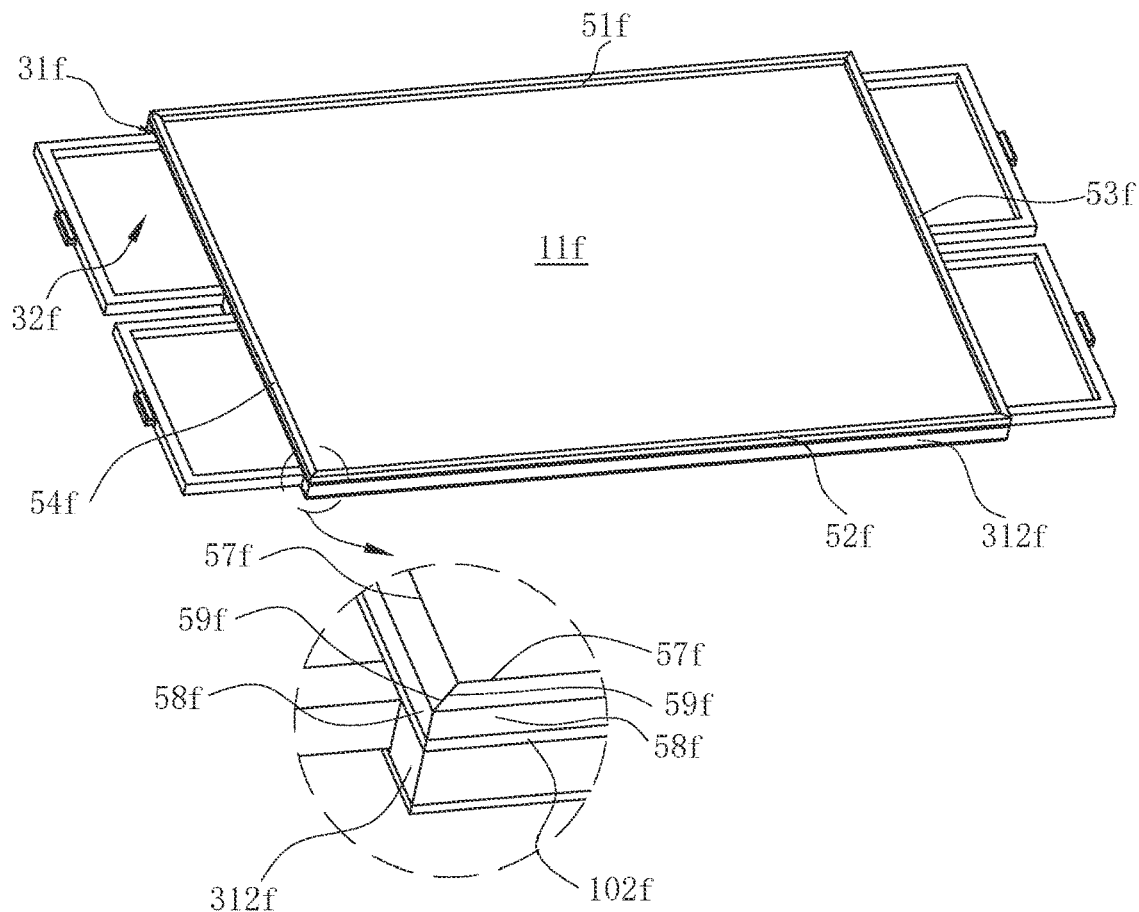
FIG. 56 is an illustrative isometric view of the movable puzzle platform shown in FIG. 51, puzzle drawers thereof being partially pulled out of a corresponding drawer cavity.
Figure 57:
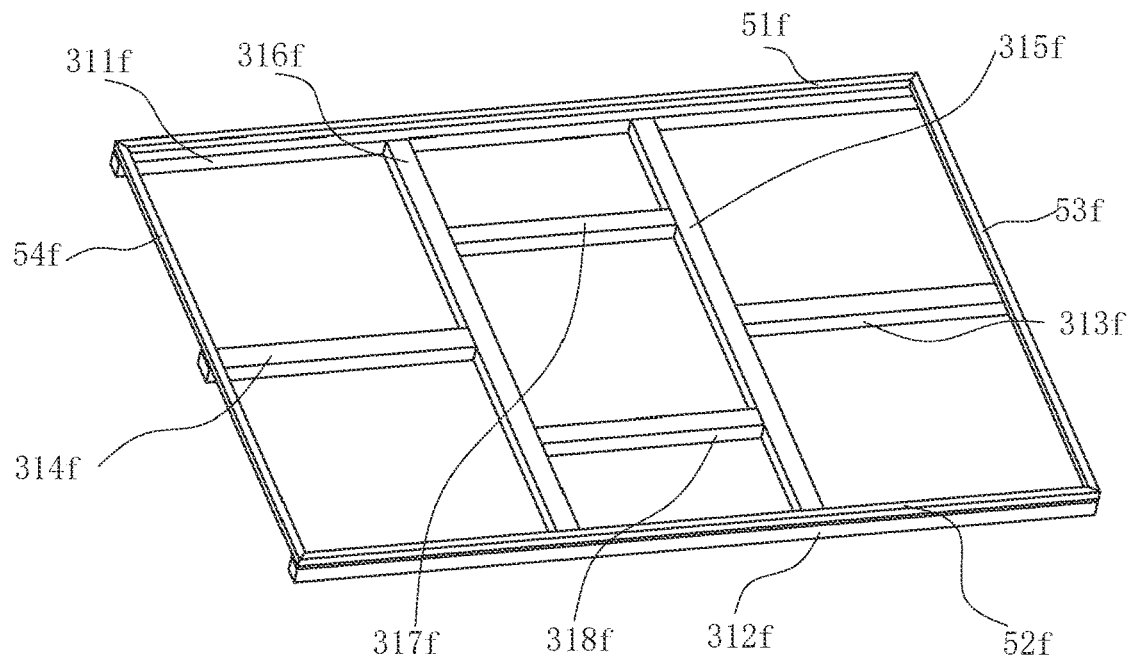
FIG. 57 is an illustrative isometric view of a restricting wall and a supporting portion of the movable puzzle platform shown in FIG. 51.
Figure 58:
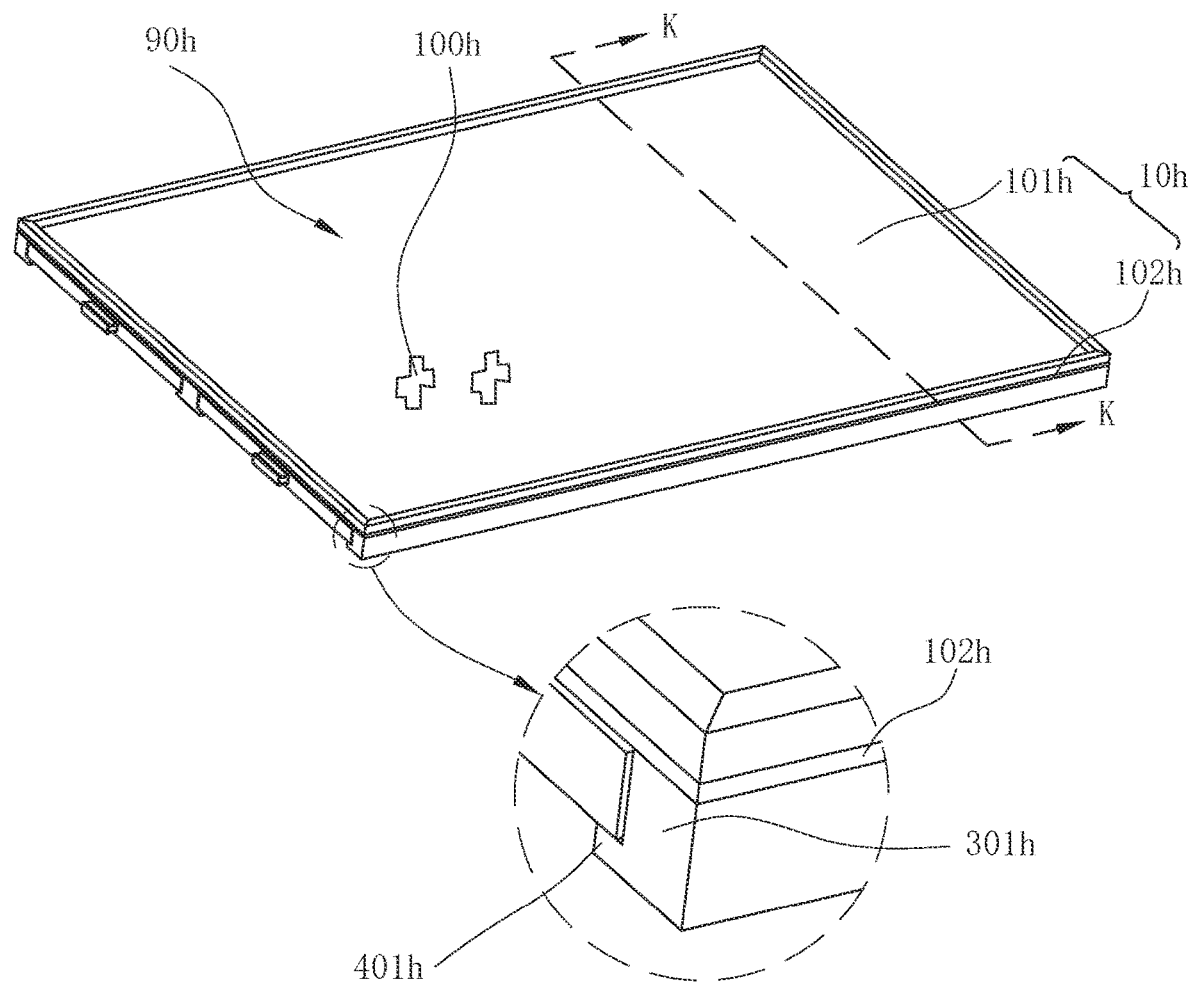
FIG. 58 is an illustrative isometric view of a movable puzzle platform according to an eighth embodiment of the present invention.
Figure 59:
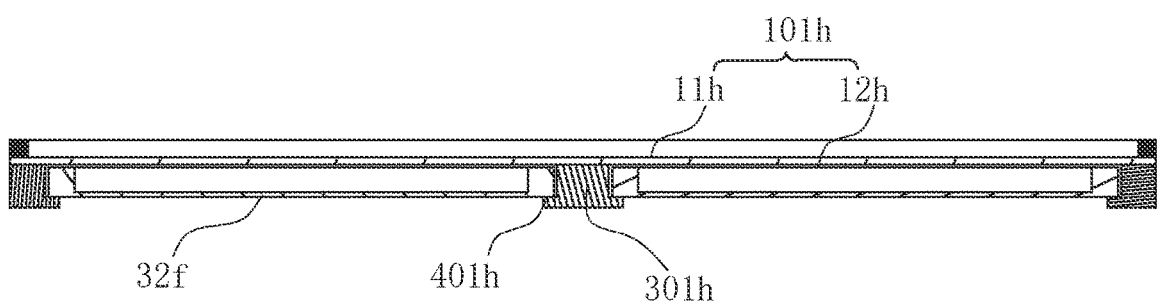
FIG. 59 is a cross-sectional view of the movable puzzle platform taken along line K-K of FIG. 58.
Figure 60:
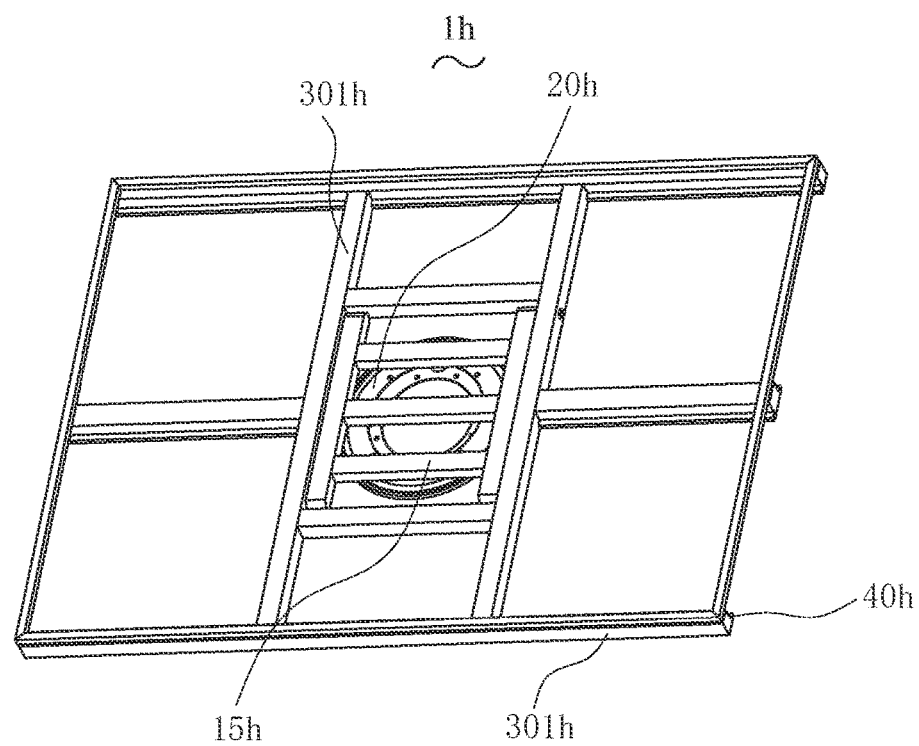
FIG. 60 is an illustrative isometric view of the movable puzzle platform shown in FIG. 58, a puzzle board thereof being removed away.
Figure 61:
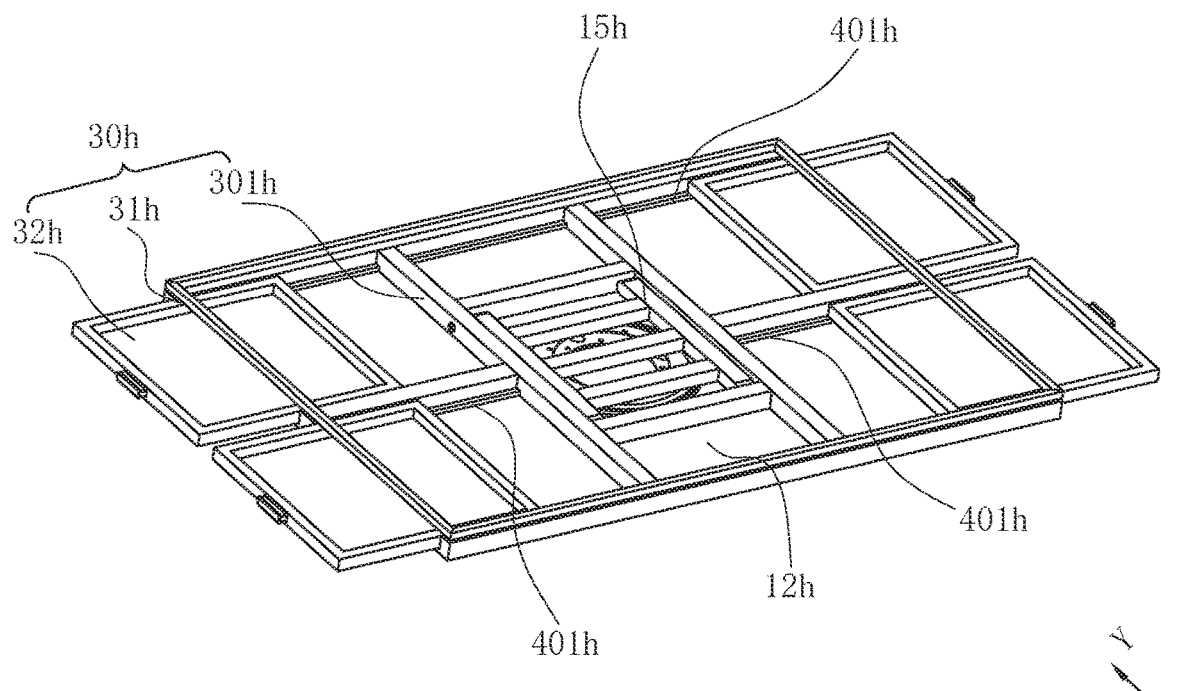
FIG. 61 is an illustrative isometric view of the movable puzzle platform shown in FIG. 58, the puzzle board thereof being removed away and puzzle drawers thereof being partially pulled out of a corresponding drawer cavity.
Figure 62:
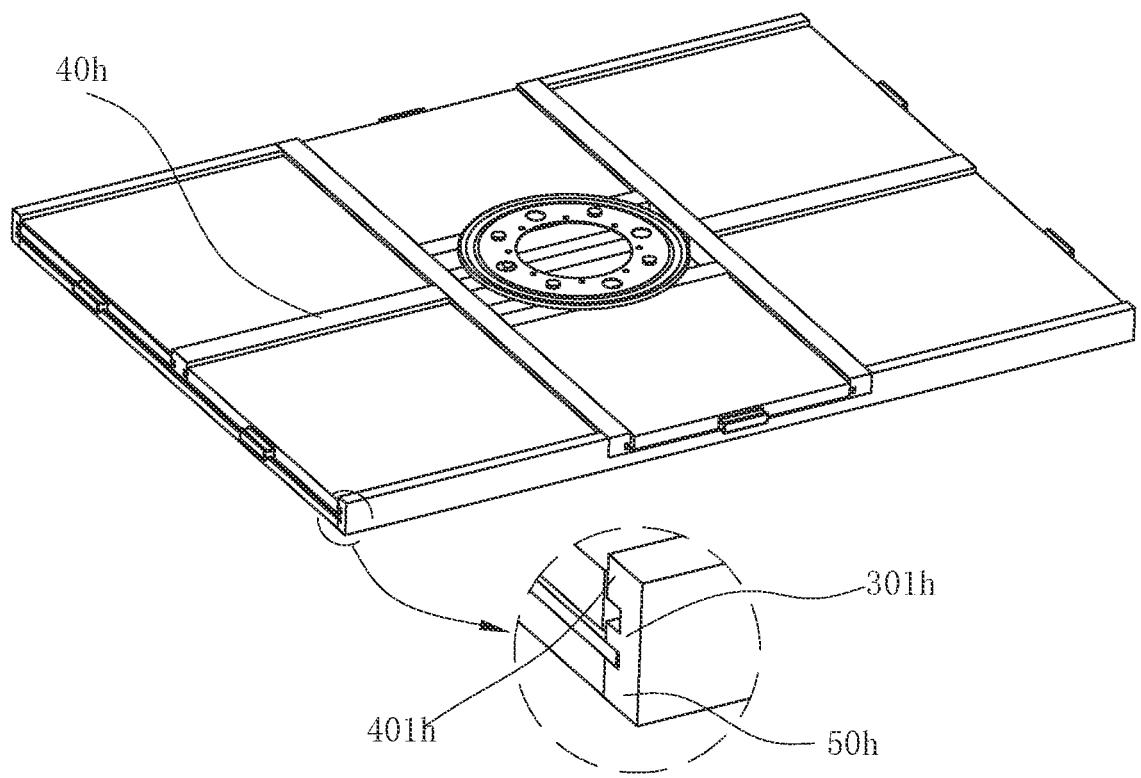
FIG. 62 is an illustrative isometric view of the movable puzzle platform shown in FIG. 58, but from another aspect.

FIGS. 48-50 show a movable puzzle platform 1c of a sixth embodiment of the present invention comprises a board assembly 90g, a kickstand 15g pivotally coupled at the board assembly 90g and a rotating assembly 20g attached on the kickstand 15g. The board assembly 90g comprises a puzzle board 10g, a supplement arrangement 30g attached on the puzzle board 10e, and a restricting wall 50g upwardly extended from a peripheral edge of the puzzle board 10g. The sixth embodiment is similar to the fifth embodiment of the present invention except that: the board assembly 90g further comprises a base 40g. The base 40g comprises a base portion 401g covered on the supplement arrangement 30g and a base opening 402g surrounded by the base portion 401g and provided in a center of the base 40g for avoiding the kickstand 15g colliding with the base portion 401g.

FIGS. 51-57 show a movable puzzle platform 1f of a seventh embodiment of the present invention, wherein the movable puzzle platform 1f is arranged for a user or a player to assemble a plurality of puzzle pieces 100f thereon. The movable puzzle platform 1f comprises a board assembly 90f and a rotating assembly 20f attached on the board assembly 90f. The board assembly 90f comprises a puzzle board 10f, a supplement arrangement 30f attached on the puzzle board 10f, and a restricting wall 50f upwardly extended from the puzzle board 10f. The puzzle board 10f comprises a puzzle plate 101f and a fixing portion 102f extending from the edge of the puzzle plate 101f. The puzzle plate 101f comprises a flat playing surface 11f and a bottom surface 12f opposite to the playing surface 11f. The puzzle board 10f is embodied to have a rectangular shape defining two longer longitudinal sides provided along a longitudinal direction X and two shorter transverse sides provided along a lateral direction Y perpendicular to the longitudinal direction X.

In this embodiment, the restricting wall 50f is substantially perpendicular to the puzzle board 10f and is generally four-piece type. The restricting wall 50f comprises a first extending wall 51f mounted on the fixing portion 102f and arranged in the longitudinal direction X, a second extending wall 52f mounted on the fixing portion 102f and spaced apart from the first extending wall 51f, a third extending wall 53f mounted on the fixing portion 102f and arranged in the lateral direction Y for connected with the adjacent first and second extending walls 51f, 52f, and a fourth extending wall 54f mounted on the fixing portion 102f and spaced apart from the third extending wall 53f for connected with the adjacent first and second extending walls 51f, 52f. The first and second extending walls 51f, 52f are parallel to each other in the longitudinal direction X. The third and fourth extending walls 53f, 54f are parallel to each other in the lateral direction Y. The restricting wall 50f is configured for preventing the players from accidentally or unintentionally pushing the puzzle pieces 100f off the puzzle plate 1f.

The supplement arrangement 30f comprises a supporting portion 301f connected with the bottom surface 12f of the puzzle plate 101f for forming at least one drawer cavity 31f and at least one puzzle drawer 32f received in the corresponding drawer cavity 31f. The supporting portion 301f comprises a first main supporting wall 311f attached on the bottom surface 12f of the puzzle board 10f along the longitudinal direction X, a second main supporting wall 312f attached on the bottom surface 12f of the puzzle board 10 along the longitudinal direction X and disposed opposite to the first main supporting wall 311f, a first dividing supporting wall 313f attached on the bottom surface 12f of the puzzle board 10f along the longitudinal direction X and disposed between the first and second main supporting walls 311f, 312f, a second dividing supporting wall 314f attached on the bottom surface 12f of the puzzle board 10f along the longitudinal direction X and disposed between the first and second main supporting walls 311f, 312f, a first inner supporting wall 315f attached on the bottom surface 12f of the puzzle board 10f along the lateral direction Y and connected with the first and second main supporting walls 311f, 312f, and a second inner supporting wall 316f attached on the bottom surface 12f of the puzzle board 10f along the lateral direction Y and connected with the first and second main supporting walls 311f, 312f. The first and second dividing supporting walls 313f, 314f are spaced apart from each other. The first and second inner supporting walls 315f, 316f are spaced apart from each other and disposed parallel to each other. The first and second dividing supporting walls 313f, 314f and the first and second main supporting walls 311f, 312f are disposed parallel to each other. The first dividing supporting wall 313f connects with the first inner supporting wall 315f and the second dividing supporting wall 314f connects with the second inner supporting wall 316f.

The restricting wall 50f and the fixing portion 102f of the puzzle board 10f are successively stacked on the supporting portion 301f by suitable chemical or mechanical methods such as but not limited to glue or wood screws. Particularly, the first extending wall 51f and the fixing portion 102f of the puzzle board 10f are successively stacked on the first main supporting wall 311f. The second extending wall 52f and the fixing portion 102f of the puzzle board 10f are successively stacked on the second main supporting wall 312f. The third extending wall 53f is directly stacked on the fixing portion 102f of the puzzle board 10f and the fourth extending wall 54f is directly stacked on the fixing portion 102f of the puzzle board 10f. When assembled, the side of the fixing portion 102f is exposed out of the first through fourth restricting walls 51f-54f and the first and second main supporting wall 311f, 312f, thus reducing difficulties in assembling of the movable puzzle platform and improving manufacturing efficiency. Each of extending walls comprises an inner surface 57f, an outer surface 58f opposite to the inner surface 57f, and a pair of side surfaces 59f connecting the inner and outer surfaces 57f, 58f. The side surface of the extending wall is engaged with the side surface of the adjacent extending wall. Particularly, the side surface of the first and second extending walls 51f, 52f are engaged with the side surface of the adjacent third and fourth extending walls 53f, 54f, respectively.

The base 40f is stacked on the supporting portion 301f of the supplement arrangement 30 by glue. The base 40f is generally the type of one-piece with a whole entirety platy shape and have a rectangular shape for matching and coving the supporting portion 301. In this embodiment, the rotating assembly 20 is directly mounted on the base 40f. Each of the puzzle drawer 32d comprises a rectangular bottom panel 321d slidably received in the corresponding drawer cavity 31d and slid on the base 40 directly.

FIGS. 58-62 show a movable puzzle platform 1h of an eighth embodiment of the present invention, wherein the movable puzzle platform 1h is arranged for a user or a player to assemble a plurality of puzzle pieces 100h thereon. The movable puzzle platform 1h comprises a board assembly 90h, a kickstand 15h pivotally coupled at the board assembly 90h and a rotating assembly 20h attached on the kickstand 15h. The board assembly 90h comprises a puzzle board 10h, a supplement arrangement 30h attached on the puzzle board 10h, and a restricting wall 50h upwardly extended from the puzzle board 10h. The puzzle board 10h comprises a puzzle plate 101h and a fixing portion 102h extending from the edge of the puzzle plate 101h. The puzzle plate 101h comprises a flat playing surface 11h and a bottom surface 12h opposite to the playing surface 11h. The puzzle board 10h is embodied to have a rectangular shape defining two longer longitudinal sides provided along a longitudinal direction X and two shorter transverse sides provided along a lateral direction Y perpendicular to the longitudinal direction X.

The supplement arrangement 30h comprises a supporting portion 301h connected with the bottom surface 12h of the puzzle plate 101h for forming at least one drawer cavity 31h and at least one puzzle drawer 32h received in the corresponding drawer cavity 31h. The base 40h comprises a plurality of holding portions 401h with same shape arranged on the corresponding supporting portion 301h and positioned spaced from each other. Each of the holding portions 401h is substantially strip-shaped and connected with the corresponding supporting portion 301h for form a L-shaped structure. Each of the puzzle drawer 32h is partly exposed from the corresponding holding portions 401h. The holding portions 401h are integral with the corresponding supporting portion 301h as a whole. It is optional that the plurality of holding portions of the base is detachably stacked on the corresponding supporting portion by glue. Each of the holding portions 401h is not only holding the puzzle drawer 32 and preventing the puzzle drawer 32 from falling off the supporting portion, but also for allowing each of the puzzle drawer 32 to be slid thereon. Particularly, referring to FIG. 62, the plurality of holding portions 401h of the base 40h are integral with the corresponding supporting portion 301h and the restricting wall 50h as a whole.

Figure 63:
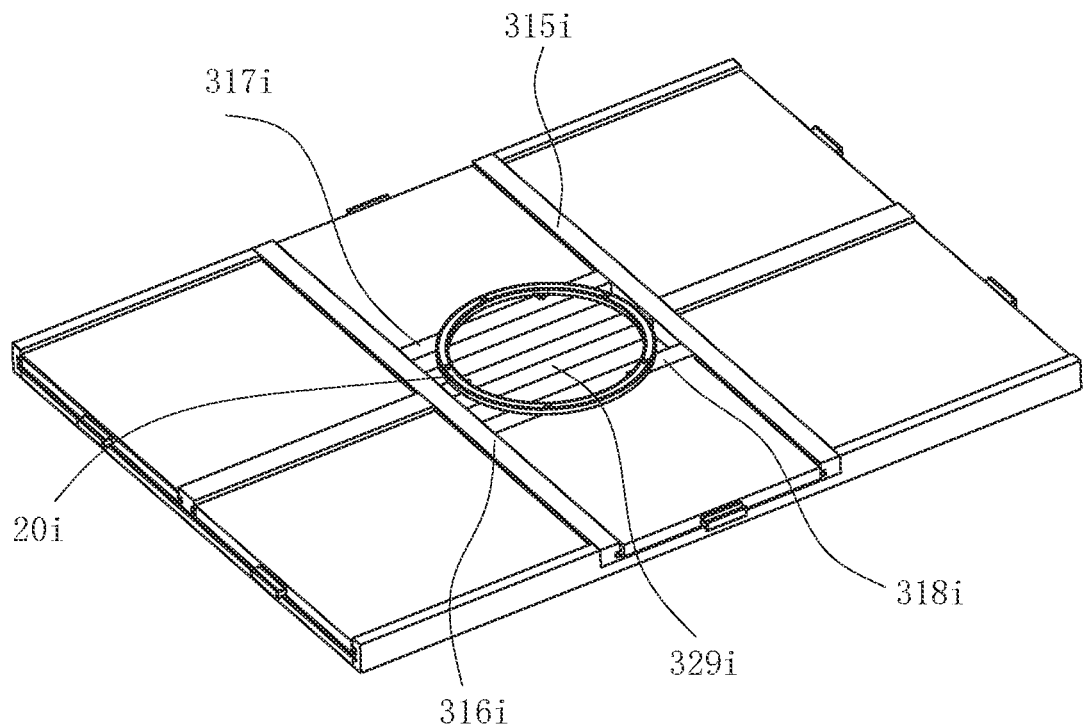
FIG. 63 is an illustrative isometric view of a movable puzzle platform according to a ninth embodiment of the present invention.

Referring to FIG. 63, show a movable puzzle platform 1i of a ninth embodiment of the present invention. The ninth embodiment is similar to the fourth embodiment of the present invention except that an outer diameter of a rotating assembly 20i is smaller than a distance from a first inner supporting wall 315i to a second inner supporting wall 316i. A supporting portion further comprises at least one fixing arm 329i arranged between a third dividing supporting wall 317i and a fourth dividing supporting wall 318i. The rotating assembly 20i is connected with the fixing arm 329i and the third and fourth dividing supporting walls 317i, 318i, respectively.

Figure 64:
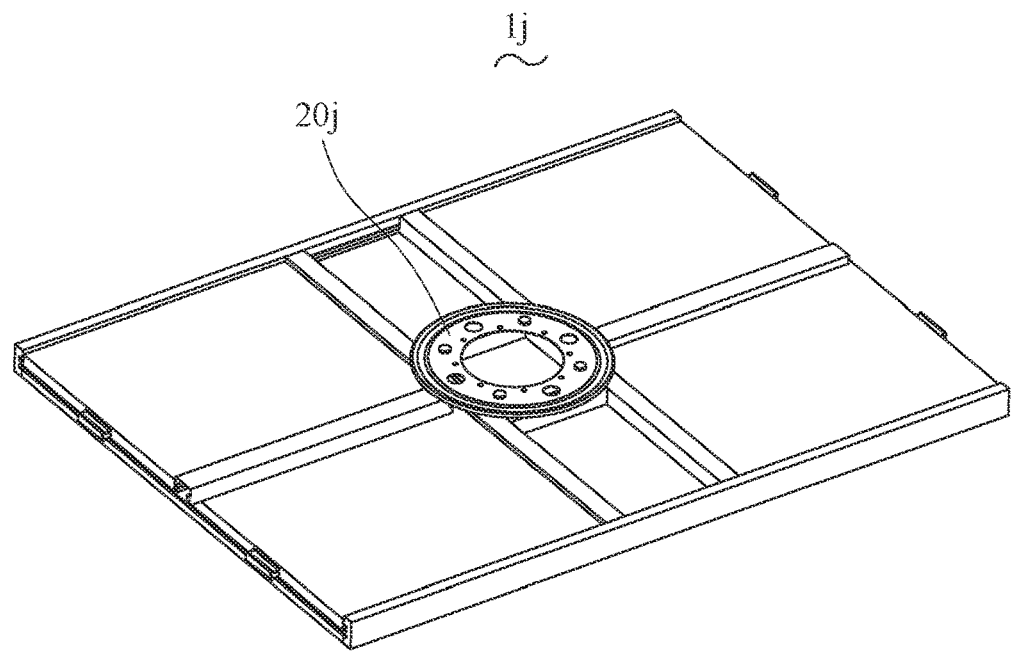
FIG. 64 is an illustrative isometric view of a movable puzzle platform according to a tenth embodiment of the present invention.
Figure 65:
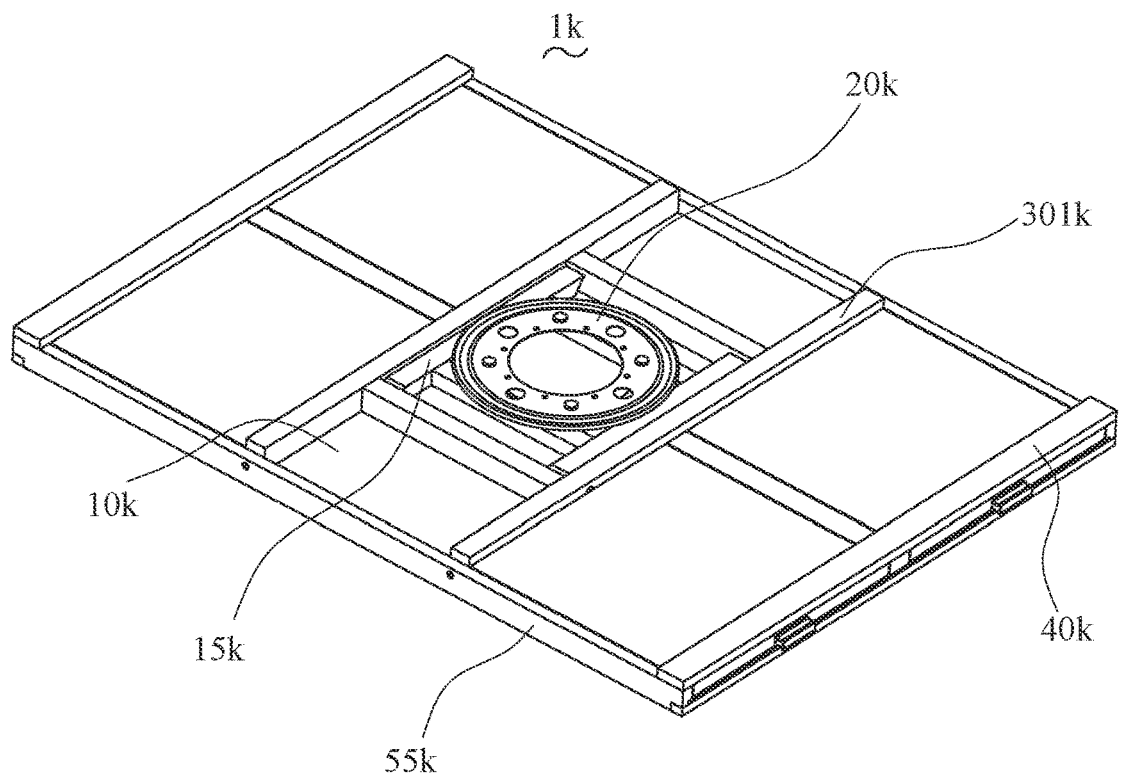
FIG. 65 is an illustrative isometric view of a movable puzzle platform according to an eleventh embodiment of the present invention.
Figure 66:
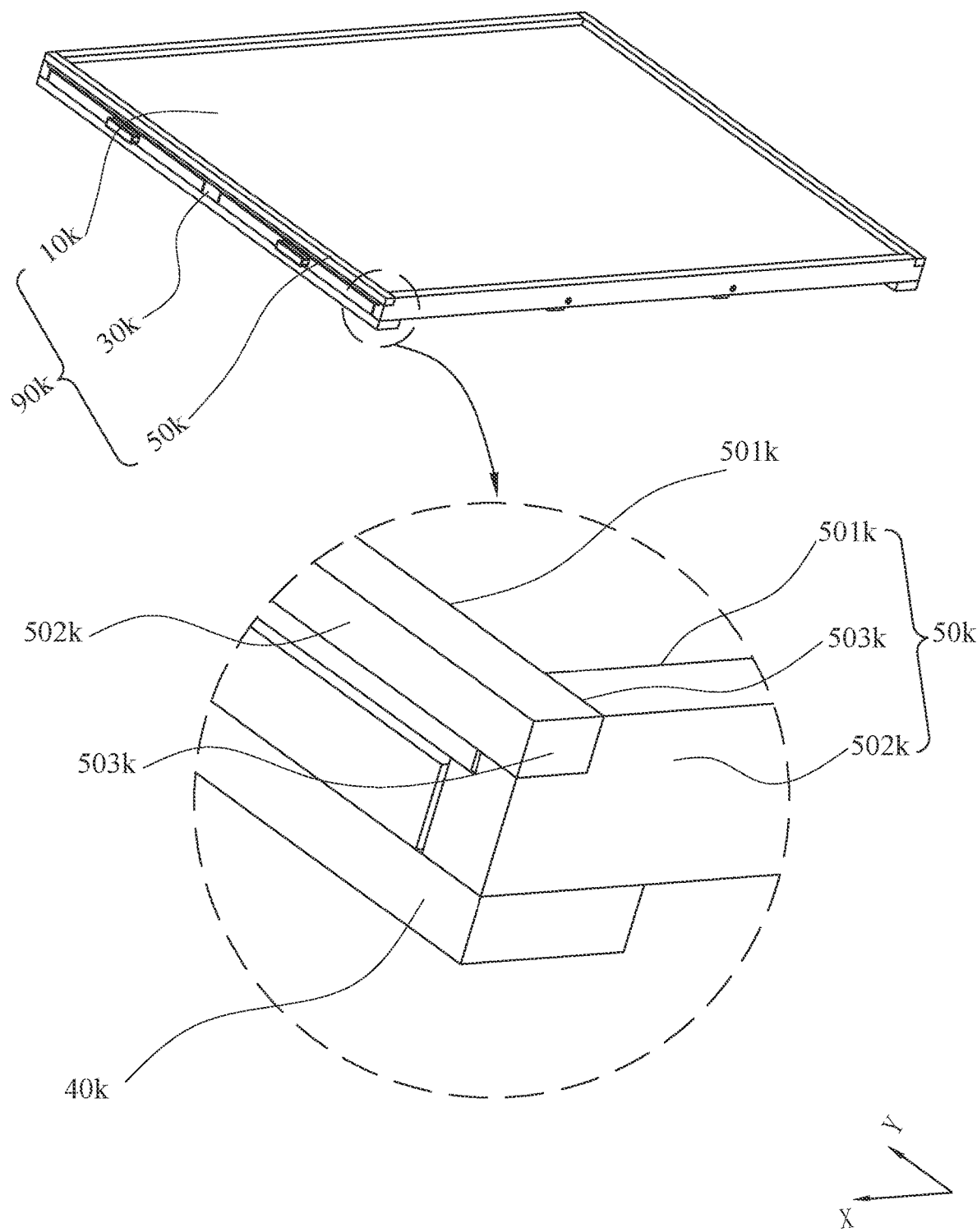
FIG. 66 is an illustrative isometric view of the movable puzzle platform shown in FIG. 65, but from another aspect.
Figure 67:
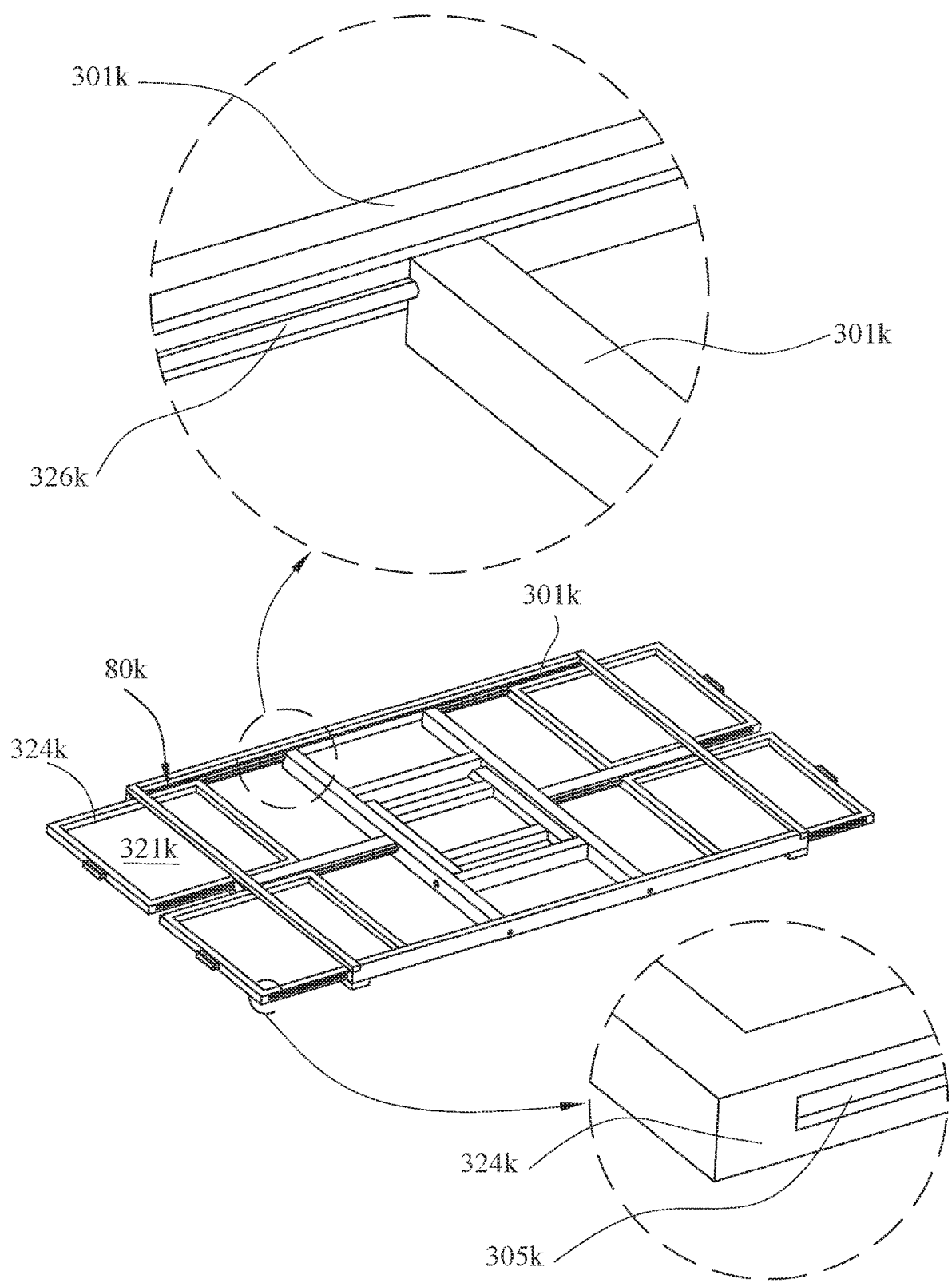
FIG. 67 is an illustrative isometric view of the movable puzzle platform of the shown in FIG. 65, a puzzle board and a rotating assembly thereof being removed away and puzzle drawers thereof being partially pulled out of a corresponding drawer cavity.
Figure 68:
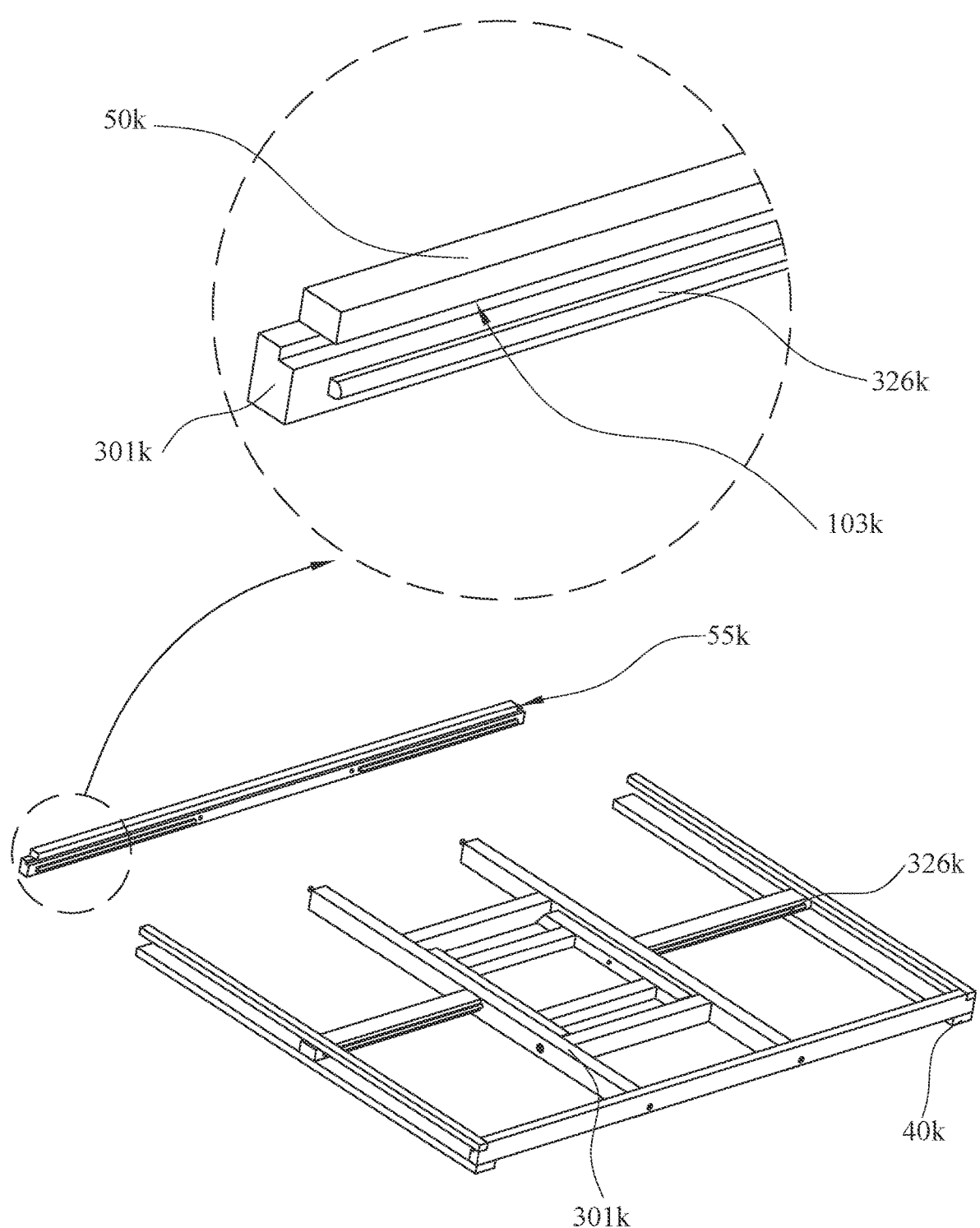
FIG. 68 is a partially exploded perspective view of the movable puzzle platform shown in FIG. 67, the puzzle board and the rotating assembly thereof being removed away and the puzzle drawers thereof being removed away.
Figure 69:
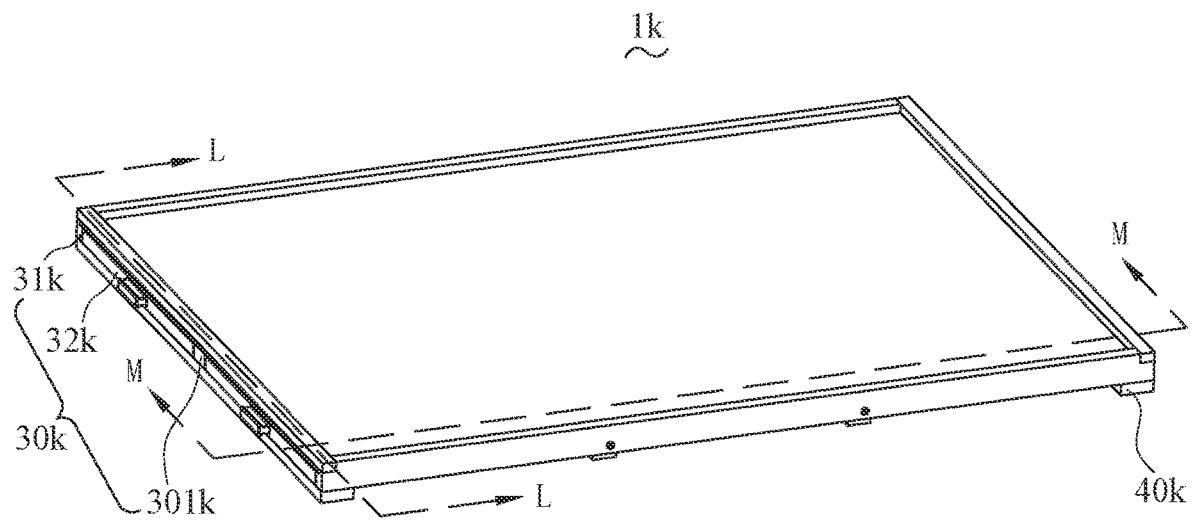
FIG. 69 is an illustrative isometric view of the movable puzzle platform shown in FIG. 65, but from another aspect.
Figure 70:
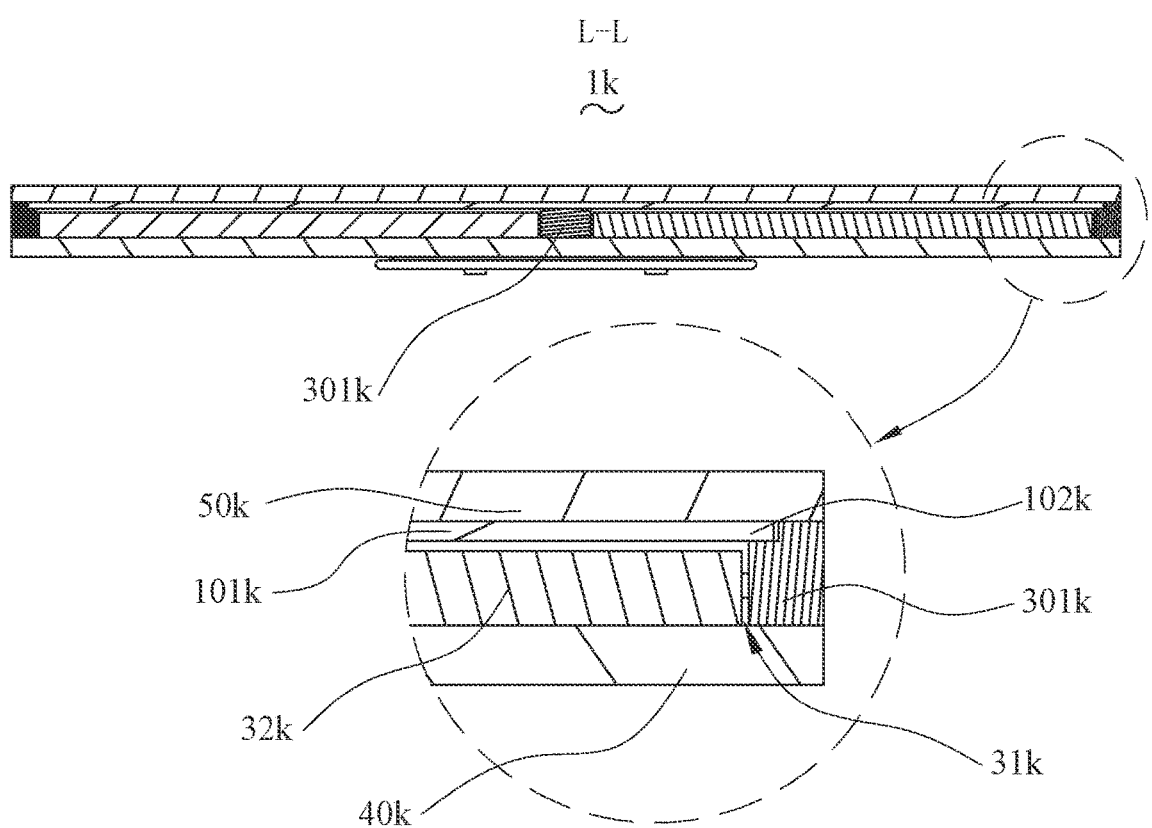
FIG. 70 is a cross-sectional view of the movable puzzle platform taken along line L-L of FIG. 69.
Figure 71:
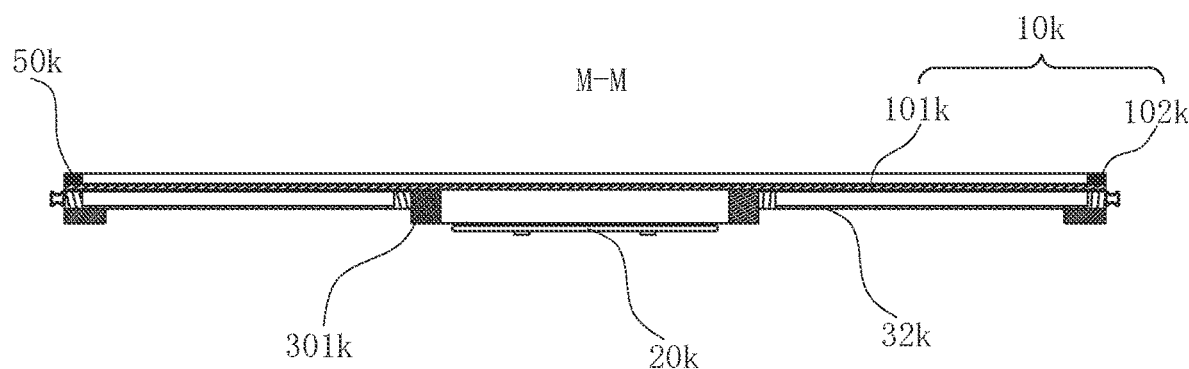
FIG. 71 is a cross-sectional view of the movable puzzle platform taken along line M-M of FIG. 69.

Referring to FIG. 64, show a movable puzzle platform 1j of a tenth embodiment of the present invention. The tenth embodiment is similar to the fourth embodiment of the present invention except that a structure of rotating assembly 20j is similar to that of the fifth embodiment of the present invention.

Referring to FIGS. 65-71, show a movable puzzle platform 1k of an eleventh embodiment of the present invention. The movable puzzle platform 1k comprises a board assembly 90k, a kickstand 15k pivotally coupled at the board assembly 90k and a rotating assembly 20k attached on the kickstand 15k. The board assembly 90k comprises a puzzle board 10k, a supplement arrangement 30k attached on the puzzle board 10k, an extending wall 50k upwardly extended from a peripheral edge of the puzzle board 10k and a base 40k is stacked on and detachably fastened to the supplement arrangement 30k. The puzzle board 10k comprises a puzzle plate 101k and a fixing portion 102k extending from the edge of the puzzle plate 101k. The puzzle board 10K is embodied to have a rectangular shape defining two longer longitudinal sides provided along a longitudinal direction X and two shorter transverse sides provided along a lateral direction Y perpendicular to the longitudinal direction X.

The supplement arrangement 30k comprises at least one puzzle drawer 32k, at least one drawer cavity 31k for receiving the corresponding puzzle drawer 32k, and a supporting portion 301k connected with the bottom surface 12k of the puzzle plate 101k for forming the drawer cavity 31k. The movable puzzle platform 1k further comprises a complementary conformation 80k provided between the puzzle drawer 32k and the corresponding supporting portion 301k for holding the puzzle drawer 32k and preventing the puzzle drawer 32k from falling off the supporting portion 301k. Each of the puzzle drawer 32k comprises a rectangular bottom panel 321k slidably received in the corresponding drawer cavity 31k and a pair of side panels 324k extending from the bottom panel 321k. The complementary conformation 80d comprises a pair of engaging slots 305k provided on the pair of side panels 324k, and a pair of engaging portions 326k extending outwardly from the corresponding supporting portion 301k for inserted into the corresponding engaging slots 305k. In usage state, each of the engaging slot 305k is configured for smoothly sliding in the corresponding engaging portions 326k. The extending direction of the slots 305k is parallel to that of the corresponding supporting portion 301k. Each of the engaging portions 326k is connected with the corresponding supporting portion 301k, directly.

The extending wall 50k is substantially perpendicular to the puzzle board 10k and comprises at least a pair of extending walls assembled edge-to-edge. Each of extending walls 50k comprises an inner surface 501k, an outer surface 502k opposite to the inner surface 501k, and a pair of side surface 503k connecting the inner and outer surfaces 501k, 502k. The side surface of the extending wall 503k is engaged with the inner surface 501k of the adjacent extending wall 50k. In other words, the side surface of extending wall extending along the lateral direction Y is engaged with the inner surface of the adjacent extending wall extending along the longitudinal direction X. The longitudinal side surface is exposed from the adjacent lateral extending wall.

In this embodiment, the extending wall 50k is integral with the corresponding supporting portion 301k as a whole for forming a monolithic portion 55k. The monolithic portion 55k comprises a receiving space 103k for fixing and receiving the fixing portion 102k of the puzzle board 10k.

Figure 72:
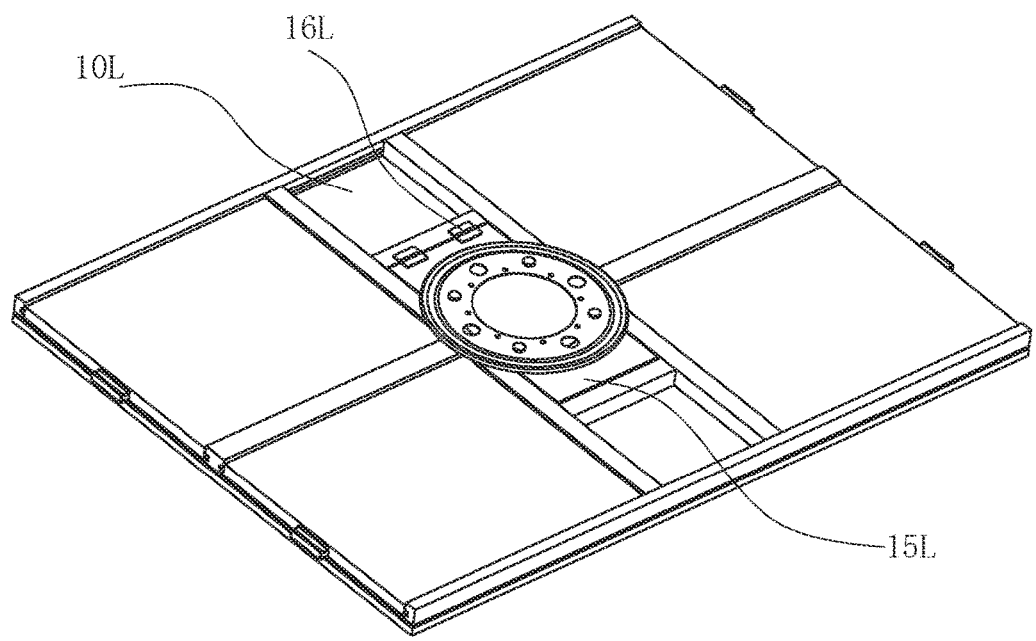
FIG. 72 is an illustrative isometric view of a movable puzzle platform illustrating another mode of a kickstand being in close position.
Figure 73:
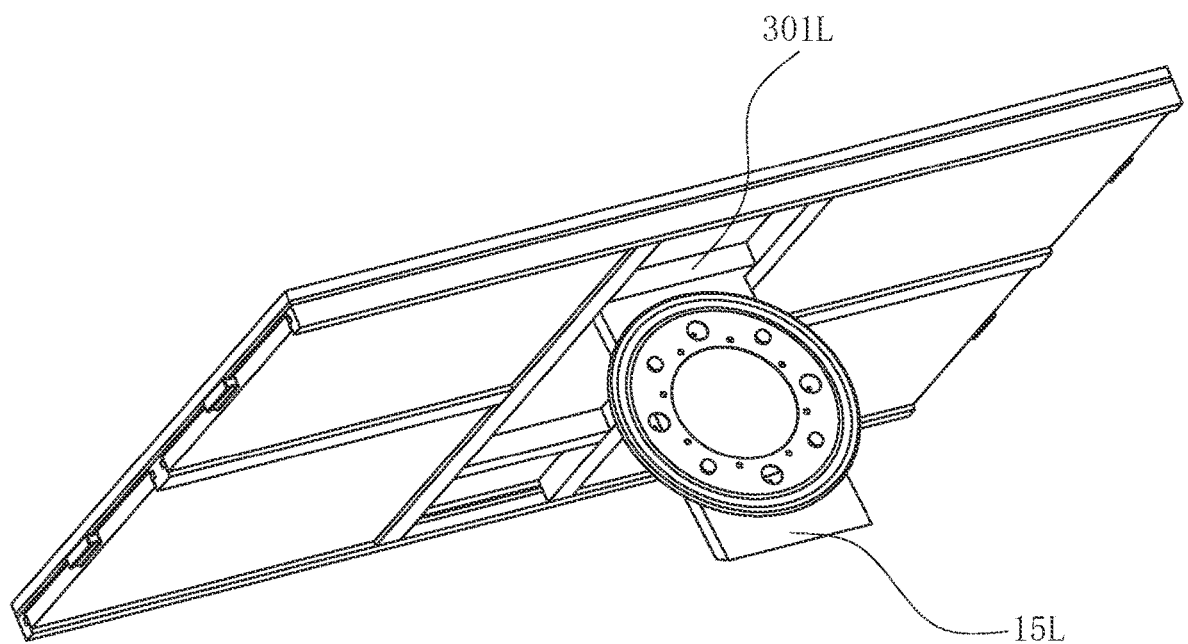
FIG. 73 is an illustrative isometric view of the movable puzzle platform illustrating the kickstand shown in FIG. 72 being in open position.
Figure 74:
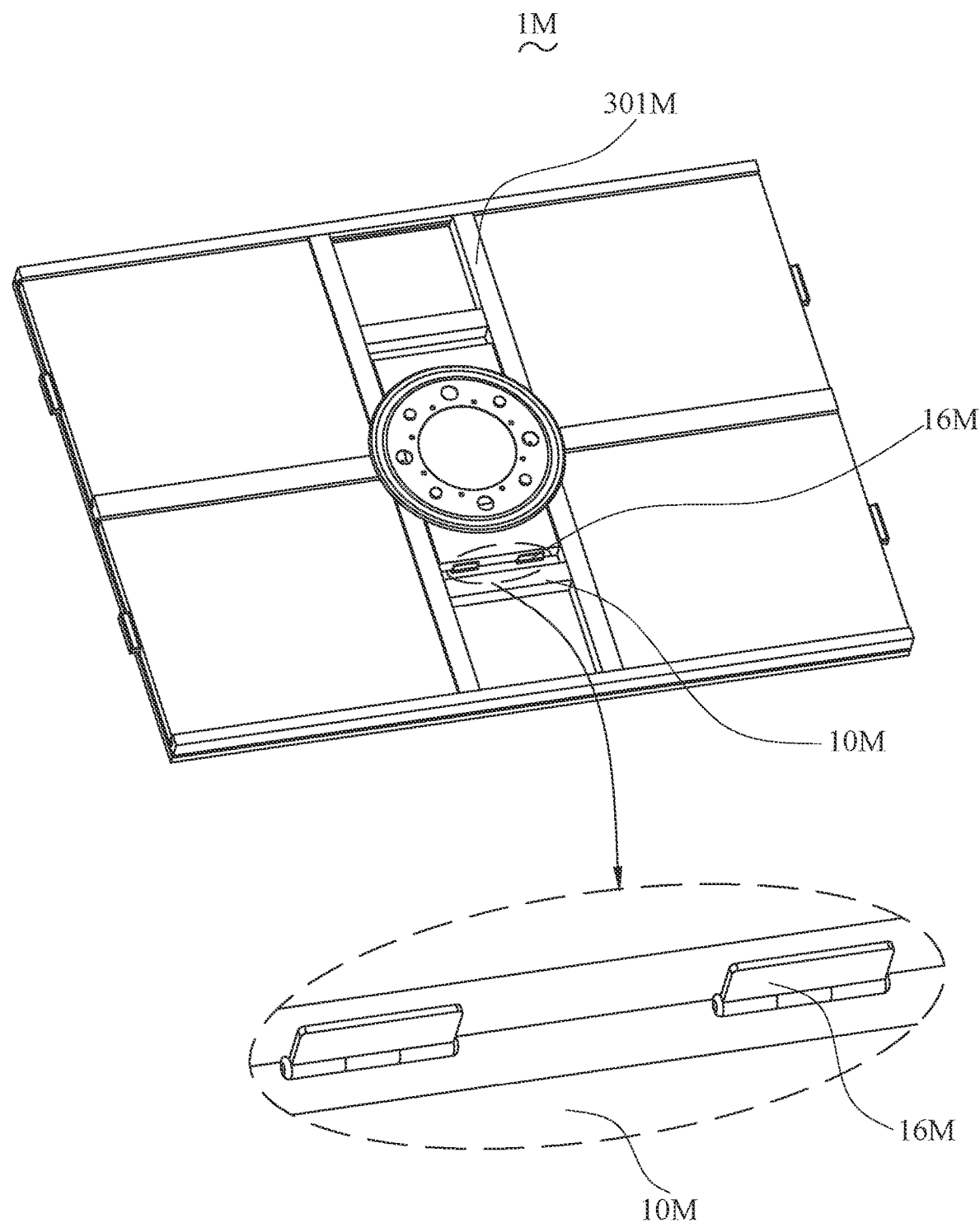
FIG. 74 is an illustrative isometric view of a movable puzzle platform illustrating a third mode of a kickstand being in close position.
Figure 75:
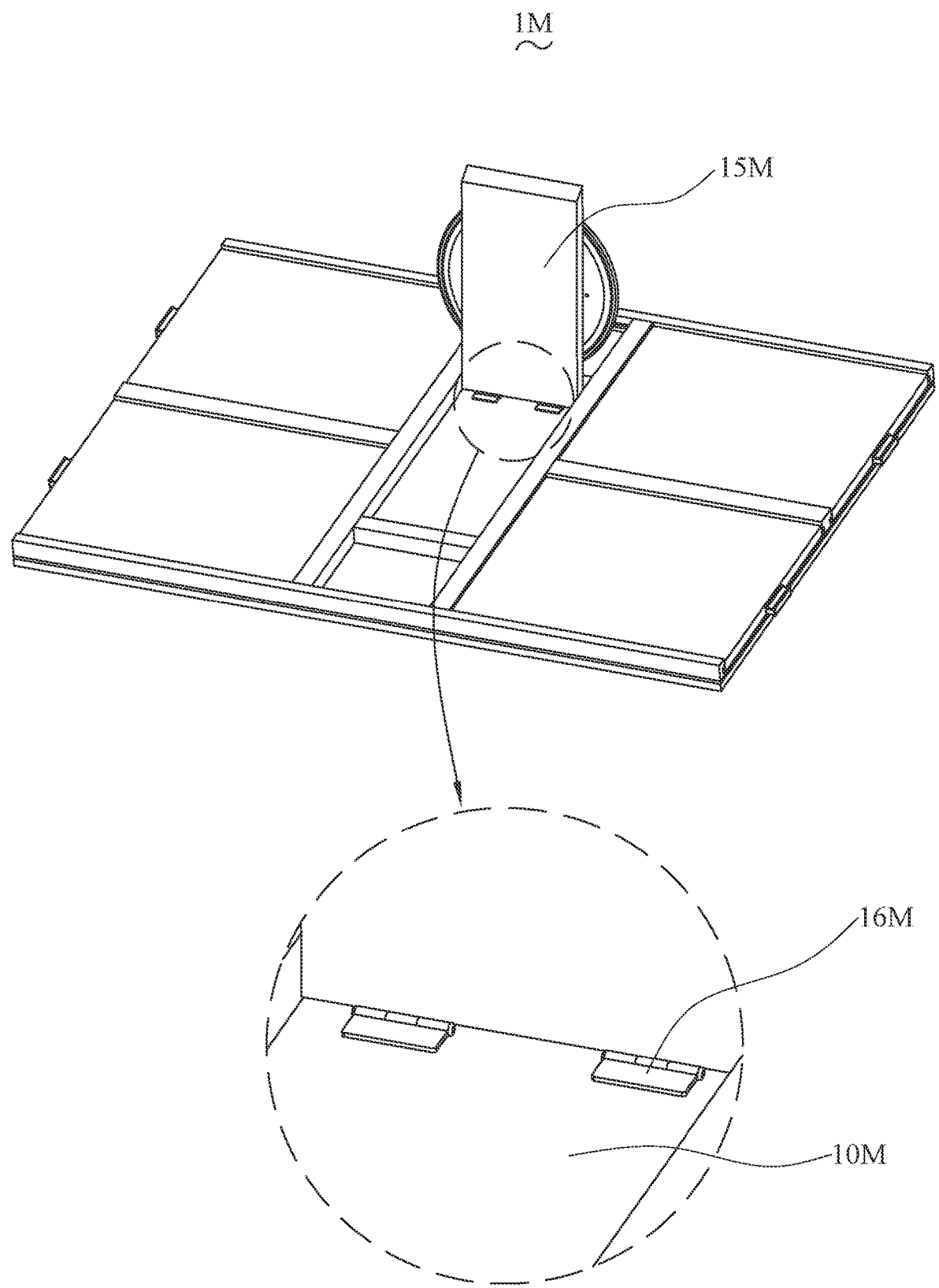
FIG. 75 is an illustrative isometric view of the movable puzzle platform illustrating the kickstand shown in FIG. 74 being in open position.
Figure 76:
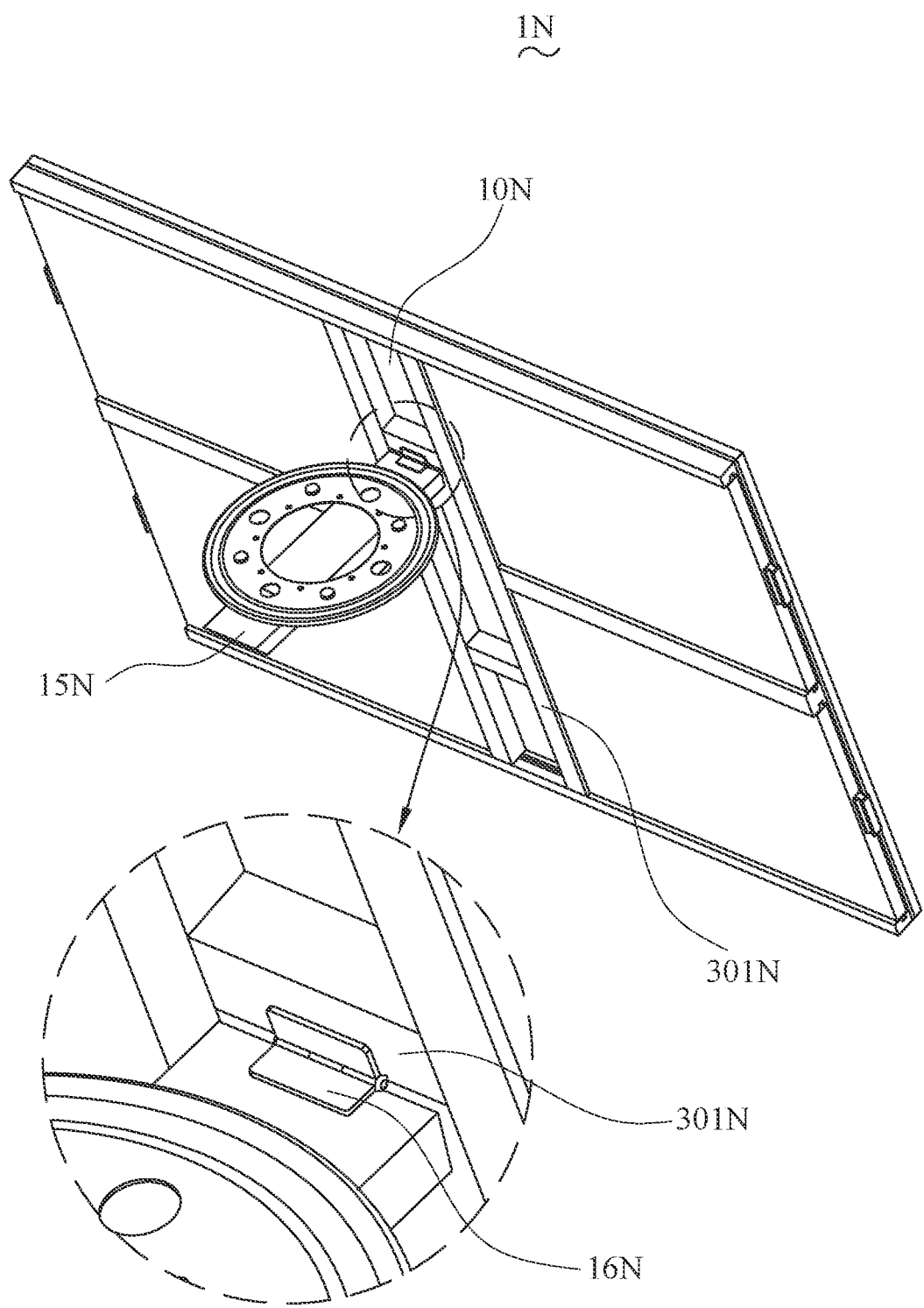
FIG. 76 is an illustrative isometric view of a movable puzzle platform illustrating a fourth mode of a kickstand being in open position.
Figure 77:
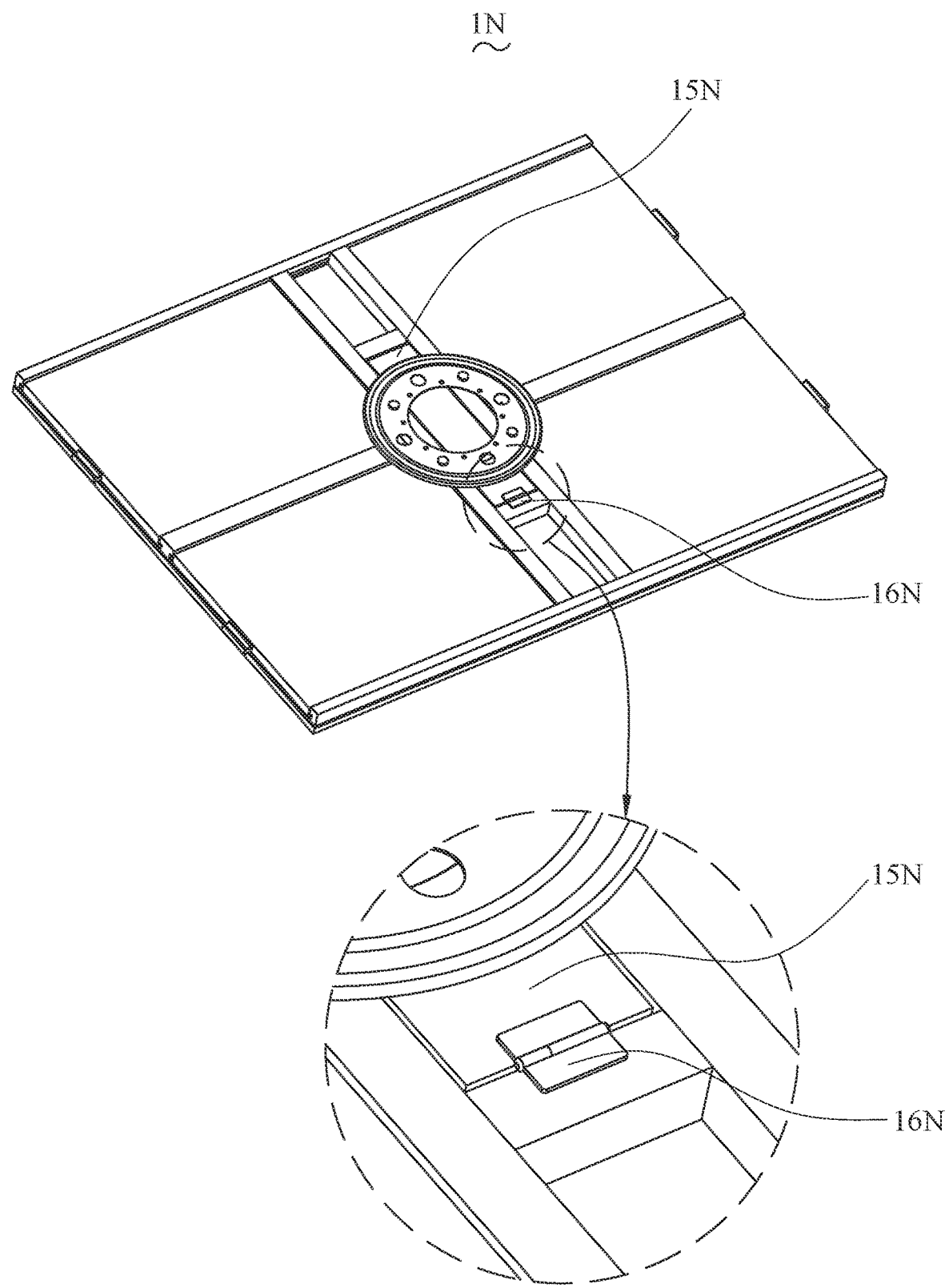
FIG. 77 is an illustrative isometric view of the movable puzzle platform illustrating the kickstand shown in FIG. 76 being in close position.

Although the kickstand 15 is shown in the fifth embodiment to be generally H-shaped, those skilled in the art will recognize that numerous different shapes could be used in place of the H-shaped kickstand 15 to achieve the desired function as described herein. More specifically but not by way of limitation the kickstand 15 could be cylindrical, circular, square and so on. Referring to FIGS. 72-73, a movable puzzle platform 1L comprises a puzzle board 10L, a supporting portion 301L supporting the puzzle board 10L, and a kickstand 15L attached on the supporting portion 301L. The kickstand 15L could be a planar plate with a rectangle shape and connected with the supporting portion 301L of the via a hinge 16L. Referring to FIGS. 74-75, a movable puzzle platform 1M comprises a puzzle board 10M, a supporting portion 301M supporting the puzzle board 10M, and a kickstand 15M attached on the puzzle board 10M. The kickstand 15M could be a planar plate with a rectangle shape and connected with the puzzle board 10M of the via at least a pair of hinges 16M. Referring to FIGS. 76-77, a movable puzzle platform 1N comprises a puzzle board 10N, a supporting portion 301N supporting the puzzle board 10N, and a kickstand 15N attached on the supporting portion 301N. The kickstand 15L could be substantially strip-shaped and connected with the supporting portion 301N of the via at least a hinge 16N.

The puzzle board is made of plastic, wood, or metal. When the puzzle board is made of plastic by molding, the restricting wall is preferred to be integrally molded on the puzzle plate as a whole. Optionally, the restricting wall can be stacked on the puzzle plate and integrally glued to the puzzle plate. When the puzzle board is made of metal by stamping, the restricting wall is preferred to be integrally molded on the puzzle plate. Optionally, the restricting wall can be stacked on the puzzle plate and integrally welded to the puzzle plate as a whole. When the puzzle board is made of wood, the restricting wall is preferred to be integrally molded on the puzzle plate as a whole. Optionally, the restricting wall can be stacked on the puzzle plate and integrally glued to the puzzle plate. If the puzzle board is made of aluminum, the weight of the puzzle board can be reduced. If the puzzle board is made of stainless steel or tempered steel, the structural strength of the puzzle board can be improved. If the puzzle board is made of plastic or wood, the manufacturing cost of the puzzle board can be reduced. It is worth mentioning that, the restricting wall and the puzzle plate can be secured together by threads, snap-fit, friction fit, etc., to fix the restricting wall on the puzzle plate. It is appreciated that the puzzle plate and the restricting wall can be made of different materials. The puzzle plate and the restricting wall may be fabricated in any desired manner, using any acceptable material.

Figure 78:
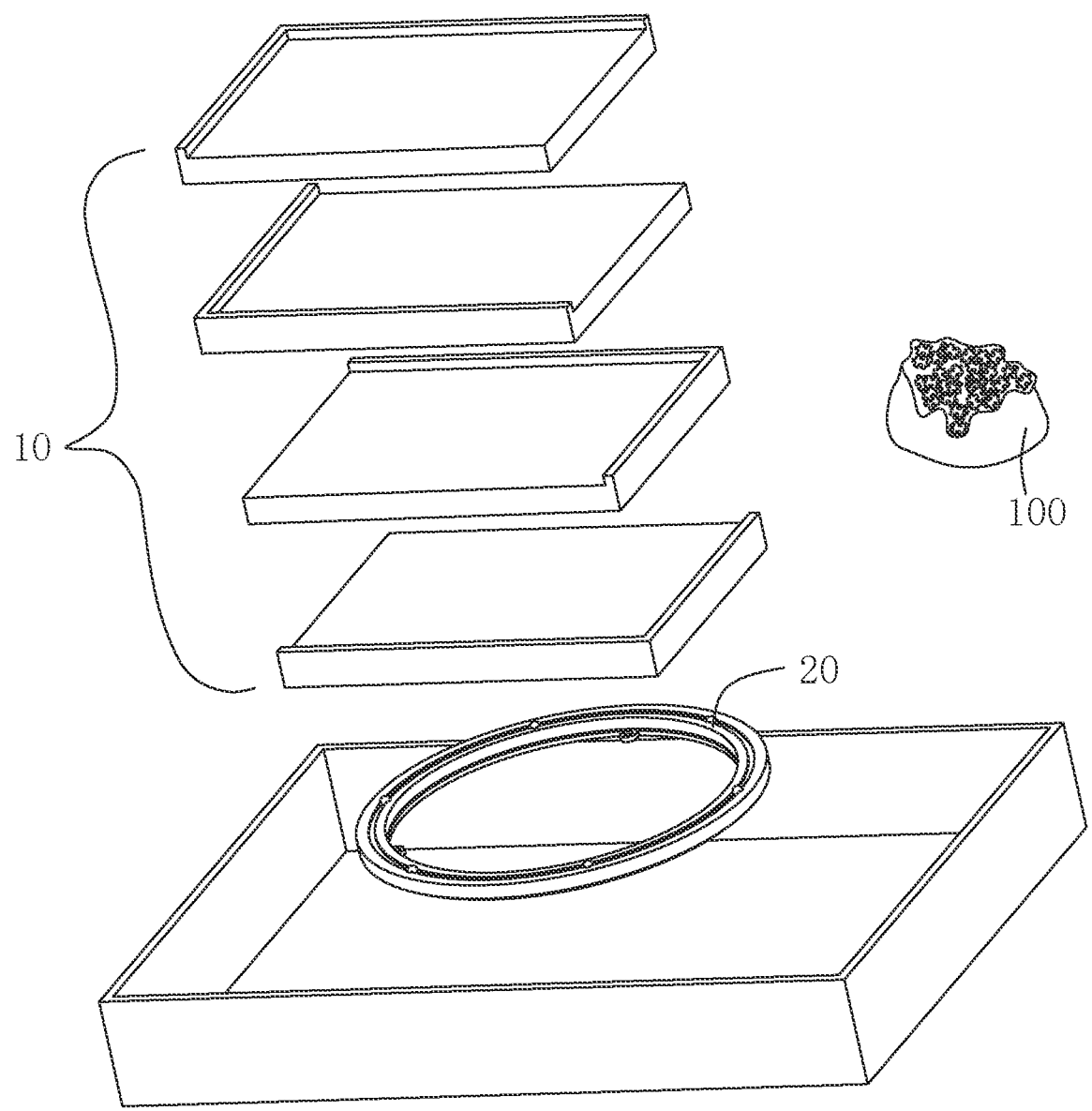
FIG. 78 is a perspective view of the movable puzzle platform incorporating with the puzzle pieces to form a puzzle game kit according to the above preferred embodiment of the present invention.

In one application, as shown in FIG. 78, the movable puzzle platform of the present invention can be incorporated with the puzzle pieces 100 to form a puzzle game kit. Particularly, the area of the playing surface 11 matches with the area of the puzzle pieces 100 after the puzzle pieces 100 are assembled, such that the puzzle board 10 serves as a puzzle frame for framing the puzzle pieces 100 after the puzzle pieces 100 are assembled. Furthermore, the puzzle board 10 is constructed to have a plurality of supplement arrangement 30. Therefore, the supplement arrangement 30, the rotating assembly 20 and the puzzle pieces 100 are packed in a box. In order to play the puzzle pieces 100, the board panels can be assembled edge-to-edge to form the puzzle board 10. Then, the rotating assembly 20 can be coupled at the bottom side 11 of the puzzle board 10 to form the movable puzzle platform for the user to move the puzzle board 10 on the playing surface and to assemble the puzzle pieces 100 on the playing surface 11 of the puzzle board 10. Once the puzzle pieces 100 are completely assembled on the playing surface 11 of the puzzle board 10, the rotating assembly 20 can be detached from the bottom side 11 of the puzzle board 10, such that the puzzle board 10 forms the puzzle frame for framing the puzzle pieces 100.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A movable puzzle platform comprising:
   a board assembly comprising:
      a puzzle board comprising a puzzle plate and a fixing portion extending from the puzzle plate;
      a supplement arrangement comprising a supporting portion having a first main supporting wall attached on the bottom surface of the puzzle board; and
      a restricting wall having a first extending wall upwardly extended from the fixing portion;
   wherein the first extending wall is integral with a periphery of the first main supporting wall as a whole for forming a first receiving space for fixing the puzzle board;
   wherein the supporting portion further comprises a second main supporting wall attached on the bottom surface of the puzzle board and disposed apart from the first main supporting wall, and the restricting wall further comprises a second extending wall extended from the fixing portion of the puzzle board and integral with a periphery of the second main supporting wall for forming a second receiving space for fixing the puzzle board;
   wherein the restricting wall further comprises third extending wall mounted on the fixing portion and connected with the first and second extending walls, and a fourth extending wall mounted on the fixing portion and spaced apart from the third extending wall for being connected with the first and second extending walls; and
   wherein the supporting portion further comprises a first inner supporting wall attached on the bottom surface of the puzzle board for improving the structural strength of the puzzle board.

2. The movable puzzle platform, as recited in claim 1, wherein an upper surface of the puzzle plate is coplanar with respect to an upper surface of the fixing portion.

3. The movable puzzle platform, as recited in claim 1, wherein a thickness of the puzzle plate is substantially equal to a thickness of the fixing portion.

4. The movable puzzle platform, as recited in claim 1, wherein the puzzle plate is integral with the fixing portion as a whole.

5. The movable puzzle platform, as recited in claim 1, wherein the third extending wall comprises a third extending body and a pair of third fastening portions projecting from two ends of the third extending body and inserted and fixed in the first and second receiving spaces.

6. The movable puzzle platform, as recited in claim 1, wherein each of the extending walls comprises an inner surface, an outer surface opposite to the inner surface, and a pair of side surfaces connecting the inner and outer surfaces, the side surface of one extending wall is engaged with the inner surface of the adjacent extending wall.

7. The movable puzzle platform, as recited in claim 1, further comprising a base attached on the supporting portion.

8. The movable puzzle platform, as recited in claim 7, wherein the base comprises a plurality holding portions positioned spaced from each other and connected with the supporting portion.

9. The movable puzzle platform, as recited in claim 7, wherein the base is integral with the supporting portion as a whole.

10. A movable puzzle platform comprising:
    a board assembly comprising:
       a puzzle board comprising a puzzle plate and a fixing portion extending from the puzzle plate;
       a supplement arrangement comprising a supporting portion having a first main supporting wall attached on the bottom surface of the puzzle board; and
       a restricting wall having a first extending wall upwardly extended from the fixing portion;
    wherein the first extending wall is integral with a periphery of the first main supporting wall as a whole for forming a first receiving space for fixing the puzzle board;
    wherein the supporting portion further comprises a second main supporting wall attached on the bottom surface of the puzzle board and disposed apart from the first main supporting wall, and the restricting wall further comprises a second extending wall extended from the fixing portion of the puzzle board and integral with a periphery of the second main supporting wall for forming a second receiving space for fixing the puzzle board;
    wherein the restricting wall further comprises third extending wall mounted on the fixing portion and connected with the first and second extending walls, and a fourth extending wall mounted on the fixing portion and spaced apart from the third extending wall for being connected with the first and second extending walls; and
    wherein the supporting portion further comprises a first dividing supporting wall positioned below the bottom surface of the puzzle board for improving the structural strength of the board assembly.

11. The movable puzzle platform, as recited in claim 10, wherein the third extending wall is partly overlapped with the first dividing supporting wall in a thickness direction of the board assembly.

12. The movable puzzle platform, as recited in claim 10, wherein a thickness of the puzzle plate is substantially equal to a thickness of the fixing portion.

13. The movable puzzle platform, as recited in claim 10, wherein the puzzle plate is integral with the fixing portion as a whole.

14. The movable puzzle platform, as recited in claim 10, wherein each of the extending walls comprises an inner surface, an outer surface opposite to the inner surface, and a pair of side surfaces connecting the inner and outer surfaces, the side surface of one extending wall is engaged with the inner surface of the adjacent extending wall.

15. The movable puzzle platform, as recited in claim 10, further comprising a base attached on the supporting portion, the base comprises a plurality holding portions positioned spaced from each other and connected with the supporting portion.

16. A movable puzzle platform comprising:
a board assembly comprising:
   a puzzle board comprising a puzzle plate and a fixing portion extending from the puzzle plate;
   a supplement arrangement comprising a supporting portion having a first main supporting wall attached on the bottom surface of the puzzle board;
   a restricting wall having a first extending wall upwardly extended from the fixing portion; and
a rotating assembly attached on the board assembly;
wherein the first extending wall is integral with a periphery of the first main supporting wall as a whole for forming a first receiving space for fixing the puzzle board; and
wherein the rotating assembly comprises a first moving member, a second moving member rotatably coupled to the first moving member and at least one ball bearing sandwiched between the first and second moving members, the second moving member comprises a flat second middle portion and a second projecting portion extending from the center of the second middle portion toward the first moving member for engaging with the ball bearing together with the first moving member.

17. The movable puzzle platform, as recited in claim 16, wherein the rotating assembly comprises a first moving member, a second moving member rotatably coupled to the first moving member and a bearing unit coupled between the first and second moving members and comprising a plurality of retaining holes and a plurality of ball bearings being rotatably retained in the corresponding retaining hole in a rotatable manner, each of the retaining holes comprises at least one locking opening and a connecting hole smoothly connected with the locking opening, a diameter of the locking opening is slightly smaller than that of the corresponding ball bearing for locking the ball bearing in position respectively while allowing the ball bearing in a free rolling manner.

18. The movable puzzle platform, as recited in claim 16, wherein the supporting portion further comprises a second main supporting wall attached on the bottom surface of the puzzle board and disposed apart from the first main supporting wall, and the restricting wall further comprises a second extending wall extended from the fixing portion of the puzzle board and integral with a periphery of the second main supporting wall for forming a second receiving space for fixing the puzzle board.

19. The movable puzzle platform, as recited in claim 16, wherein an upper surface of the puzzle plate is coplanar with respect to an upper surface of the fixing portion.

20. The movable puzzle platform, as recited in claim 16, wherein a thickness of the puzzle plate is substantially equal to a thickness of the fixing portion.

21. The movable puzzle platform, as recited in claim 16, wherein the puzzle plate is integral with the fixing portion as a whole.

22. The movable puzzle platform, as recited in claim 16, wherein the restricting wall further comprises a third extending wall mounted on the fixing portion and connected with the first and second extending walls.

23. The movable puzzle platform, as recited in claim 22, wherein the supporting portion further comprises a first dividing supporting wall positioned below the bottom surface of the puzzle board for improving the structural strength of the board assembly.

24. The movable puzzle platform, as recited in claim 23, wherein the third extending wall is partly overlapped with the first dividing supporting wall in a thickness direction of the board assembly.

25. The movable puzzle platform, as recited in claim 16, wherein each of the extending walls comprises an inner surface, an outer surface opposite to the inner surface, and a pair of side surfaces connecting the inner and outer surfaces, the side surface of one extending wall is engaged with the inner surface of the adjacent extending wall.

* * * * *